US010522043B2

(12) United States Patent
Chu et al.

(10) Patent No.: US 10,522,043 B2
(45) Date of Patent: Dec. 31, 2019

(54) SYSTEMS AND METHODS FOR MANAGING ASSETS IN A GEOGRAPHICAL LOCATION

(71) Applicant: Satori Worldwide, LLC, Palo Alto, CA (US)

(72) Inventors: Cynthia Chu, San Mateo, CA (US); Francois Orsini, San Francisco, CA (US); Boaz Sedan, Palo Alto, CA (US); Arun Kejariwal, Fremont, CA (US); Dhruv Choudhary, Mountain View, CA (US); Nika Kolomentseva, Mountain View, CA (US); Andrey Kolomentsev, Mountain View, CA (US); Sujesha Sudevalayam, San Jose, CA (US); Anna Kareva, Mountain View, CA (US); Gabor Mueller-Tseng, Redwood City, CA (US); Andrey Kushnir, Sunnyvale, CA (US); Jared Stoffan, Fremont, CA (US); Mick Ryan, San Mateo, CA (US); Renee Ya, San Mateo, CA (US); Anton Koinov, Santa Clara, CA (US); Mikhail Kuzmiankou, Hamburg (DE); Alex Taylor, San Bruno, CA (US)

(73) Assignee: Satori Worldwide, LlC, Palo Alto, CA (US)

( * ) Notice: Subject to any disclaimer, the term of this patent is extended or adjusted under 35 U.S.C. 154(b) by 0 days.

(21) Appl. No.: 15/865,205

(22) Filed: Jan. 8, 2018

(65) Prior Publication Data

US 2018/0197418 A1    Jul. 12, 2018

Related U.S. Application Data

(60) Provisional application No. 62/444,062, filed on Jan. 9, 2017, provisional application No. 62/446,104, filed on Jan. 13, 2017.

(51) Int. Cl.
*G08G 1/13* (2006.01)
*G08G 1/00* (2006.01)
(Continued)

(52) U.S. Cl.
CPC ............... *G08G 1/20* (2013.01); *G06Q 10/02* (2013.01); *G06Q 10/04* (2013.01); *G06Q 10/047* (2013.01);
(Continued)

(58) Field of Classification Search
CPC .......... G08G 1/13; G08G 1/20; H04W 4/029; G07C 5/008; G07C 5/12
(Continued)

(56) References Cited

U.S. PATENT DOCUMENTS 9,397,973 B1    7/2016  Kushnir et al.
9,792,575 B2 *  10/2017 Khasis ................. G05D 1/0287
(Continued)

FOREIGN PATENT DOCUMENTS

| AU | 2015210417 A1 | 2/2016 |
| EP | 2843598 A1 | 3/2015 |
| WO | 2014070446 A2 | 5/2014 |
| WO | 2016011346 A1 | 1/2016 |

OTHER PUBLICATIONS

Int'l Search Report and Written Opinion of the ISA/EP in PCT/US2018/013004 dated Mar. 22, 2018; 12 pgs.

*Primary Examiner* — Omar Casillashernandez
(74) *Attorney, Agent, or Firm* — Womble Bond Dickinson (US) LLP; Daniel E. Ovanezian

(57) ABSTRACT

Methods, systems, and apparatus, including computer programs encoded on a computer storage medium, for managing or tracking assets in a geographical area. One method includes receiving one or more first messages from a plurality of assets on one or more first channels of a plurality of channels. The one or more first messages may indicate live (Continued)

geographical locations of the plurality of assets located in a geographical area. The method also includes displaying, via a graphical user interface, the live geographical locations of the plurality of assets on a map of the geographical area. The method further includes receiving on a second channel a message indicating a request from a first user device to travel to a destination. The method further includes determining one or more travel routes to the destination. The one or more travel routes may use different assets to transport the first user device to the destination. The method further includes publishing on a third channel one or more second messages indicating the one or more travel routes.

19 Claims, 29 Drawing Sheets

(51) Int. Cl.
| | |
|---|---|
| *G07C 5/00* | (2006.01) |
| *G07C 5/12* | (2006.01) |
| *G06Q 10/02* | (2012.01) |
| *G06Q 10/04* | (2012.01) |
| *G06Q 50/30* | (2012.01) |
| *H04W 4/029* | (2018.01) |

(52) U.S. Cl.
CPC ............ *G06Q 50/30* (2013.01); *G07C 5/008* (2013.01); *G07C 5/12* (2013.01); *G08G 1/13* (2013.01); *H04W 4/029* (2018.02)

(58) Field of Classification Search
USPC .......................................................... 340/994
See application file for complete search history.

(56) References Cited

U.S. PATENT DOCUMENTS

| | | | |
|---|---|---|---|
| 2003/0033077 A1* | 2/2003 | Watanabe | G08G 1/096811 701/117 |
| 2009/0319176 A1* | 12/2009 | Kudoh | G01C 21/3617 701/408 |
| 2011/0053552 A1* | 3/2011 | Kim | G01C 21/3438 455/404.2 |
| 2012/0092190 A1 | 4/2012 | Stefik et al. | |
| 2013/0132140 A1* | 5/2013 | Amin | G06Q 10/02 705/7.13 |
| 2013/0132887 A1* | 5/2013 | Amin | G06F 3/048 715/781 |
| 2013/0246207 A1* | 9/2013 | Novak | G06Q 30/0283 705/26.2 |
| 2013/0246301 A1* | 9/2013 | Radhakrishnan | G06Q 30/0282 705/347 |
| 2014/0011522 A1* | 1/2014 | Lin | H04W 4/023 455/456.2 |
| 2014/0129135 A1* | 5/2014 | Holden | G01C 21/30 701/420 |
| 2014/0129951 A1* | 5/2014 | Amin | G06Q 50/30 715/738 |
| 2014/0365126 A1* | 12/2014 | Vulcano | G01C 21/36 701/533 |
| 2015/0095198 A1* | 4/2015 | Eramian | G06Q 50/30 705/26.64 |
| 2015/0294431 A1* | 10/2015 | Fiorucci | G06Q 50/26 705/13 |
| 2015/0325128 A1* | 11/2015 | Lord | G08G 1/20 705/13 |
| 2017/0132540 A1* | 5/2017 | Haparnas | G06Q 10/06311 |
| 2017/0169535 A1* | 6/2017 | Tolkin | G06Q 10/06311 |
| 2017/0193404 A1* | 7/2017 | Yoo | G06Q 10/02 |

* cited by examiner

1800

(AT) 🔍 Type To Search    ADVANCED SEARCH

Home•Routes•Route #WEST    ✕

🚩 WEST

Vehicles  17
Incidents  0
Capacity  0
Occupancy ━━━━━━━━━━━ 0%
⊘ Paper Tickets ━━━━━━━ 0
◉ HOP Tickets ━━━━━━━━ 0

🚌 Upcoming (17 Total)

▽ Filter

| STOP ⇅ | STOP NAME ⇅ | NEXT ⇅ | SCHED. ⇅ | DUE ⇅ |
|---|---|---|---|---|
| 0125-2... | Henderson Train Stati... | AM471 | 0:03 | OT |
| 0127-2... | Swanson Train Station | AM687 | 11:33 | OT |
| 0133-2... | Britomart Train Station | AM714 | 20:44 | OT |
| 0127-2... | Swanson Train Station | AM578 | 21:53 | OT |

} 1805 List

FIG. 18

SYSTEMS AND METHODS FOR MANAGING ASSETS IN A GEOGRAPHICAL LOCATION

CROSS-REFERENCE TO RELATED APPLICATIONS

This application claims the benefit of U.S. Provisional Patent Application No. 62/444,062, filed on Jan. 9, 2017, and claims the benefit of U.S. Provisional Patent Application No. 62/446,104, filed on Jan. 13, 2017. The disclosures of the above-referenced applications are hereby incorporated by reference in their entireties.

BACKGROUND

This specification relates to a data communication system and, in particular, systems and methods for managing or tracking assets in a geographical area.

The publish-subscribe (or "PubSub") pattern is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Because publishers may publish large volumes of messages, and subscribers may subscribe to many topics (or "channels") the overall volume of messages directed to a particular channel and/or subscriber may be difficult to manage.

BRIEF DESCRIPTION OF THE DRAWINGS

FIG. 18 is a diagram illustrating an example GUI that may be presented by an asset management component.

DETAILED DESCRIPTION

Elements of examples or embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

A system architecture for tracking and managing assets may include a messaging system. The messaging system may support the PubSub communication pattern and may allow publishers and subscribers to publish and receive live messages. Operators of assets, users of assets, and administrators, supervisors, managers, inspectors, or other like users of organizational entities that may be associated with the assets may be publishers and subscribers of the messaging system. Assets or operators of the assets, such as bus drivers, a parking lot attendant, etc., may publish messages to indicate the live geographical locations, conditions, utilization, performance metrics, etc., of the assets. Administrators, supervisors, managers, inspectors, or other like users of the organizational entity of the organizational entity may view the messages and may be able to view the live geographical locations of the assets as the assets travel through a geographical area. Administrators, supervisors, managers, inspectors, or other like users of the organizational entity of the organizational entity may also be able to view live performance metrics of the assets and may be able to manage or control the assets.

Users of the assets, such as passengers on a bus, drivers who use a parking lot, etc., may also be able to track the live geographical locations of the assets and view live performance metrics of the assets. Users may request assets to transport the users to different geographical locations. The system architecture may identify different travel routes that may use different assets (e.g., different transportation assets) and may allow the user to select one of the different travel routes.

The implementations, embodiments, and examples described herein may allow users to more easily and more efficiently select assets to transport the user to a particular geographical location (e.g., to a destination). For example, the system architecture may inform the user of the timeliness of the assets used on the different travel routes. This may allow the user to select the travel route where the user is most likely to arrive at the destination on time. The system architecture may also inform the user about the prices of the different travel routes, which may allow the user to select the most cost-effective travel route.

Figure 1A:
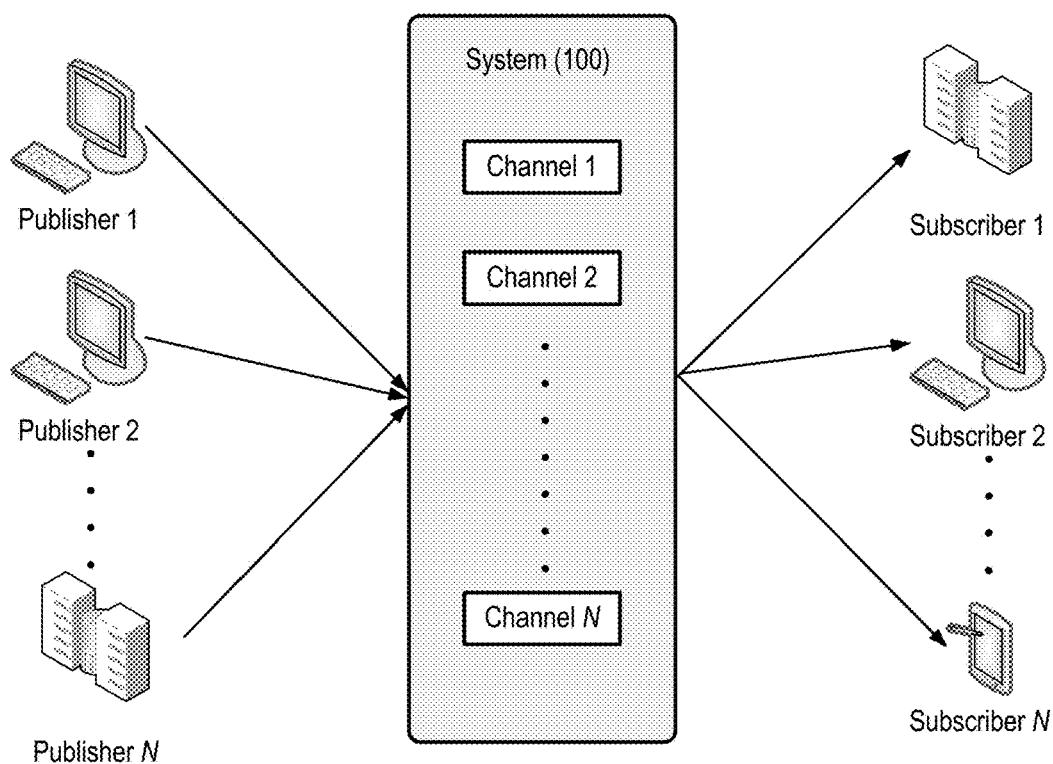
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
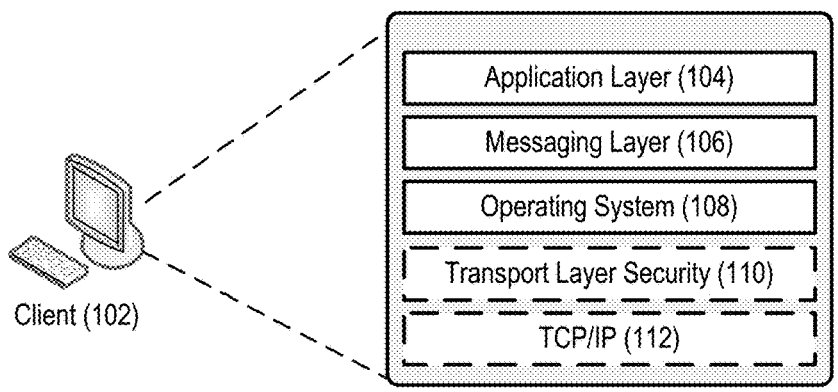
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
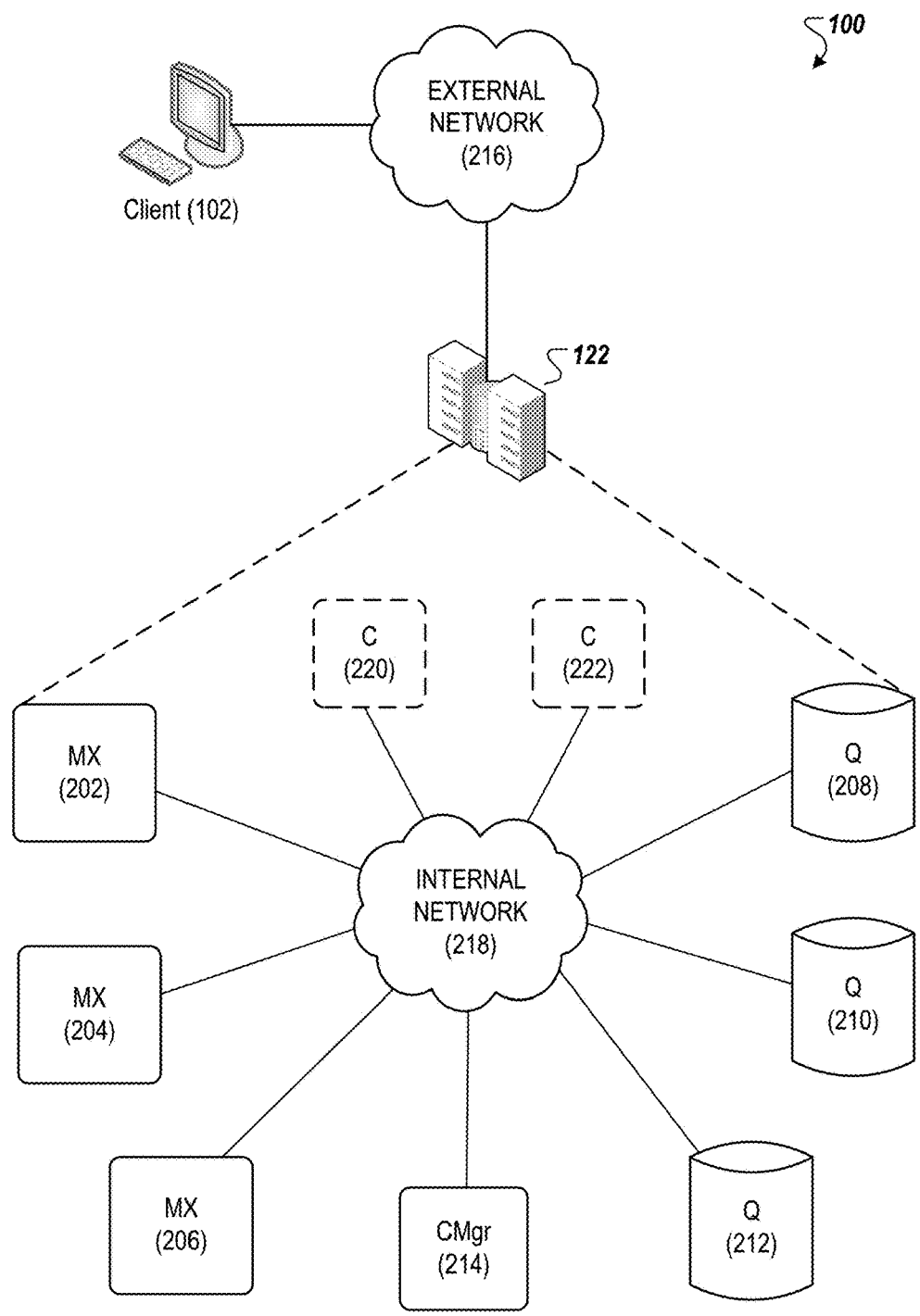
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more configuration manager nodes (e.g., configuration manager 214), and optionally one or more C nodes (e.g., C nodes or cache nodes 220 and 222). Each node can execute in a virtual machine or on a physical machine (e.g., a data processing apparatus). Each MX node can serve as a termination point for one or more publisher and/or subscriber connections through the external network 216. The internal communication among MX nodes, Q nodes, C nodes, and the configuration manager can be conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each configuration manager node is responsible for managing Q node load, for example, by assigning channels to Q nodes and/or splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a configuration manager (e.g., configuration manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a configuration manager to grant access to a streamlet for the channel from which messages are read. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the configuration manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
    "limit-msgs": 5000, # 5 thousand messages max
```

-continued

```
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a configuration manager node. The configuration manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the configuration manager to read from or write to a streamlet. The new grant will reference a different streamlet and will refer to the same or a different Q node depending on where the new streamlet resides.

Figure 3A:
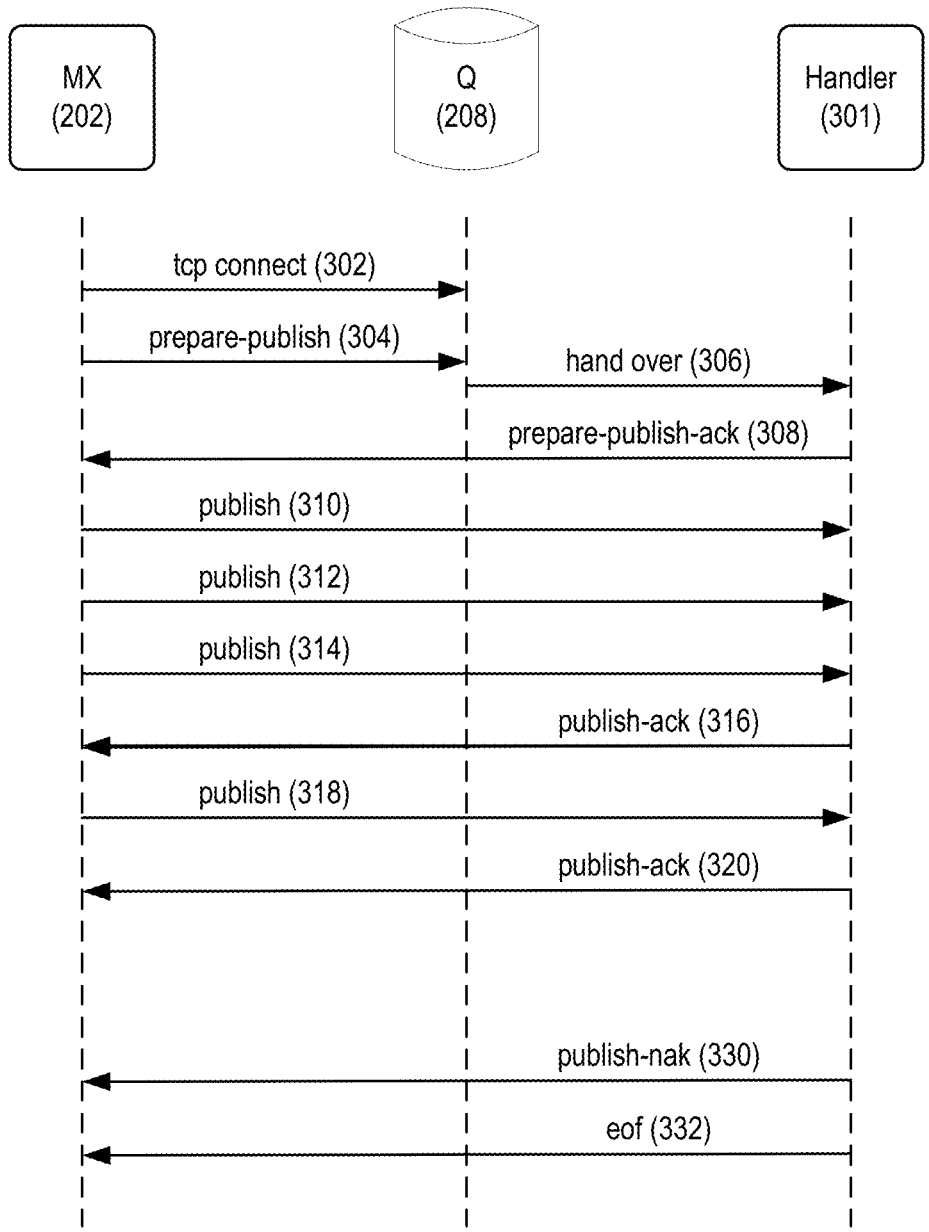
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a configuration manager (e.g., configuration manager 214), as described before, the MX node establishes a Transmission Control Protocol (TCP) connection with the Q node (e.g., Q node 208) identified in the grant response received from the configuration manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the configuration manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turn stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a configuration manager if the MX node has additional messages to store.

Figure 3B:
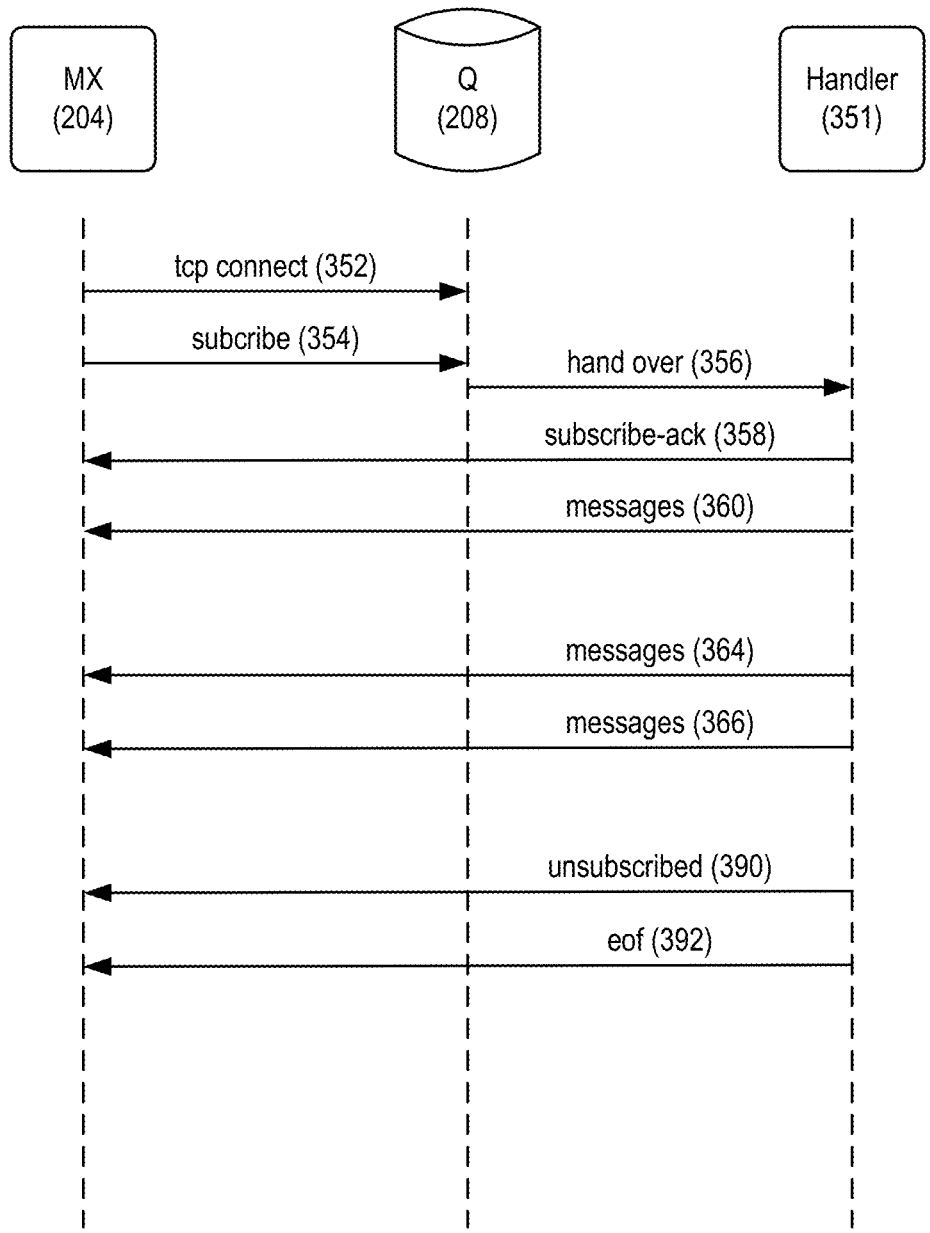
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a configuration manager (e.g., configuration manager 214) a request for reading a particular channel starting from a particular message or time offset in the channel. The configuration manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the configuration manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the configuration manager). The MX node can also close the association with the handler process if the MX node receives an unsubscribe message from a corresponding client device.

In various implementations, a streamlet can be written into and read from at the same time instance. For example, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a configuration manager) can read the streamlets from the C nodes instead.

As described above, messages for a channel in the messaging system 100 are ordered in a channel stream. A configuration manager (e.g., configuration manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The configuration manager can also balance load among Q nodes in the messaging system 100 by monitoring respective workloads of the Q nodes and allocating streamlets in a way that avoids overloading any one Q node.

In various implementations, a configuration manager maintains a list identifying each active streamlet, the respective Q node on which the streamlet resides, an identification of the position of the first message in the streamlet, and whether the streamlet is closed for writing. In some implementations, Q nodes notify the configuration manager and/or any MX nodes that are publishing to a streamlet that the streamlet is closed due to being full or when the streamlet's TTL has expired. When a streamlet is closed, the streamlet remains on the configuration manager's list of active streamlets until the streamlet's TTL has expired so that MX nodes can continue to retrieve messages from the streamlet.

When an MX node requests a write grant for a given channel and there is not a streamlet for the channel that can be written to, the configuration manager allocates a new streamlet on one of the Q nodes and returns the identity of the streamlet and the Q node in the StreamletGrantResponse. Otherwise, the configuration manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the configuration manager.

When an MX node requests a read grant for a given channel and there is not a streamlet for the channel that can be read from, the configuration manager allocates a new streamlet on one of the Q nodes and returns the identity of the streamlet and the Q node in the StreamletGrantResponse. Otherwise, the configuration manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 can send an EOF message (392) to any MX nodes that are subscribed to the streamlet.

In some implementations, the messaging system 100 can include multiple configuration managers (e.g., configuration manager 214 plus one or more other configuration managers). Multiple configuration managers can provide resiliency and prevent single point of failure. For instance, one configuration manager can replicate lists of streamlets and current grants it maintains to another "slave" configuration manager. As another example, multiple configuration managers can coordinate operations between them using distributed consensus protocols, such as, for example, Paxos or Raft protocols.

Figure 4A:
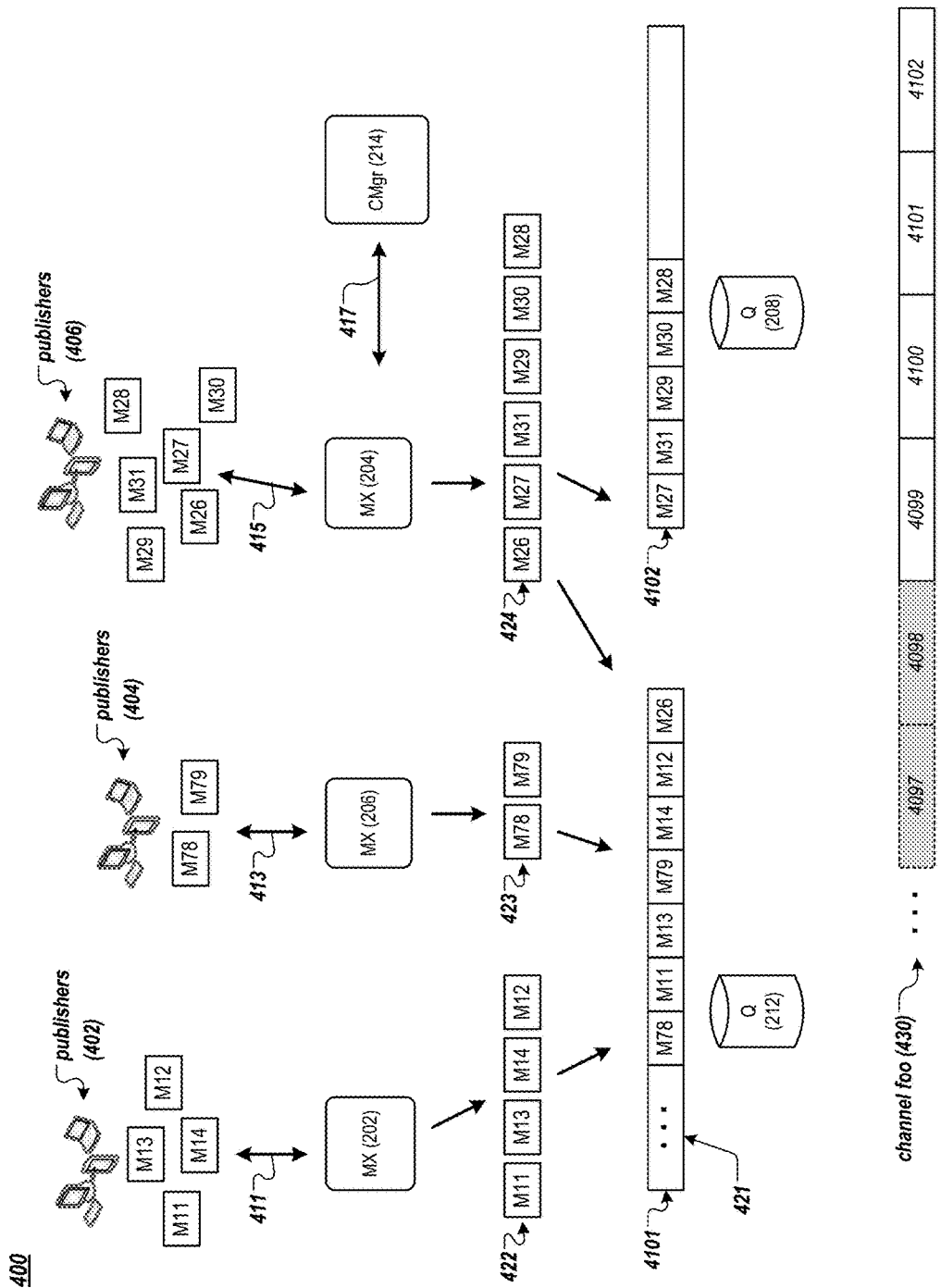
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a configuration manager (e.g., configuration manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the configuration manager 214. If the channel (specified in the subscribe request) does not yet exist in the messaging system 100, the configuration manager can create and maintain a new channel in the messaging system 100. For instance, the configuration manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the configuration manager 214 that allows the MX node to store the messages in a streamlet of the channel foo. For instance, the MX node 202 receives a grant from the configuration manager 214 to write messages M11, M12, M13, and M14 to a streamlet 4101 on the Q node 212. The MX node 206 receives a grant from the configuration manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other appropriate algorithms and techniques, such as Nagle's algorithm, can be used for managing the buffered messages.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the configuration manager 214 to write to the channel foo. The configuration manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the configuration manager 214 for additional messages (e.g., M27, M31, and so on) for the channel foo.

The configuration manager 214 can monitor available Q nodes in the messaging system 100 for their respective workloads (e.g., how many streamlets are residing in each Q node). The configuration manager 214 can allocate a streamlet for the write request from the MX node 204 such that overloading (e.g., too many streamlets or too many read or write grants) can be avoided for any given Q node. For instance, the configuration manager 214 can identify a least loaded Q node in the messaging system 100 and allocate a new streamlet on the least loaded Q node for write requests from the MX node 204. In the example of FIG. 4A, the configuration manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the configuration manager 214 allocates a new streamlet (e.g., streamlet 4102) for a request for a grant from an MX node (e.g., MX node 204) to write to a channel (e.g., foo), the configuration manager 214 assigns to the streamlet its TTL, which will expire after TTLs of other streamlets that are already in the channel's stream. For instance, the configuration manager 214 can assign to each streamlet of the channel foo's channel stream a TTL of 3 minutes when allocating the streamlet. That is, each streamlet will expire 3 minutes after it is allocated (created) by the configuration manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
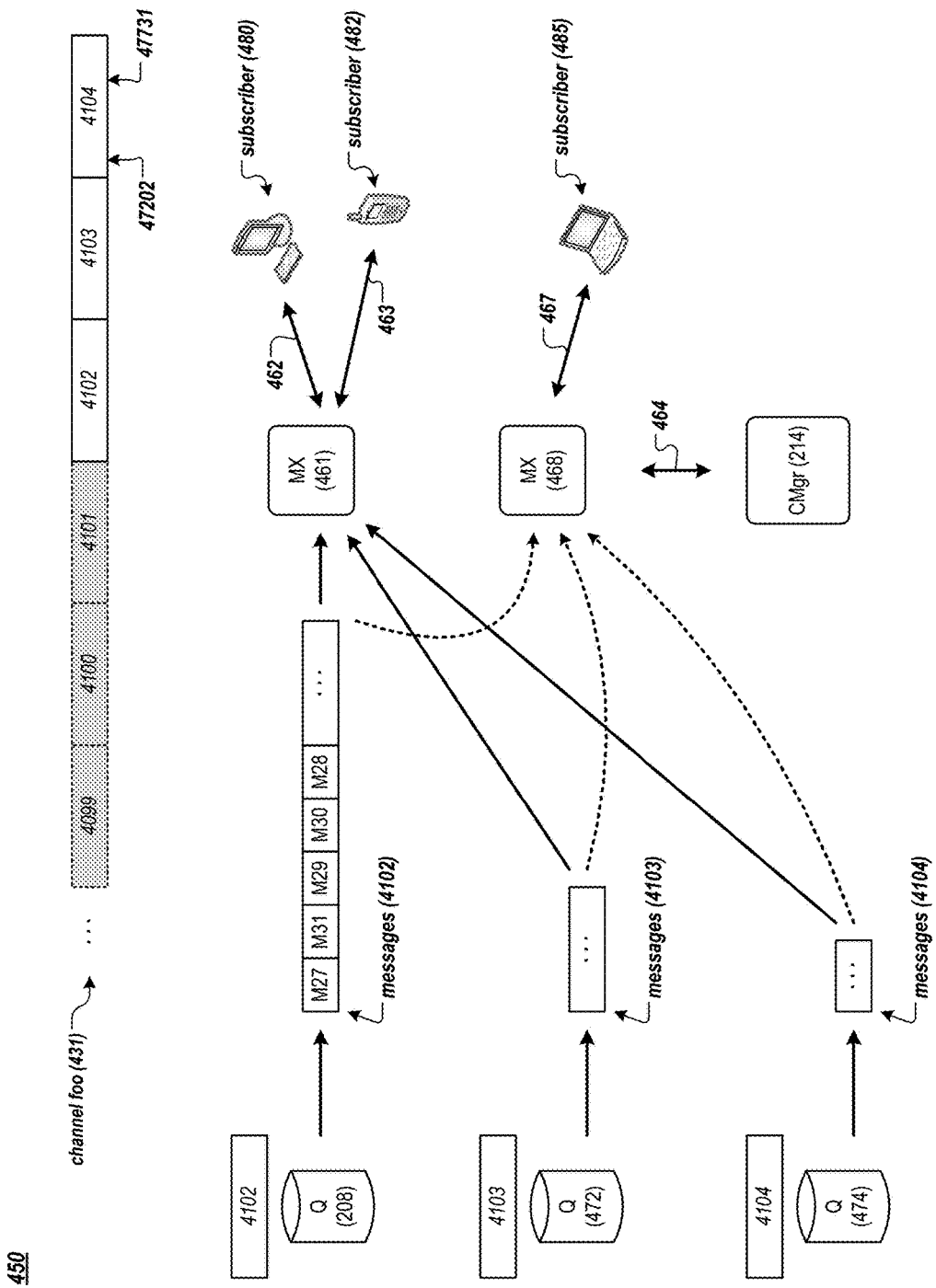
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the configuration manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the configuration manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the configuration manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other appropriate algorithms and techniques, such as Nagle's algorithm, can be used for managing the buffered messages.

After receiving the last message in the streamlet 4102, the MX node 461 can send an acknowledgement to the Q node 208, and send to the configuration manager 214 another request (e.g., for a read grant) for the next streamlet in the channel stream of the channel foo. Based on the request, the configuration manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the configuration manager 214 yet another request for a read grant for messages in the next streamlet 4104 (on Q node 474). After receiving the read grant, the MX node 461 retrieves messages of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q nodes 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective times-to-live that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the configuration manager 214 a request for a read grant for messages starting at the position 47202. Based on the request, the configuration manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The configuration manager 214 maintains the ordered sequence of streamlets as they are created throughout their respective times-to-live. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages (although other sizes of blocks of messages are possible). Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
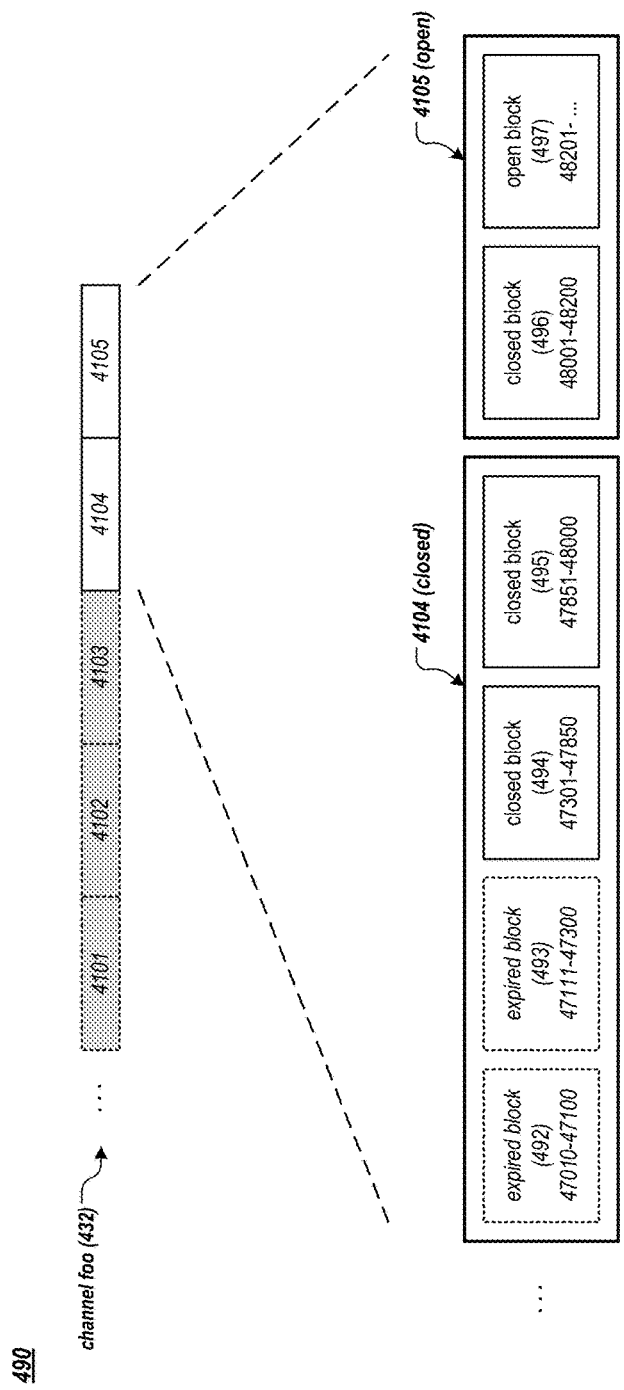
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

As described above, a streamlet (a data buffer) residing on a Q node stores messages of a channel in the messaging system 100. To prevent failure of the Q node (a single point failure) that can cause messages being lost, the messaging system 100 can replicate messages on multiple Q nodes, as described in more detail below.

Figure 5A:
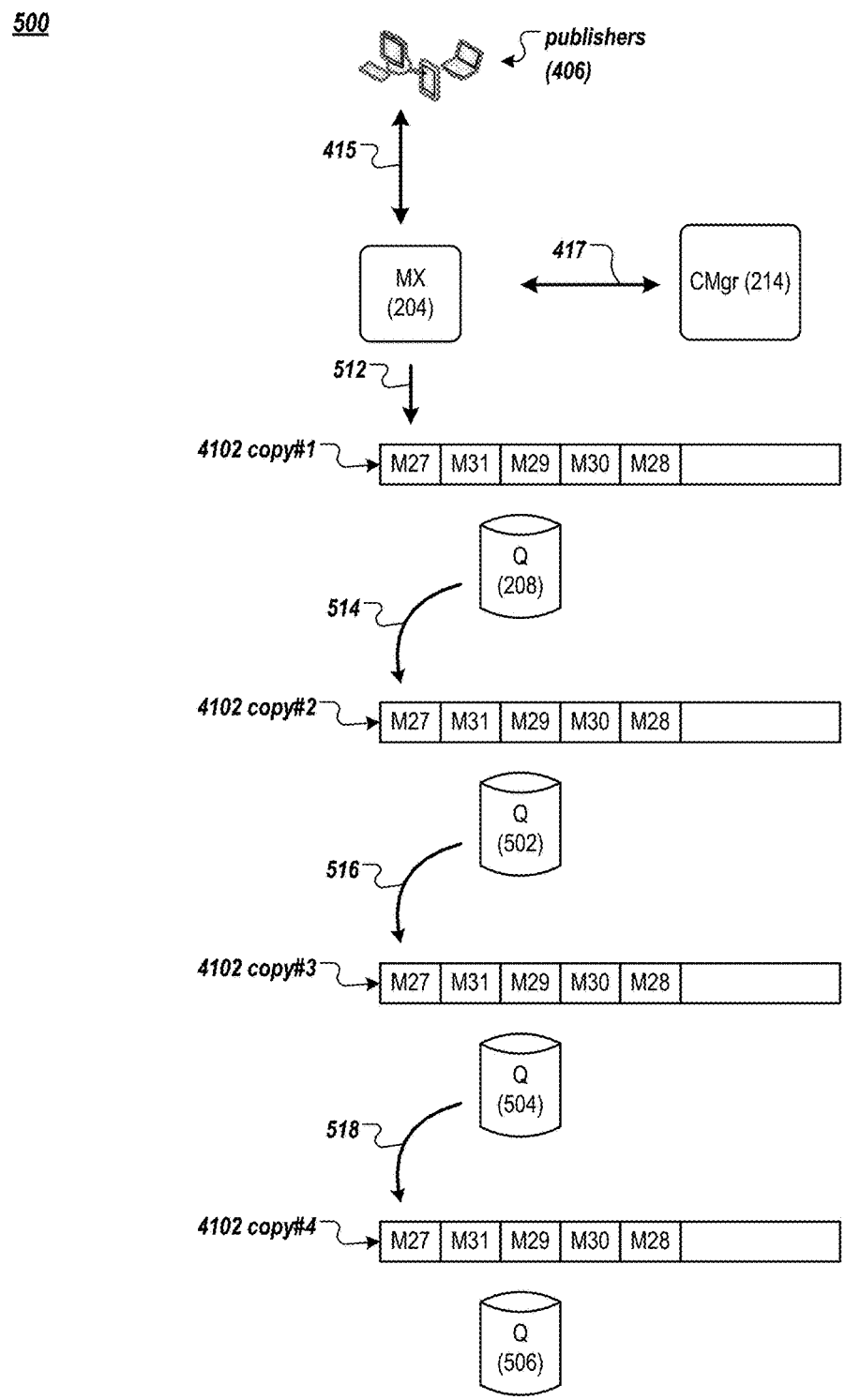
FIG. 5A is a data flow diagram of an example method for publishing and replicating messages of a messaging system.

FIG. 5A is a data flow diagram of an example method 500 for publishing and replicating messages of the messaging system 100. As described earlier in reference to FIG. 4A, the MX node 204 receives messages (of the channel foo) from the publishers 406. The configuration manager 214 can instruct the MX Node 204 (e.g., with a write grant) to store the messages in the streamlet 4102 on the Q node 208. In FIG. 5A, instead of storing the messages on a single node (e.g., Q node 208), the configuration manager 214 allocates multiple Q nodes to store multiple copies of the streamlet 4102 on these Q nodes.

By way of illustration, the configuration manager 214 allocates Q nodes 208, 502, 504, and 506 in the messaging system 100 to store copies of the streamlet 4102. The configuration manager 214 instructs the MX node 204 to transmit the messages for the channel foo (e.g., messages M27, M31, M29, M30, and M28) to the Q node 208 (512). A computing process running on the Q node 208 stores the messages in the first copy (copy #1) of the streamlet 4102. Instead of sending an acknowledgement message to the MX node 204 after storing the messages, the Q node 208 forwards the messages to the Q node 502 (514). A computing process running on the Q node 502 stores the messages in another copy (copy #2) of the streamlet 4102. Meanwhile, the Q node 502 forwards the messages to the Q node 504 (516). A computing process running on the Q node 504 stores the messages in yet another copy (copy #3) of the streamlet 4102. The Q node 504 also forwards the message to the Q node 506 (518). A computing process running on the Q node 506 stores the messages in yet another copy (copy #4) of the streamlet 4102. The Q node 506 can send an acknowledgement message to the MX node 204, indicating that all the messages (M27, M31, M29, M30, and M28) have been stored successfully in streamlet copies #1, #2, #3 and #4.

In some implementations, after successfully storing the last copy (copy #4), the Q node 506 can send an acknowledgement to its upstream Q node (504), which in turns sends an acknowledgement to its upstream Q node (502), and so on, until the acknowledgement is sent to the Q node 208 storing the first copy (copy #1). The Q node 208 can send an acknowledgement message to the MX node 204, indicating that all messages have been stored successfully in the streamlet 4102 (i.e., in the copies #1, #2, #3 and #4).

In this way, four copies of the streamlet 4102 (and each message in the streamlet) are stored in four different Q nodes. Other numbers (e.g., two, three, five, or other suitable number) of copies of a streamlet are also possible. In the present illustration, the four copies form a chain of copies including a head copy in the copy #1 and a tail copy in the copy #4. When a new message is published to the streamlet 4102, the message is first stored in the head copy (copy #1) on the Q node 208. The message is then forwarded downstream to the next adjacent copy, the copy #2 on the Q node 502 for storage, then to the copy #3 on the Q node 504 for storage, until the message is stored in the tail copy the copy #4 on the Q node 506.

In addition to storing and forwarding by messages, the computing processes running on Q nodes that store copies of a streamlet can also store and forward messages by blocks of messages, as described earlier in reference to FIG. 4C. For instance, the computing process storing the copy #1 of the streamlet 4102 on Q node 208 can allocate memory and store a block of, for example, 200 kilobytes of messages (although other sizes of blocks of messages are possible), and forward the block of messages to the next adjacent copy (copy #2) of the chain for storage, and so on, until the block messages is stored in the tail copy (copy #4) on the Q node 506.

Figure 5B:
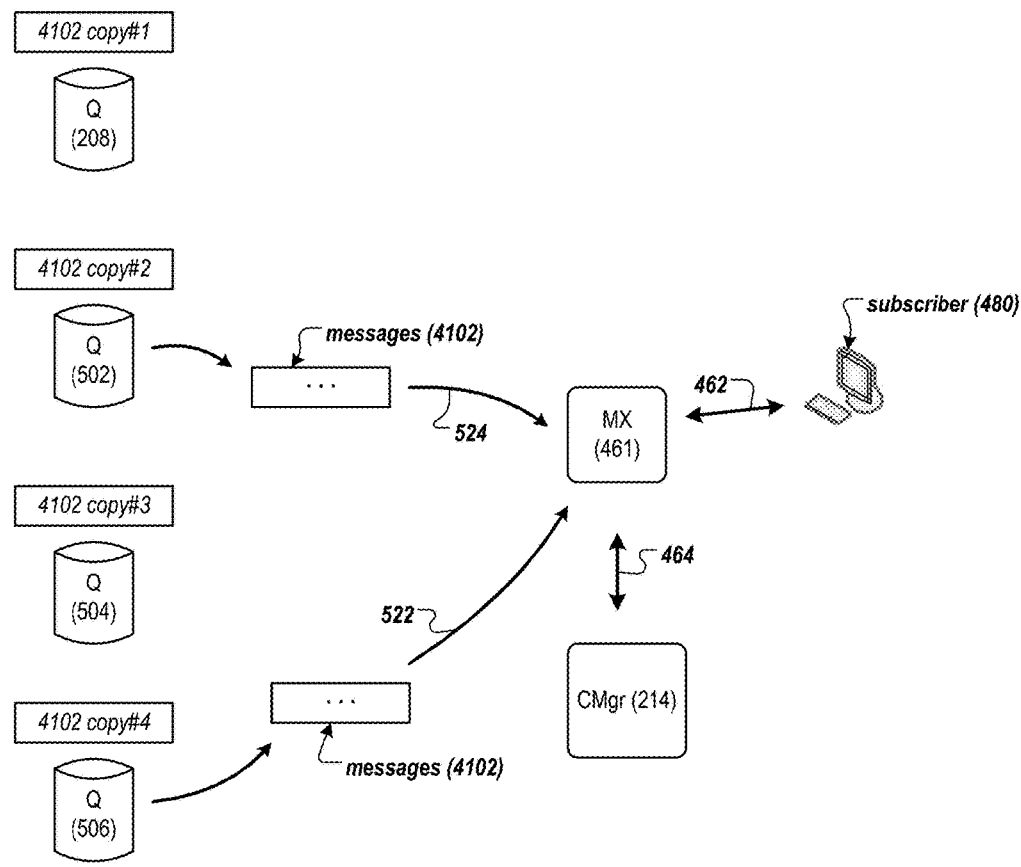
FIG. 5B is a data flow diagram of an example method for retrieving stored messages in a messaging system.

Messages of the streamlet 4102 can be retrieved and delivered to a subscriber of the channel foo from one of the copies of the streamlet 4102. FIG. 5B is a data flow diagram of an example method 550 for retrieving stored messages in the messaging system 100. For instance, the subscriber 480 can send a request for subscribing to messages of the channel to the MX node 461, as described earlier in reference to FIG. 4B. The configuration manager 214 can provide to the MX node 461 a read grant for one of the copies of the streamlet 4102. The MX node 461 can retrieve messages of the streamlet 4102 from one of the Q nodes storing a copy of the streamlet 4102, and provide the retrieved messages to the subscriber 480. For instance, the MX node 461 can retrieve messages from the copy #4 (the tail copy) stored on the Q node 506 (522). As for another example, the MX node 461 can retrieve messages from the copy #2 stored on the Q node 502 (524). In this way, the multiple copies of a streamlet (e.g., copies #1, #2, #3, and #4 of the streamlet 4102) provide replication and redundancy against failure if only one copy of the streamlet were stored in the messaging system 100. In various implementations, the configuration manager 214 can balance workloads among the Q nodes storing copies of the streamlet 4102 by directing the MX node 461 (e.g., with a read grant) to a particular Q node that has, for example, less current read and write grants as compared to other Q nodes storing copies of the streamlet 4102.

A Q node storing a particular copy in a chain of copies of a streamlet may fail, e.g., a computing process on the Q node storing the particular copy may freeze. Other failure modes of a Q node are possible. An MX node can detect a failed node (e.g., from non-responsiveness of the failed node) and report the failed node to a configuration manager in the messaging system 100 (e.g., configuration manager 214). A peer Q node can also detect a failed Q node and report the failed node to the configuration manager. For instance, an upstream Q node may detect a failed downstream Q node when the downstream Q node is non-responsive, e.g., fails to acknowledge a message storage request from the upstream Q node as described earlier. It is noted that failure of a Q node storing a copy of a particular streamlet of a particular channel stream does not have to be for publish or subscribe operations of the particular streamlet or of the particular channel stream. Failure stemming from operations on another streamlet or another channel stream can also alert a configuration manager about failure of a Q node in the messaging system 100.

Figure 5C:
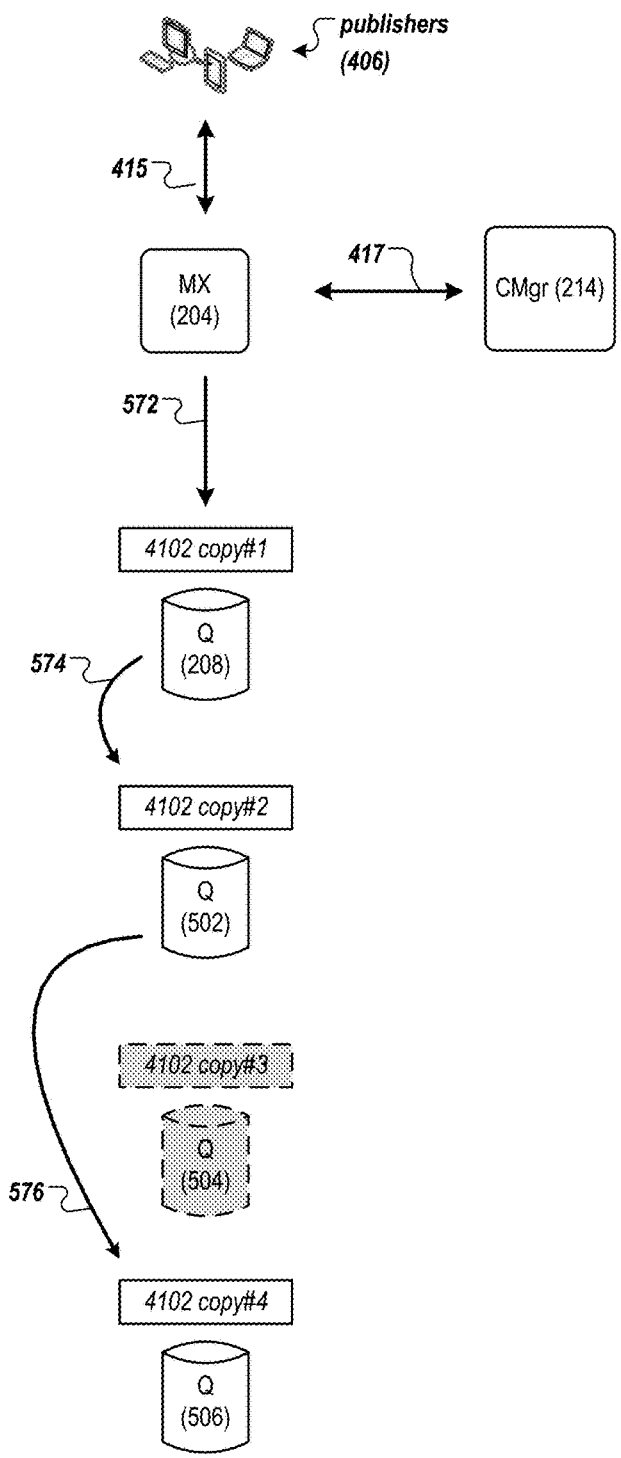
FIGS. 5C and 5D are data flow diagrams of example methods for repairing a chain of copies of data in a messaging system.
Figure 5D:
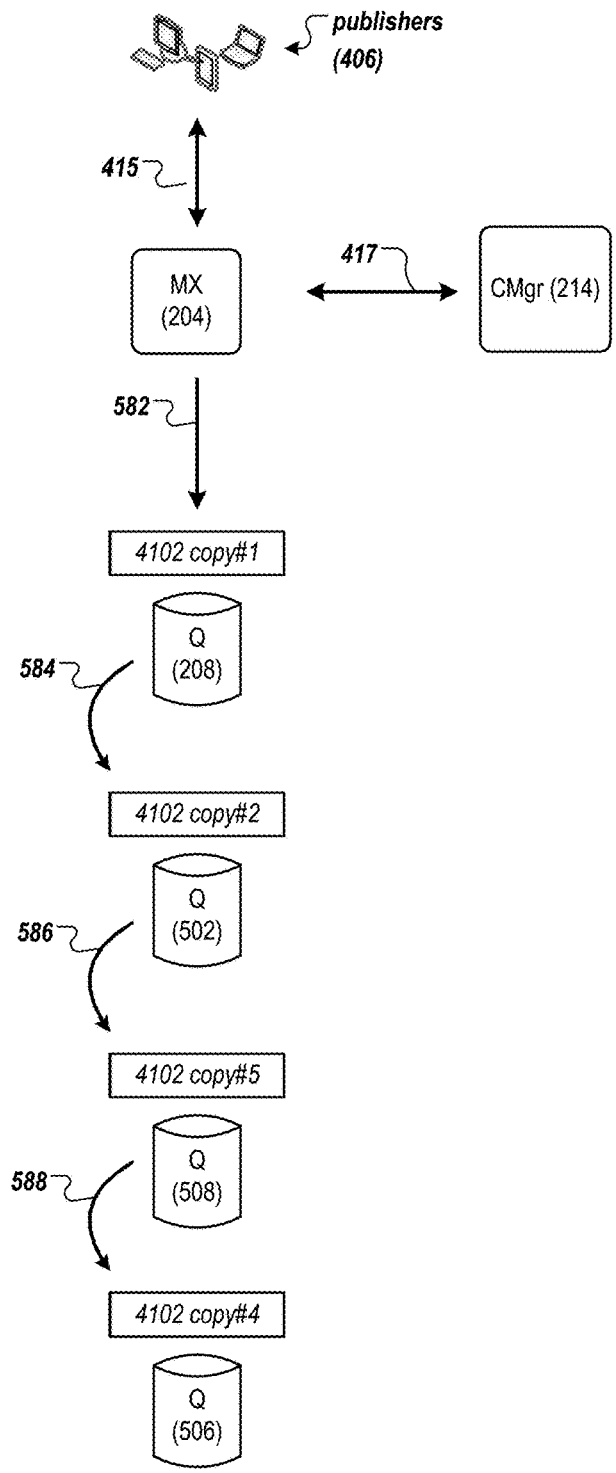

When a Q node storing a particular copy in a chain of copies of a streamlet fails, a configuration manager in the messaging system 100 can repair the chain by removing the failed node, or by inserting a new node for a new copy into the chain, for example. FIGS. 5C and 5D are data flow diagrams of example methods for repairing a chain of copies of a streamlet in the messaging system 100. In FIG. 5C, for instance, after detecting that the Q node 504 fails, the configuration manager 214 can repair the chain of copies by redirecting messages intended to be stored in the copy #3 of the streamlet 4102 on the Q node 502 to the copy #4 of the streamlet 4102 on the Q node 506. In this example, a message (or a block of messages) is first sent from the MX node 204 to the Q node 208 for storage in the copy #1 of the streamlet 4102 (572). The message then is forwarded to the Q node 502 for storage in the copy #2 of the streamlet 4102 (574). The message is then forwarded to the Q node 506 for storage in the copy #4 of the streamlet 4102 (576). The Q node 506 can send an acknowledgement message to the configuration manager 214 indicating that the message has been stored successfully.

Here, a failed node can also be the node storing the head copy or the tail copy of the chain of copies. For instance, if the Q node 208 fails, the configuration manager 214 can instruct the MX node 204 first to send the message to the Q node 502 for storage in the copy #2 of the streamlet 4102.

The message is then forwarded to the next adjacent copy in the chain for storage, until the message is stored in the tail copy.

If the Q node 506 fails, the configuration manager 214 can repair the chain of copies of the streamlet 4102 such that the copy #3 on the Q node 504 becomes the tail copy of the chain. A message is first stored in the copy #1 on the Q node 208, then subsequently stored in the copy #2 on the Q node 502, and the copy #3 on the Q node 504. The Q node 504 then can send an acknowledgement message to the configuration manager 214 indicating that the message has been stored successfully.

In FIG. 5D, the configuration manager 214 replaces the failed node Q node 504 by allocating a new Q node 508 to store a copy #5 of the chain of copies of the streamlet 4102. In this example, the configuration manager 214 instructs the MX node 204 to send a message (from the publishers 406) to the Q node 208 for storage in the copy #1 of the streamlet 4102 (582). The message is then forwarded to the Q node 502 for storage in the copy #2 of the streamlet 4102 (584). The message is then forwarded to the Q node 508 for storage in the copy #5 of the streamlet 4012 (586). The message is then forwarded to the Q node 506 for storage in the copy #4 of the streamlet 4102 (588). The Q node 506 can send an acknowledgement message to the configuration manager 214 indicating that the message has been stored successfully.

Figure 6:
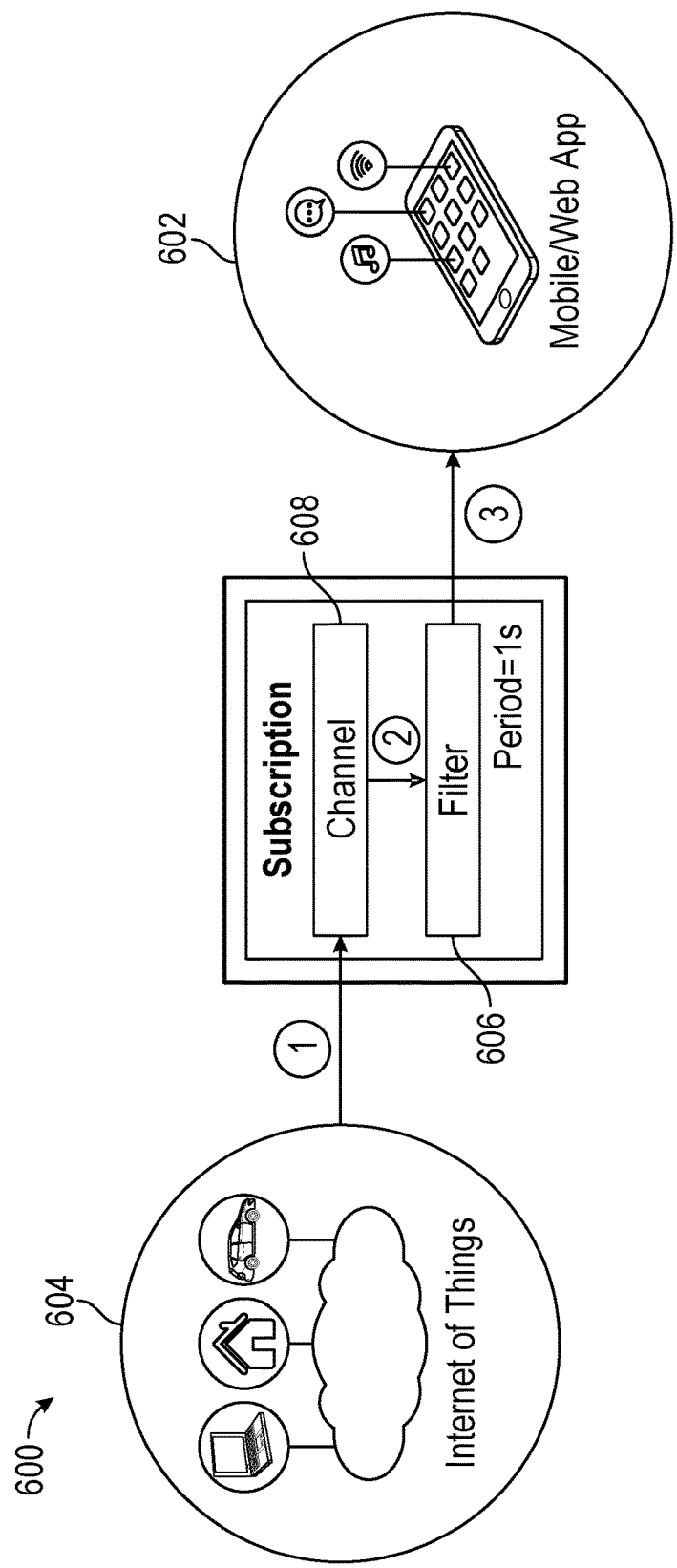
FIG. 6 is an example data flow diagram for the application of filtering criteria in a messaging system.

FIG. 6 is a data flow diagram 600 illustrating the application of selective filtering, searching, transforming, querying, aggregating and transforming of messages in real time to manage the delivery of messages into and through each channel and on to individual subscribers. Users operating applications on client devices, such as, for example, smartphones, tablets, and other internet-connected devices, act as subscribers (e.g., subscriber 480 in FIG. 4B, subscriber 602 in FIG. 6). The applications may be, for example, consumers of the messages to provide real-time information about news, transportation, sports, weather, or other subjects that rely on published messages attributed to one or more subjects and/or channels. Message publishers 604 can be any internet-connected service that provides, for example, status data, transactional data or other information that is made available to the subscribers 602 on a subscription basis. In some versions, the relationship between publishers and channels is 1:1, that is there is one and only one publisher that provides messages into that particular channel. In other instances, the relationship may be many-to-one (more than one publisher provides messages into a channel), one-to-many (a publisher's messages are sent to more than one channel), or many-to-many (more than one publisher provides messages to more than one channel). Typically, when a subscriber subscribes to a channel, they receive all messages and all message data published to the channel as soon as it is published. The result, however, is that many subscribers can receive more data (or data that requires further processing) than is useful. The additional filtering or application of functions against the data places undue processing requirements on the subscriber application and can delay presentation of the data in its preferred format.

A filter 606 can be created by providing suitable query instructions at, for example, the time the subscriber 602 subscribes to the channel 608. The filter 606 that is specified can be applied to all messages published to the channel 608 (e.g., one message at a time), and can be evaluated before the subscriber 602 receives the messages (e.g., see block 2 in FIG. 6). By allowing subscribers 602 to create query instructions a priori, that is upon subscribing to the channel 608 and before data is received into the channel 608, the burden of filtering and processing messages moves closer to the data source, and can be managed at the channel level. As a result, the messages are pre-filtered and/or pre-processed before they are forwarded to the subscriber 602. Again, the query instructions need not be based on any a priori knowledge of the form or substance of the incoming messages. The query instructions can be used to pre-process data for applications such as, for example, real-time monitoring services (for transportation, healthcare, news, sports, weather, etc.) and dashboards (e.g., industrial monitoring applications, financial markets, etc.) to filter data, summarize data and/or detect anomalies. One or more filters 606 can be applied to each channel 608.

The query instructions can implement real-time searches and queries, aggregate or summarize data, or transform data for use by a subscriber application. In some embodiments, including those implementing JSON formatted messages, the messages can be generated, parsed and interpreted using the query instructions, and the lack of a pre-defined schema (unlike conventional RDBMS/SQL-based applications) means that the query instructions can adapt to changing business needs without the need for schema or application layer changes. This allows the query instructions to be applied selectively at the message level within a channel, thus filtering and/or aggregating messages within the channel. In some instances, the queries may be applied at the publisher level—meaning channels that receive messages from more than one publisher may apply certain filters against messages from specific publishers. The query instructions may be applied on a going-forward basis, that is on only newly arriving messages, and/or in some cases, the query instructions may be applied to historical messages already residing in the channel queue.

The query instructions can be applied at either or both of the ingress and egress side of the PubSub service. On the egress side, the query instructions act as a per-connection filter against the message channels, and allows each subscriber to manage their own set of unique filters. On the ingress side, the query instructions operate as a centralized, system-wide filter that is applied to all published messages.

For purposes of illustration and not limitation, examples of query instructions that may be applied during message ingress include:
  A message may be distributed to multiple channels or to a different channel (e.g., based on geo-location in the message, or based on a hash function of some value in the message).
  A message may be dropped due to spam filtering or DoS rules (e.g., limiting the number of messages a publisher can send in a given time period).
  An alert message may be sent to an admin channel on some event arriving at any channel (e.g., cpu_temp>threshold).

For purposes of illustration and not limitation, examples of query instructions that may be applied during message egress include:
  Channels that contain events from various sensors where the user is only interested in a subset of the data sources.
  Simple aggregations, where a system reports real time events, such as cpu usage, sensor temperatures, etc., and we would like to receive some form of aggregation over a short time period, irrespective of the number of devices reporting or the reporting frequency, e.g., average(cpu_load), max(temperature), count(number_of_users), count(number_of_messages) group by country.

Transforms, where a system reports real time events and metadata is added to them from mostly static external tables, e.g., adding a city name based on IP address, converting an advertisement ID to a marketing campaign ID or to a marketing partner ID.

Adding default values to event streams where such values do not exist on certain devices.

Advanced aggregations, where a system reports real time events, and combines some mostly static external tables data into the aggregation in real time, e.g., grouping advertisement clicks by partners and counting number of events.

Counting number of user events, grouping by a/b test cell allocation.

In some embodiments, the query instructions may be used to define an index or other suitable temporary data structure, which may then be applied against the messages as they are received into the channel to allow for the reuse of the data element(s) as searchable elements. In such cases, a query frequency may be maintained to describe the number of times (general, or in a given period) that a particular data element is referred to or how that element is used. If the frequency that the data element is used in a query exceeds some threshold, the index may be stored for subsequent use on incoming messages, whereas in other instances in which the index is used only once (or infrequently) it may be discarded. In some instances, the query instruction may be applied to messages having arrived at the channel prior to the creation of the index. Thus, the messages are not indexed according to the data elements described in the query instructions but processed using the query instructions regardless, whereas messages arriving after the creation of the index may be filtered and processed using the index. For queries or other subscriptions that span the time at which the index may have been created, the results of applying the query instructions to the messages as they are received and processed with the index may be combined with results of applying the query instructions to non-indexed messages received prior to receipt of the query instructions.

For purposes of illustration and not limitation, one use case for such a filtering application is a mapping application that subscribes to public transportation data feeds, such as the locations of all buses across a city. The published messages may include, for example, geographic data describing the location, status, bus agency, ID number, route number, and route name of the buses. Absent pre-defined query instructions, the client application would receive individual messages for all buses. However, query instructions may be provided that filter out, for example, inactive routes and buses and aggregate, for example, a count of buses by agency. The subscriber application receives the filtered bus data in real time and can create reports, charts and other user-defined presentations of the data. When new data is published to the channel, the reports can be updated in real time based on a period parameter (described in more detail below).

The query instructions can be provided (e.g., at the time the subscriber subscribes to the channel) in any suitable format or syntax. For example, the following illustrates the structure of several fields of a sample subscription request Protocol Data Unit (PDU) with the PDU keys specific to adding a filter to a subscription request:

```
{
    "action": "subscribe",
    "body": {
        "channel": "ChannelName"
```

```
        "filter": "QueryInstructions"
        "period": [1-60, OPTIONAL]
    }
}
```

In the above subscription request PDU, the "channel" field can be a value (e.g., string or other appropriate value or designation) for the name of the channel to which the subscriber wants to subscribe. The "filter" field can provide the query instructions or other suitable filter commands, statements, or syntax that define the type of key/values in the channel message to return to the subscriber. The "period" parameter specifies the time period in, for example, seconds, to retain messages before returning them to the subscriber (e.g., an integer value from 1 to 60, with a default of, for example, 1). The "period" parameter will be discussed in more detail below. It is noted that a subscription request PDU can include any other suitable fields, parameters, or values.

One example of a query instruction is a "select" filter, which selects the most recent (or "top") value for all (e.g., "select.*") or selected (e.g., "select.name") data elements. In the example below, the Filter column shows the filter value sent in the query instructions as part of a subscription as the filter field. The Message Data column lists the input of the channel message data and the message data sent to the client as output. In this example, the value for the "extra" key does not appear in the output, as the "select" filter can return only the first level of results and does not return any nested key values.

| Filter | Message Data |
| --- | --- |
| SELECT * | Input<br>{"name": "art", "eye": "blue"},<br>{"name": "art", "age": 11},<br>{"age": 12, "height": 190}<br>Output<br>{"name": "art", "age": 12, "eye": "blue", "height": 190} |
| SELECT top.* | Input<br>{"top": {"age": 12, "eyes": "blue"}},<br>{"top": {"name": "joy", "height": 168}, "extra": 1},<br>{"top": {"name": "art"}}<br>Output<br>{"name": "art", "age": 12, "eye": "blue", "height": 168} |

For aggregative functions, all messages can be combined that satisfy the query instructions included in the GROUP BY clause. The aggregated values can then be published as a single message to the subscriber(s) at the end of the aggregation period. The number of messages that are aggregated depends on, for example, the number of messages received in the channel in the period value for the filter. For instance, if the period parameter is set to 1, and 100 messages are received in one second, all 100 messages are aggregated into a single message for transmission to the subscriber(s). As an example, a query instruction as shown below includes a filter to aggregate position data for an object, grouping it by obj_id, with a period of 1:

SELECT*WHERE (<expression with aggregate function>) GROUP BY obj_id

In this example, all messages published in the previous second with the same obj_id are grouped and sent as a batch to the subscriber(s).

In some embodiments, a MERGE(*) function can be used to change how aggregated message data is merged. The MERGE(*) function can return a recursive union of incoming messages over a period of time. The merge function may be used, for example, to track location data for an object, and the subscriber is interested in the most recent values for all key/value pairs contained in a set of aggregated messages. The following statement shows an exemplary syntax for the MERGE(*) function:

---
SELECT [expr] [name,]MERGE(*)[.*] [AS name] [FROM expr] [WHERE expr] [HAVING expr] GROUP BY name
---

The following examples illustrate how the MERGE(*) function may be applied within query instructions to various types of channel messages. In the following examples, the Filter column shows the filter value included in the query instructions as part of a subscription request as the FILTER field. The Message Data column lists the Input channel message data and the resulting message data sent to the subscriber as Output. The filter returns the most recent values of the keys identified in the input messages, with the string MERGE identified as the column name in the output message data. The first example below shows the MERGE(*) function in a filter with a wildcard, for the message data is returned using the keys from the input as column names in the output.

| Filter | Message Data |
|---|---|
| SELECT MERGE(*) | Input<br>{"name": "art", "age": 10},<br>{"name": "art", "age": 11, "items": [0]}<br>Output<br>{"MERGE": {"name": "art", "age": 11, "items": [0]}} |

The next example illustrates the use of the MERGE(*) function in a filter using a wildcard and the "AS" statement with a value of MERGE. The output data includes MERGE as the column name.

| Filter | Message Data |
|---|---|
| SELECT MERGE(*).* | Input<br>{<br>  "name": "art",<br>  "age": 12,<br>  "items": [0],<br>  "skills": {<br>    "work": ["robots"]<br>  }<br>},<br>{<br>  "name": "art",<br>  "age": 13,<br>  "items": ["car"],<br>  "skills": {<br>    "home": ["cooking"]<br>  }<br>}<br>Output<br>{<br>  "name": "art",<br>  "age": 13,<br>  "items": ["car"],<br>  "skills": {<br>    "work": ["robots"],<br>    "home": ["cooking"]<br>  }<br>} |

| Filter | Message Data |
|---|---|
| SELECT MERGE(top.*) AS merge | Input<br>{"top": { }, "garbage": 0},<br>{"top": {"name": "art", "eyes": "blue"}},<br>{"top": {"name": "joy", "height": 170}}<br>Output<br>{"merge": {"name": "joy", "eyes": "blue", "height": 170}} |

Generally, for aggregative functions and for filters that only include a SELECT(expr) statement, only the latest value for any JSON key in the message data from the last message received can be stored and returned. Therefore, if the most recent message received that satisfies the filter statement is missing a key value identified in a previously processed message, that value is not included in the aggregate, which could result in data loss. However, filters that also include the MERGE(*) function can retain the most recent value for all keys that appear in messages to an unlimited JSON object depth. Accordingly, the most recent version of all key values can be retained in the aggregate.

The MERGE(*) function can be used to ensure that associated values for all keys that appear in any message during the aggregation period also appear in the final aggregated message. For example, a channel may track the physical location of an object in three dimensions: x, y, and z. During an aggregation period of one second, two messages are published to the channel, one having only two parameters: OBJ{x:1, y:2, z:3} and OBJ{x:2, y:3}. In the second message, the z value did not change and was not included in the second message. Without the MERGE(*) function, the output result would be OBJ{x:2, y:3}. Because the z value was not present in the last message in the aggregation period, the z value was not included in the final aggregate. However, with the MERGE(*) function, the result is OBJ{x:2, y:3, z:3}.

The following table shows one set of rules that may be used to aggregate data in messages, depending on the type of data. For arrays, elements need not be merged, but instead JSON values can be overwritten for the array in the aggregate with the last array value received.

| Type of JSON Data | Data to Aggregate {msg1}, {msg2} | Without MERGE (*) | With MERGE (*) |
|---|---|---|---|
| Additional key/value | {a: 1, b: 2}, {c: 3} | {c: 3} | {a: 1, b: 2, c: 3} |
| Different value datatype | {a: 2}, {a: "2"} | {a: "2"} | {a: "2"} |
| Missing key/value | {a: 2}, { } | {a: 2} | {a: 2} |
| null value | {a: 2}, {a: null} | {a: null} | {a: null} |
| Different key value | {a: {b: 1}}, {a: {c: 2}} | {a: {c: 2}} | {a: {b: 1, c: 2}} |
| Arrays | {a: [1, 2]}, {a: [3, 4]} | {a: [3, 4]} | {a: [3, 4]} |

The query instructions can be comprised of one or more suitable filter commands, statements, functions, or syntax. For purposes of illustration and not limitation, in addition to the SELECT and MERGE functions, the query instructions can include filter statements or functions, such as, for example, ABS(expr), AVG(expr), COALESCE(a[, b . . . ]), CONCAT(a[, b . . . ]), COUNT(expr), COUNT DISTINCT (expr), IFNULL(expr1, expr2), JSON(expr), MIN(expr[, expr1, . . . ]), MAX(expr[, expr1, . . . ]), SUBSTR(expr, expr1[, expr2]), SUM(expr), MD5(expr), SHA1(expr), FIRST_VALUE(expr) OVER (ORDER BY expr1), and/or LAST_VALUE(expr) OVER (ORDER BY expr1), where "expr" can be any suitable expression that is capable of being processed by a filter statement or function, such as, for example, a SQL or SQL-like expression. Other suitable filter commands, statements, functions, or syntax are possible for the query instructions.

According to the present invention, non-filtered queries can translate to an immediate copy of the message to the subscriber, without any JSON or other like processing. Queries that include a SELECT filter command (without aggregation) can translate into an immediate filter. In instances in which the messages are formatted using JSON, each message may be individually parsed and any WHERE clause may be executed directly on the individual message as it arrives, without the need for creating indices or other temporary data structures. If the messages pass the WHERE clause filter, the SELECT clause results in a filtered message that can be converted back to its original format or structure (e.g., JSON) and sent to the subscriber.

Aggregative functions, such as, for example, COUNT( ), SUM( ), AVG( ), and the like, can translate into an immediate aggregator. In instances in which the messages are formatted using JSON, each message may be individually parsed and any WHERE clause may be executed directly on the individual message as it arrives, without the need for creating indices or other temporary data structures. If a WHERE clause is evaluated, messages passing such criteria are aggregated (e.g., aggregates in the SELECT clause are executed, thereby accumulating COUNT, SUM, AVG, and so forth) using the previous accumulated value and the value from the individual message. Once per aggregation period (e.g., every 1 second), the aggregates are computed (e.g., AVG=SUM/COUNT), and the SELECT clause outputs the aggregated message, which can be converted to its original format or structure (e.g., JSON) and sent to the subscriber.

More complex aggregative functions, such as, for example, GROUP BY, JOIN, HAVING, and the like, can be translated into a hash table aggregator. Unlike SELECT or other like functions that can use a constant memory, linearly expanding memory requirements can be dependent upon the results of the GROUP BY clause. At most, grouping by a unique value (e.g., SSN, etc.) can result in a group for each individual message, but in most cases grouping by a common data element (e.g., user_id or other repeating value) can result in far fewer groups. In practice, each message is parsed (from its JSON format, for example). The WHERE clause can be executed directly on the individual message as it arrives, without creating indices or other temporary structures. If the WHERE clause is satisfied, the GROUP BY expressions can be computed directly and used to build a hash key for the group. The aggregative functions in the SELECT clause can be executed, accumulating COUNT, SUM, AVG, or other functions using the previous accumulated value specific for the hash key (group) and the value from the individual message. Once per aggregation period (e.g., every 1 second), the aggregates are computed (e.g., AVG=SUM/COUNT) for each hash key (group), and the SELECT clause can output the aggregated message for each hash key to be converted back to its original format or structure (e.g., JSON) and sent to the subscriber (e.g., one message per hash key (group)).

In embodiments in which the aggregation period is limited (e.g., 1 second-60 seconds) and the network card or other hardware/throughput speeds may be limited (e.g., 10/gbps), the overall maximal memory consumption can be calculated as time*speed (e.g., 1 GB per second, or 60 GB per minute). Hence, the upper bound is independent of the number of subscribers. In certain implementations, each message only need be parsed once (e.g., if multiple filters are set by multiple clients) and only if needed based on the query instructions, as an empty filter does not require parsing the message.

Figure 7A:
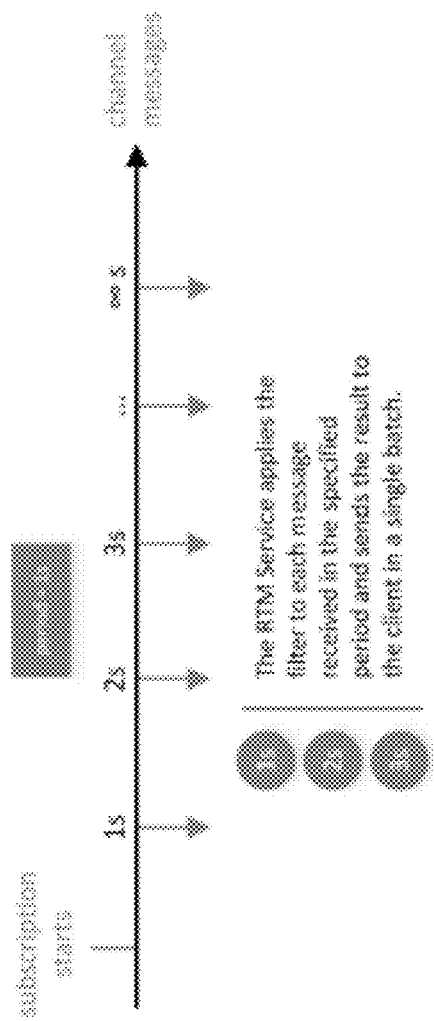
FIGS. 7A-7D are illustrations of how messages may be processed using query instructions that include a period-based parameter.

Referring to FIG. 7A, subscriptions can include a "period" parameter, generally defined in, for example, seconds and in some embodiments can range from 1 to 60 seconds, although other time increments and time ranges are possible. The period parameter(s) can be purely sequential (e.g., ordinal) and/or time-based (e.g., temporal) and included in the self-described data and therefore available for querying, aggregation, and the like. For example, FIG. 7A illustrates the filter process according to the present invention for the first three seconds with a period of 1 second. In the present example, the subscription starts at t=0. The filter created from the query instructions is applied against all messages received during each 1-second period (e.g., one message at a time). The results for each period are then batched and forwarded to the subscriber. Depending on the query instructions used, the messages can be aggregated using the aggregation functions discussed previously before the message data is sent to the subscriber.

In some cases, the process defaults to sending only new, incoming messages that meet the query instructions on to the subscriber. However, a subscriber can subscribe with history and use a filter, such that the first message or messages sent to the subscriber can be the historical messages with the filter applied. Using the period of max_age and/or a "next" parameter provides additional functionality that allows for retrieval and filtering of historical messages.

Figure 7B:
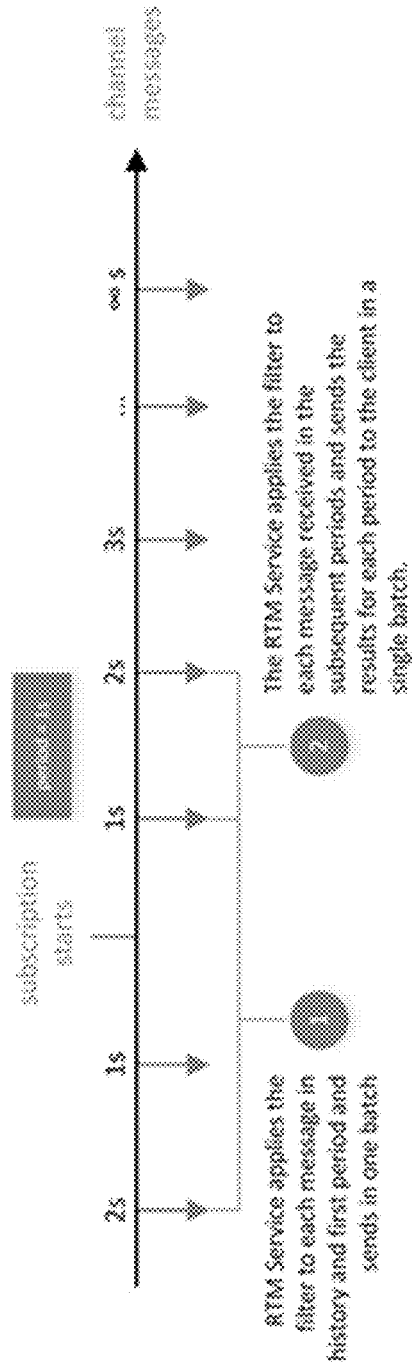

More particularly, a max_age parameter included with the query instructions can facilitate the retrieval of historical messages that meet this parameter. FIG. 7B illustrates an example of a max_age parameter of 2 seconds (with a period of 1 second) that is provided with the query instructions. The filter created from the query instructions is applied to the historical messages from the channel that arrived from t−2 through t=0 (t=0 being the time the subscription starts), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on to the subscriber.

Figure 7C:
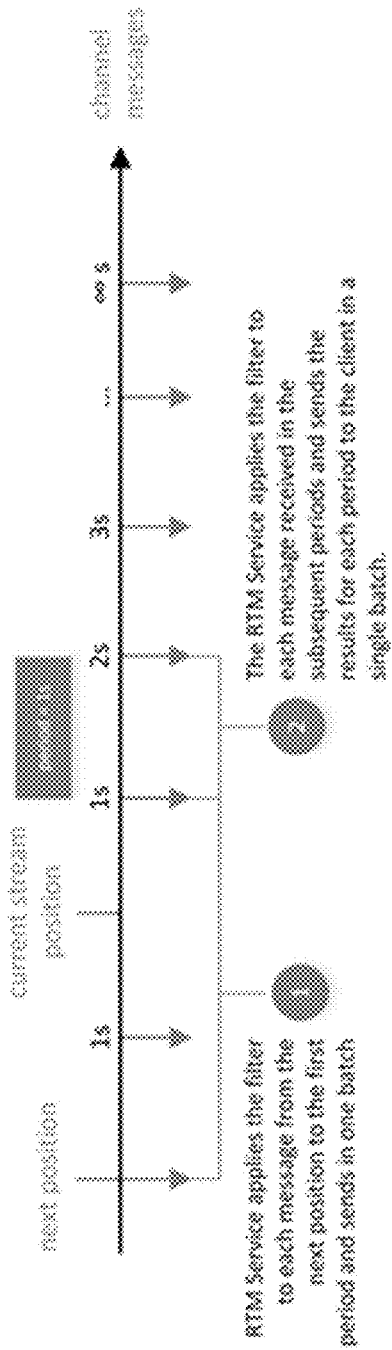

When a subscriber subscribes with a "next" parameter to a channel with a filter, the filter can be applied to all messages from the next value up to the current message stream position for the channel, and the results can be sent to the subscriber in, for example, a single batch. For example, as illustrated in FIG. 7C, a next parameter is included with the query instructions (with a period of 1 second). The next parameter instructs the process to apply the filter created from the query instructions to each message from the "next position" up through the current stream position (e.g., up to t=0) and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber.

Figure 7D:
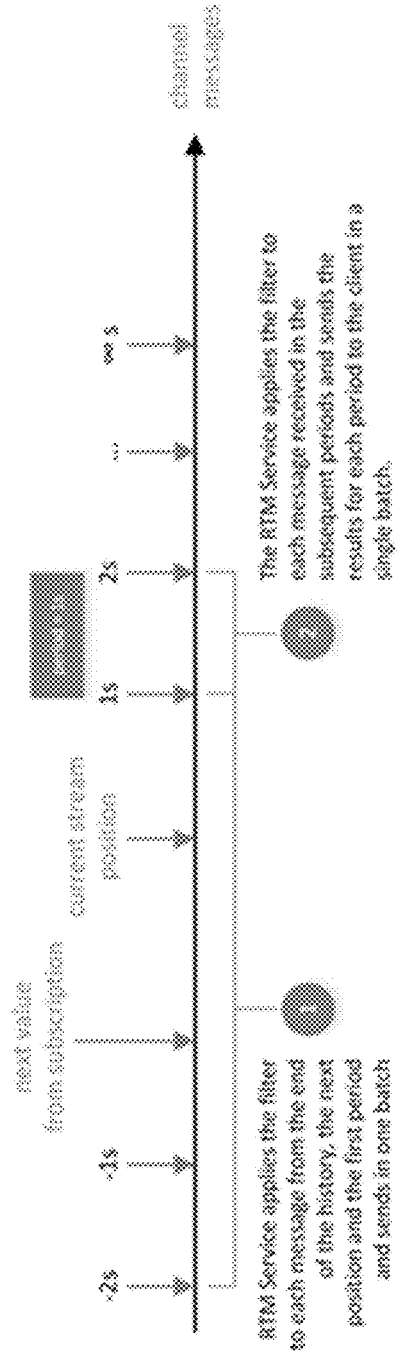

When a subscriber subscribes with a next parameter, chooses to receive historical messages on a channel, and includes a filter in the subscription, the subscriber can be updated to the current message stream position in multiple batches. FIG. 7D illustrates an example of a max_age parameter of 2 seconds (with a period of 1 second) and a next parameter that can be combined into one set of query instructions. The filter created from the query instructions is applied to the historical messages from the channel that arrived from the end of the history to the "next" value of the subscription (i.e., from 2 seconds before the next value up to the next value), to the messages from the next value to the current stream position (e.g., up to t=0), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber. Consequently, historical messages can be combined with messages that start at a particular period indicator and batched for transmission to the subscriber.

The query instructions can define how one or more filters can be applied to the incoming messages in any suitable manner. For example, the resulting filter(s) can be applied to any or all messages arriving in each period, to any or all messages arriving across multiple periods, to any or all messages arriving in select periods, or to any or all messages arriving on a continuous or substantially continuous basis (i.e., without the use of a period parameter such that messages are not retained before returning them to the subscriber). Such filtered messages can be batched in any suitable manner or sent individually (e.g., one message at a time) to subscribers. In particular, the filtered messages can be sent to the subscriber in any suitable format or syntax. For example, the following illustrates the structure of several fields of a sample channel PDU that contains the message results from a filter request:

```
{
   "action": "channel/data",
   "body": {
      "channel": ChannelName
      "next": ChannelStreamPosition
      "messages": [ChannelData]+    // Can be one or more messages
   }
}
```

In the above channel PDU, the "channel" field can be a value (e.g., string or other appropriate value or designation) of the channel name to which the subscriber has subscribed. The "next" field can provide the channel stream position of the batch of messages returned in the channel PDU. The "messages" field provides the channel data of the messages resulting from application of the specified filter. One or more messages can be returned in the "messages" field in such a channel PDU. It is noted that a channel PDU can include any other suitable fields, parameters, values, or data.

Figure 8:
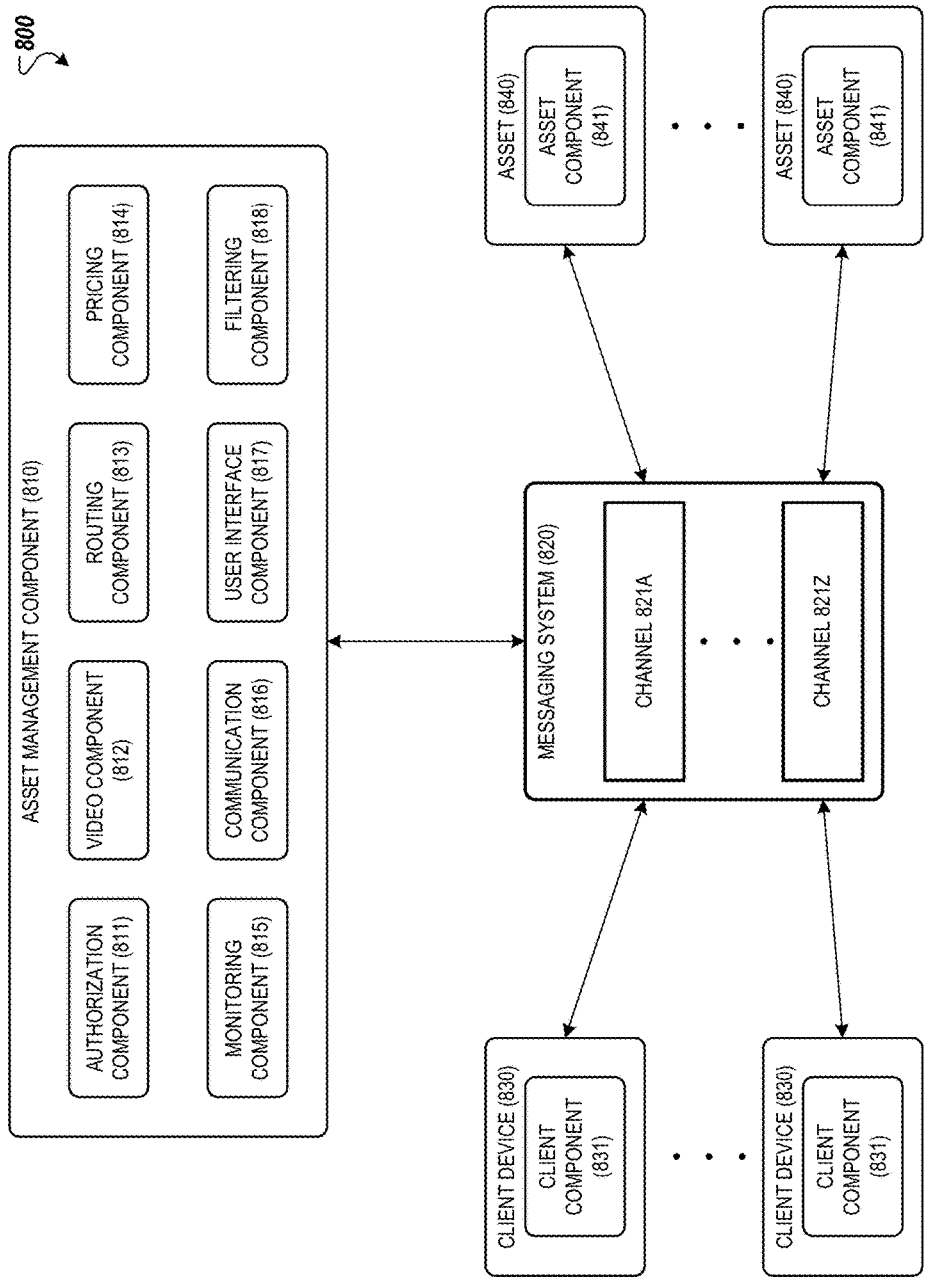
FIG. 8 is a diagram of an example system architecture that may be used to manage and track assets that may be associated with an organizational entity.

FIG. 8 is a diagram of an example system architecture 800 that may be used to manage and track assets that may be associated with an organizational entity. The system architecture 800 includes an asset management component 810, a messaging system 820, client devices 830, and assets 840. In one embodiment, the system architecture 800 may be operated by an organizational entity. An organizational entity may be a company, a government entity (e.g., a city government, a state government, etc.), or some other organization that may wish to track and manage the assets 840 in a geographical area. Administrators, supervisors, managers, inspectors, or other like users of the organizational entity who may wish to track and management the assets 840 in the geographical area may be referred to herein as administrators or administrative users.

In one embodiment, an asset 840 may be a person or a physical object that may be associated with an organizational entity. For example, an asset may be an employee of a company or corporation. In another example, an asset may be a bus that provides public transportation along one or more routes for a city. The asset 840 may be associated with an organizational entity if the asset 840 is owned by the organizational entity, is used by the organizational entity, is operated by the organizational entity, works for the organizational entity, or is located in a geographical area associated with the geographical entity. For example, the company or corporation may purchase a shuttle bus to transport employees. In another example, a parking lot may be located within the boundary or borders of a city. In one embodiment, an asset 840 may have an operator when the asset 840 is a physical object. For example, a bus (e.g., an asset 840) may have a bus driver (e.g., an operator). In another example, a parking lot (e.g., an asset 840) may have a parking lot attendant or a person who owns or operates the parking lot (e.g., an operator). The operator of an asset 840 may be referred to herein as an operator.

In one embodiment, an asset 840 may be a transportation asset. A transportation asset may be physical object that may provide public transportation or private transportation services for a geographical area. Examples of transportation assets may include, but are not limited to, cars, buses, coaches, taxis, passenger trains, commuter rails, ferries, traffic lights, ridesharing vehicles, street lights, parking spaces, parking meters, parking garages, parking lots, road constructions, road signs, street cameras, trolleybuses, light rail, trams, subways, rapid transit, aerial tramways, auto rickshaws, school buses, postal service vehicles, emergency response vehicles (e.g., police cars, ambulances, firetrucks), aerial drones, autonomous vehicles, etc.

Each asset 840 may include an asset component 841. In one embodiment, the asset components 841 may include computing devices (e.g., smartphones, tablet or laptop computers, PDAs, etc.) or may include software components (e.g., applications, software, apps, software services) executing on the one or more computing devices located in assets 840. For example, the asset components 841 may be smartphones or may be applications executing on a smartphone. The asset component 841 may present or display various graphical user interfaces (GUIs) to the operator of the asset 840. For example, the asset component 841 may be an app that displays a GUI that may display routes on a map, display geographical locations where passengers are waiting, etc. The GUIs provided, presented, or displayed by an asset component 841 may be referred to herein as operator GUIs. The asset components 841 may also include other types of devices, such as a radio-frequency identification (RFID) sensor, device, scanner or reader, Internet of Things (IoT) sensor or device, a bar code scanner or reader, a card reader, a global positioning system (GPS) receiver or other suitable device capable of determining the live location of the asset 840, etc.

In one embodiment, an asset component 841 may publish one or more messages to one or more of the channels 821A through 821Z. This may allow the asset component 841 to publish messages to various other components or portions of the system architecture 800. For example, this may allow the asset component 841 to publish messages to the asset management component 810, to other assets 840, or to client components 831. In another embodiment, an asset component 841 may also subscribe to one or more of the channels 821A through 821Z. This may allow the asset component 841 to receive messages from various other components or portions of the system architecture 800. For example, this may allow the asset component 841 to receive messages from the asset management component 810, from other assets 840 or asset components 841, or from client components 831.

In some embodiments, one or more assets 840 may be associated with a price or a rate (e.g., a cost over time) for using the respective asset 840. For example, a bus (e.g., an asset 840) may be associated with a price for taking a ride on the bus as the bus travels along a route. In another example, a parking space (e.g., an asset 840) may be associated with a price or a rate for parking in the parking space. The prices or rates associated with the one or more assets 840 may be changed or updated by the asset management component 810, as discussed in more detail below. An asset 840 may also be associated with multiple prices or rates. For example, a parking space may have a first price during work hours and a second price after work hours.

In one embodiment, a client device 830 may be a computing or electronic device of a user who may utilize or use one or more of the assets 840. The users may also want to be aware of the conditions, timeliness, wait times, etc., for the assets 840. Examples of computing or electronic devices may include smartphones, personal digital assistants (PDAs), tablet computers, laptop computers, desktop computers, gaming consoles, cellular phones, media players, etc. Each client device 830 includes client component 831. In one embodiment, the client components 831 may include software components executing on the client devices 830. For example, the client components 831 may be applications, software, apps, software services, etc., that are executing on the client devices 830. The client component 830 may provide, present, or display various graphical user interfaces (GUIs) to the user of client device 830. For example, the client component 831 may be an app that displays a GUI that includes maps, tables, charts, text, images, etc. In another example, the client components 831 may be web browsers executing on the client devices 830. The GUIs provided, presented, or displayed by a client component 831 of may be referred to herein as user GUIs.

In one embodiment, a client component 831 may publish one or more messages to one or more of the channels 821A through 821Z. This may allow the client component 831 to publish messages to various other components or portions of the system architecture. For example, this may allow the client component 831 to publish messages to the asset management component 810, to one or more assets 840, or to other client components 831. In another embodiment, a client component 831 may also subscribe to one or more of the channels 821A through 821Z. This may allow the client component 831 to receive messages from various other components or portions of the system architecture 800. For example, this may allow the client component 831 to receive messages from the asset management component 810, from assets 840 or asset components 841, or from other client components 831. Client components 831 are discussed in more detail below.

In one embodiment, the messaging system 820 may support the PubSub communication pattern, as described earlier in reference to FIGS. 1A through 5D. The messaging system 820 may be referred to as a PubSub system or a PubSub messaging system. The PubSub system 820 can include or otherwise support any suitable number of channels, such as, for example, channels 821A through 821Z. The messages published to channels 821A through 821Z (e.g., channel streams) may be divided into streamlets, which may be stored within Q nodes of the messaging system 820, as described earlier in reference to FIGS. 1A through 5D. C nodes of the messaging system 820 may be used to offload data transfers from one or more Q nodes (e.g., to cache some of the streamlets stored in the Q nodes). Client devices 830 and assets 840 may establish respective persistent connections (e.g., TCP connections or the like) to one or more MX nodes. The one or more MX nodes may serve as termination points for these connections, as described earlier in reference to FIGS. 1A through 5D. A configuration manager (illustrated in FIG. 2) may allow users (e.g., client components 831) and assets (e.g., asset components 841) to subscribe to channels and to publish to channels. For example, the configuration manager may authenticate users to determine whether users are allowed to publish to a channel. In another example, the configuration manager may authenticate vehicles to determine whether vehicles are allowed to subscribe to a channel.

In one embodiment, the messages that are published or received via the channels 821A through 821Z may be include information or data associated with the assets 840. For example, the message may include live geographical locations, status, metrics or other performance-related information, utilization rates, or other like information or data of or about the assets 840. Each message may be stored in a respective buffer for the channel associated with the message. The messages in the respective buffer may be stored according to an order, as discussed above. For example, messages in a buffer may be stored in the order in which the messages were published to a respective channel. Each buffer may have an expiration time based on when the buffer was allocated to a respective channel, as discussed above. The messaging system 820 may retrieve messages for the particular channel from one or more buffers allocated to the channel that have not expired and according to the order.

In one embodiment, the asset management component 810 may include one or more computing devices (e.g., one or more server computers) or may include software components executing on the one or more computing devices. For example, the asset management component 810 may be an application that is executing on or distributed among one or more server computers. As illustrated in FIG. 8, the asset management component 810 can include, for example, an authorization component 811, a video component 812, a routing component 813, a pricing component 814, a monitoring component 815, a communication component 816, a user interface component 817, and a filtering component 817.

In one embodiment, the asset management component 810 may allow administrators to manage, track, utilize, control, and communicate with the assets 840 that are associated with an organizational entity. For example, the asset management component 810 may allow administrators or users to view the live geographical locations of or other appropriate information about the assets 840. In another example, the asset management component 810 may allow administrators users to view the utilization rates of the assets 840. In a further example, the asset management component 810 may allow administrators to control the pricing of an asset 840. In another example, the asset management component 810 may allow administrators or users to determine performance metrics for the assets 840. In a further example, the asset component 810 may allow administrators to view the conditions or statuses of an asset 840 (e.g., to view the level of a gas tank in a bus, to view the tire pressure of one or more tires of a bus, to determine that a bus has a flat tire, etc.). Generally, the asset management component 810 may allow the user to view any type of information or data about the assets 840 that may be managed, collected, tracked, etc. For example, the asset management component 810 may display, present, or provide various metrics, statistics, performance information, etc. regarding each asset. In one embodiment, the asset management component 810 may allow a single administrator (e.g., a single person) to monitor, control, and manage all of the assets 840 within the geographical area. For example, the asset management component 810 may allow a single person to monitor, control, and manage all of the transportation assets within city (or other geographical area).

In one embodiment, the asset management component 810 may allow an administrator to add one or more assets 840 to or remove one or more assets 840 from the system architecture 800. For example, the asset management component 810 may allow an administrator to add a bus to the system architecture 800. In another example, the asset management component 810 may allow a user to remove a shuttle from the system architecture 800. The asset management component 810 may provide one or more administrator GUIs that may allow the administrator to provide identifying information for an asset 840 (e.g., a serial number, make or model number of a car, etc.). The asset management component 810 may also allow the administrator to indicate a price for use of the asset 840. The asset management component 810 may further allow the user to provide various other information or data associated with the asset 840.

In one embodiment, the asset management component 810 may allow an administrator to add one or more operators of assets 840, to remove one or more operators of assets 840, and to associate different operators with different assets 840. For example, the asset management component 810 may change the driver of a bus from one person to another person. In another example, the asset management component 810 may allow an administrator to add a new driver, which may be assigned to drive different buses or shuttles, to the system architecture 800. The asset management component 810 may provide one or more administrator GUIS that may allow the administrator to add, remove, or associate operators with different assets 840 (e.g., assign operators to different assets 840).

In one embodiment, the asset management component 810 may allow an administrator to specify or indicate the types and amounts of data, information, statistics, or performances metrics that should be tracked, collected or managed. For example, the asset management component 810 may allow a user to indicate that assets 840 should provide their live geographical locations every second, or every two seconds. In another example, the asset management component 810 may allow an administrator to indicate that the assets 840 should provide information about their speeds but not about their fuel consumption or fuel efficiency. The asset management component 810 may provide one or more administrator GUIS that may allow the administrator to specify or indicate the types and amounts of data, information, statistics, or performances metrics that should be tracked, collected or managed.

In one embodiment, the asset management component 810 may allow an administrator to add, remove, or change travel routes for different assets 840. For example, the asset management component 810 may allow an administrator to add a new route to the system architecture 800. The asset management component 81 may also allow the administrator to indicate the stops for a travel route (e.g., the geographical locations where an asset 840, such as a bus, should stop along the travel route to pick up passengers). In another example, the asset management component 810 may allow an administrator to remove a bus route from the system architecture. In a further example, the asset management component 810 may allow and administrator to modify or change a travel route. For example, the asset management component 810 may allow an administrator to add a stop to a travel route, move a stop in the travel route, remove a stop in the travel route, change the roads or highways used in a travel route, change the distance or length of a travel route, etc. The asset management component 810 may also allow the administrator to associate travel routes with different assets 840. For example, the asset management component 810 may allow the administrator to associate a first bus with a travel route one day and associated a second bus with the same travel route the next day (e.g., reassign the second bus to the travel route the next day). The asset management component 810 may provide one or more administrator GUIS that may allow the administrator to add, remove, or change travel routes for different assets 840.

In one embodiment, the monitoring component 815 may allow the asset management component 810 to track the geographical locations and movements of the assets 840. For example, the monitoring component 815 may receive messages from a postal service vehicle (e.g., an asset 840) via a channel of the messaging system 820, where the postal service vehicle publishes messages about its current geographical location. The monitoring component 815 may determine the geographical locations and track the movements of the postal service vehicle based on the messages published by (or on behalf of) the vehicle.

In one embodiment, the routing component 813 may determine live predictions or estimations of an arrival time for an asset 840. For example, when a client device 830 or a user requests to view the current status or geographical location of a shuttle, the routing component 813 may provide a live prediction that the shuttle will arrive at the user's location at a certain time. In another embodiment, the routing component 813 may also determine live predications or estimations of departure times for an asset 840. For example, the routing component 813 may analyze messages published by an asset 840 that indicate the geographical locations (e.g., GPS coordinates) of the asset 840. The routing component 813 may also determine how long an asset 840 previously stayed at a stop along a route. The routing component 813 may estimate an estimated departure time from the stop, based on how long the asset 840 previous stayed at the stop.

In one embodiment, the routing component 813 may analyze a history of previous trips taken by assets 840 over predetermined time periods to generate a plurality of trip models for the assets 840. For example, the routing component 813 may analyze the last few trips or routes traveled by the assets 840 in a geographical area. The routing component 813 may analyze the speeds of the assets 840, changes in speeds, the amount of time waiting at stoplights or traffic lights, etc. Based on this analysis, the routing component 813 may generate the plurality of trip models, as discussed in more detail below. The trip models may be used to predict or estimate the arrival time of an asset 840, as discussed in more detail below. For example, the routing component 813 may analyze a current route or trip of an asset 840. The routing component 813 may select a trip model that most closely represents the current route or trip of the asset 840. For example, the routing component 813 may determine that an asset 840 is experience traffic along a route or a trip. The routing component 813 may select a trip model that may be used predict arrival times during periods of traffic (e.g., during rush hour).

In one embodiment, the user interface component 817 may display one or more of the live geographical locations, live arrival times, or any other suitable information of or about assets 840 to one or more administrators. For example, the user interface component 817 may present a graphical user interface (GUI), which may be displayed to the administrator via a web page that is hosted by the user interface component 817. The administrator may view the web page using a browser located on a computing device of the administrator. For example, the administrator may use a web browser on a table computer of the administrator, to view the web page which may present the GUI to the administrator. The GUI may display various types of information of or about the assets 840 such as, for example, a map of a geographical area, the live geographical locations of assets 840 on the map, or one or more estimated arrival times of the assets 840, information about assets such as statistical information, utilization, performance information, etc., as discussed in more detail below. The types of information about the assets 840 that are described herein are merely examples and other types of information about the asset 840 may be managed, collected, tracked, or displayed by the asset management component 810. The various GUIs that may be provided, presented, or displayed to an administrator may be referred to as administrator GUIs. The administrator GUIs may also allow the administrator to manage, monitor, and control any or all of the assets 840 in the geographical area. In some embodiments, the asset management component 810 may provide information to a client component 831 to allow the client component 831 to display one or more of the live geographical locations or live arrival times of assets 840. For example, the asset management component 810 may publish messages to one or more channels 821A through 821Z of the messaging system 820. The messages may indicate the live geographical locations or live arrival times of the assets 840. The client component 831 may receive the messages and may present a user GUI to the user to display the live geographical locations or the live estimated arrival times.

In one embodiment, the monitoring component 815 may monitor the live user demand for the assets 840. For example, the monitoring component 815 may determine how many users are currently requesting to view a bus route or the live geographical location for the bus. In another example, the monitoring component 815 may determine how many users are currently reserving rides on a shuttle. In another embodiment, the monitoring component 815 may also identify (live) changes in the demand from users for the assets 840. For example, the monitoring component 815 may determine that an increasing number of users are currently requesting a particular bus. In another example, the monitoring component 815 may determine that more and more parking spaces are becoming available in a parking lot.

In one embodiment, the monitoring component 815 may reallocate or reroute one or more assets 840 based on the live user demand. For example, the monitoring component may add additional buses to a route in response to determining that an increased number of users are requesting rides along the route. In another example, the monitoring component 815 may determine that more and more users are parking in a parking garage. The monitoring component 815 may open up additional spaces and/or levels of the parking garage to allow more users to park in the parking garage.

In one embodiment, a pricing component 814 may change the pricing for one or more assets 840 based on the change in user demand for the one or more assets 840. The pricing component 814 may make live changes to the pricing of the assets 840 to incentivize users to use different or alternative types of assets 840. For example, if fewer and fewer parking spaces are available in a parking lot for a sports stadium, the pricing component 814 may increase the prices for the remaining parking spaces in the stadium parking lot. The pricing component 814 may also correspondingly decrease the price of buses and trains that have routes which travel to the sports stadium. This may incentivize users to take buses and trains rather than drive to the sports stadium.

In one embodiment, the routing component 813 may receive an indication from a user that the user wants to travel from a first geographical location to a second geographical location. The routing component 813 may determine a travel route from one geographical location to another geographical location. The routing component 813 may determine the travel route based on, for example, one or more of the live geographical locations of the assets 840 and live estimated arrival times of the assets 840, as well as other appropriate route planning information. The routing component 813 may also determine the travel route based on performance metrics, statics, and other data about the assets 840. For example, the routing component 831 may use the wait times for traffic lights along different travel route to determine whether one travel route may be faster than another travel route. The routing component 813 may recommend the travel route to the user. For example, the routing component 813 may publish messages with data indicating the route to a client component 831, which can use such data to display the route to the user on a map via a user GUI provided, presented, or displayed by the client component 831. The routing component 813 may also determine an estimated time of arrival for the user at the second geographical location or may determine an estimated travel time. For example, the routing component 813 may determine the estimated time of arrival for a travel route and may publish a message indicating the estimated time of arrival to a channel of the messaging system 820. The client component may receive the message via the channel and the user GUI presented by a client component 831 may display the estimated time of arrival. In some embodiments, the travel route may use multiple types of assets or may use multimodal transportation. For example, the travel route may use both public transportation assets (e.g., public transit such as buses, trams, trolleys, etc.) and private transportation assets (e.g., taxis, ridesharing vehicles, etc.).

In one embodiment, the routing component 813 may receive a request from a user for an asset 840 to travel to a particular geographical location. For example, a user may publish a message on a particular channel of the messaging system 820 requesting an asset 840 to take the user to a geographical location. The message may include an identifier for the user (e.g., a user name, an electronic mail (email) address, an alphanumeric value, an identification number, a phone number, a value that may be used to identify the user, etc.). The routing component 813 may subscribe to the particular channel to receive these requests to change routes from the users. The routing component 831 may publish a message to an asset component 841 to instruct an operator to pick up the user at the specified geographical location.

The routing component 813 may publish messages indicating an estimated time of arrival for an asset 840 at a geographical location, may publish messages indicating that an asset 840 is within a threshold distance of a geographical location (e.g., within two hundred meters or other suitable distance), or may publish messages indicating that the asset 840 will arrive at a geographical location within a period of time (e.g., within the next five minutes or other appropriate time period). Each message may include, for example, the time (e.g., within five minutes) or distance (e.g., within two hundred meters) and the geographical location. Other information in such messages is possible.

In one embodiment, the routing component 813 may track the user or the user's client device 830 as the user travels or moves along the travel route using one or more assets 840, or may track the live geographical locations of the asset(s) 840 that is/are being used by the user. For example, the client component 831 of the user's client device 830 may continuously or periodically publish messages indicating the current geographical location of the client device 830 to one or more of the channels 821A through 821Z. In another example, an asset component 841 may continuously or periodically publish messages every second, every two seconds, etc., indicating the current geographical location of the client device 831 to one or more of the channels 821A through 821Z.

The routing component 813 may analyze one or more of the messages published by the client component 831 or the asset component 841 to determine whether the user will arrive at the second geographical location by the estimated time of arrival or within a threshold of the estimated time of arrival. If the routing component 813 determines that the user may not arrive at the at the second geographical location by the estimated time of arrival or within a threshold of the estimated time of arrival, the routing component 813 may determine a second travel route or an updated travel route that may allow the user to arrive at the second geographical location more quickly. For example, there may a disruption or problem along the travel route of the user due to traffic, a car accident, a malfunctioning traffic light, etc., which may cause the user to arrive after the estimated time of arrival. The routing component 813 may determine the second travel route based on one or more of the live geographical locations of the assets 840 and live estimated arrival times of the assets 840, as discussed above. The second travel route may use different assets 840 or may use some of the assets 840 that were used in the first travel route. The routing component 813 may recommend the second travel route to the user, as discussed above. If the routing component 813 cannot determine a second travel route that may allow the user to arrive at the second geographical location more quickly, then routing component 813 may provide a revised estimated time of arrival for the first travel route The routing component 813 may also provide new travel routes to operators of the assets 840 based on the determination of whether the user will arrive at the second geographical location by the estimated time of arrival or within a threshold of the estimated time of arrival. For example, if the routing component 813 determines that there is traffic on a highway used in a first travel route for an asset 840 based a video of the highway that was analyzed by the video component 812, the routing component 813 may identify one or more other travel routes that may avoid the use of the highway. The routing component 813 may publish one or more messages to a channel of the messaging system 820 to provide the one or more travel routes to the asset 840. The asset 840 may selected one of the one or more travel routes to avoid the highway.

In one embodiment, the monitoring component 815 may provide one or more administrator GUIs to administrators, supervisors, managers, inspectors, or other like users of the organizational entity. The administrators, supervisors, managers, inspectors, or other like users of the organizational entity may monitor the usage, utilization, statuses, performance, conditions, geographical locations, problems, etc. of the assets 840 using the system architecture 800. The monitoring component 815 may also monitor the live geographical location of the users of the client devices 830, such as passengers. The live geographical locations of the users may allow the routing component 813 to determine travel routes or trips for the users, based on their live geographical locations. The one or more administrator GUIs that are presented to the users may allow the administrators, supervisors, managers, inspectors, or other like users of the organizational entity to view all of the assets 840 that may be associated with the organizational entity and to view information related to the assets 840 such as, for example, performance metrics, statistics, utilizations, incidents, problems, etc.

In one embodiment, the monitoring component 815 may display the live locations of the assets 840 in a geographical location. For example, the monitoring component may present an administrator GUI that displays a map of a geographical area, such as a few square blocks of a city, a city, a municipality, a county, a state, a province, a country, or other suitable geographical region. The map may show the live geographical locations of the assets 840 in the geographical area. The geographical locations of the assets 840 may be updated on the map live, as the assets 840 move through the geographical area. For example, the geographical location of an asset 840 may be updated within a second, a few seconds, etc., of the asset 840 moving to another geographical location. In another embodiment, the monitoring component 815 may also display the live locations of users of the assets 840 in a geographical location. For example, the monitoring component 815 may display the live locations of all passengers who are requesting the use of a particular asset 840.

In one embodiment, the monitoring component 815 may display live performance metrics of each or a collection of the assets 840 in the geographical area. For example, the monitoring component 815 may present an administrator GUI that displays a list of assets 840. The list may also present one or more live performance metrics for the assets 840 in the list. For example, the one or more live performance metrics may be displayed next to a respective asset 840. In another example, an administrator may select one of the assets 840 via the administrator GUI and the live performance metrics for the selected asset 840 may be displayed to the administrator.

As discussed above, the assets 840 may be transportation assets, such as buses, trains, shuttles, etc. In one embodiment, the performance metrics may indicate the usage, arrival times, etc., of the transportation assets. For example, the performance metrics may include a count of the assets 840 in service, a count of users for each asset 840 in service, a count of tickets sold for each asset 840 in service, an occupancy rate of each asset 840 in service, an average occupancy of all assets 840 in service, a speed of each asset 840 in service, an average speed of all assets 840 in service, and a timeliness of each asset 840 in service (e.g., whether bus arrives at a stop on time or within a window of a specified time, how late or early the bus arrives at the stop, etc.). Other performance metrics are possible.

In one embodiment, the monitoring component 815 may forward or republish some or all of the messages published by the asset components 841. This may allow the users (e.g., client devices 830 or client components 831) to receive messages indicating the live locations of the assets 840. This may also allow the monitoring component 815 to selectively publish a subset of the messages published by the asset components 841. For example, the asset management component 810 may filter out messages (as described earlier in reference to FIGS. 6-7D) from a bus, because a bus may be off duty (e.g., may not be transporting passengers). In another example, an asset component 841 may publish a message every second or other suitable time period, and the monitoring component 815 may publish every other message published by the asset component 841 to reduce the amount of messages that are published to the messaging system 820. In another embodiment, the users may be subscribed to a channel where an asset component 841 publishes messages. This may allow the users to directly receive messages that are published by the asset component 841.

In one embodiment, the monitoring component 815 may record a data history for one or more of the assets 840 or the client devices 830. For example, the data history for an asset 840 may indicate the on-timeliness of the asset 840 (e.g., whether the asset is on time, how late an asset is, etc.). The monitoring component 815 may display or present at least a portion of the data history recorded for one or more assets 840 on an administrator GUI. For example, the monitoring component 815 may display a graph indicating the whether an asset 840 is on-time or how long an asset is delayed for various stops along a route.

In one embodiment, the filtering component 818 may filter one or more messages published to the channels 821A through 821Z to transform information regarding at least one characteristic of one or more assets 840 requested by a user of the assets 840 (e.g., a passenger) or by an administrator. For example, the filtering component 818 may query search the messages published to the at least one messaging channel by the transportation assets to inspect information regarding at least one characteristic of one or more transportation assets requested by the user. For instance, a user may specify that the user only wants to travel using buses. The type of the asset (e.g., a bus) may be a characteristic of the one or more assets 840. The filtering component 818 may filter the messages indicating the live geographical locations of the assets 840 to identify only messages that were published by buses. In another instance, an administrator may specify that the administrator wants to view the estimated arrival times for all trains in a geographical area.

In one embodiment, the video component 812 may allow operators of the assets 840, users of client devices 830, or administrators to manage, view, analyze, process, etc., live video feeds that are provided by one or more assets 840. For example, one or more of the assets 840 may be or may include video cameras, digital cameras, or other appropriate devices for capturing live video. The assets 840 may record or capture live video and/or live audio, and may publish messages with the live video and/or live audio to one or more of the channels 821A through 821Z. The video component 812 may be subscribed to the one or more channels of the messaging system 820, which may allow the video component 812 to receive the video.

In one embodiment, the video component 812 may forward or republish the messages with the live video and/or live audio on other channels of the messaging system 820. This may allow the video component 812 to provide client components 831 and asset components 841 with access to the live video and/or live audio captured by the assets 840. This may also allow the video component 812 to selectively provide portions of the live video and/or live audio to the user components 831 and asset components 841. For example, the video component 812 may republish live video and/or live audio received from traffic cameras, but may not republish live video and/or live audio captured by a taxi. In another embodiment, users may be able to directly subscribe to the channels where an asset 840 may publish messages with live video and/or live audio. For example, a user may directly subscribe to channel where a traffic camera may publish messages that include the live video captured by the traffic camera.

In one embodiment, the video component 812 may analyze the live video and/or live audio captured by one or more assets 840. For example, a traffic camera may provide live video of the cars driving through an intersection. The video component 812 may analyze the live video and may count the number of cars that drive through the intersection during a period of time. The video component 812 may also determine the types of cars that drive the intersection. For example, the video component 812 may determine how many sedans, trucks, SUVs, big rigs, motorcycles, etc., drive through the intersection.

In one embodiment, the video component 812 may process the live video and/or live audio captured by one or more assets 840. For example, the video component 812 may analyze live video of a section of a freeway to identify license plate numbers that appear in the live video. The video component 812 may remove or obscure the license plate numbers in the live video before republishing the modified live video. This may allow the video component 812 to protect the privacy of people who are driving down the section of the freeway while still allowing users, administrators, and operators of assets 840 to view the live video.

In one embodiment, the video component 812 may perform live analysis or live processing of the live video captured by one or more assets 840. For example, the video component 812 may analyze or process the live video within milliseconds or seconds of receiving the live video. This may allow the video component 812 to provide live information to users of the client device 830, operators of the assets 840, or administrators. For example, when traffic occurs due to a sudden car accident on a road, the video component 812 may be able to indicate to passengers, bus drivers, taxi drivers, shuttle drivers, etc., that there is an accident within a second or seconds of the accident. This may allow the bus drivers, taxi drivers, shuttle drivers, etc., to try to find alternate routes that may avoid the road where the accident occurred. This may also allow passengers to search for alternate trips or routes that may avoid the road where the accident occurred. This may further allow the routing component 813 to identify one or more alternate routes that may avoid the road where the accident occurred. The routing component 813 may publish messages indicating the one or more alternate routes to an asset component 841 for an asset 840 that is on a travel route that uses the road where the accident occurred.

In other embodiments, the assets 840 may include various other types of sensors or data collection devices. For example, the assets 840 may include temperature sensors or humidity sensors. In another example, the assets 840 may include air quality sensors. In a further example, the assets 840 may include light sensors, which may detect the amount of light near the light sensors. The asset management component 810 may recommend travel routes with different types of assets 840 based on the data received from the sensors. For example, if the sensors detect icy conditions on a freeway, the routing component 813 may recommend a travel route that uses a train instead of cars. In another example, if the sensors detect bad air quality, the pricing component 814 may decrease the price of public transportation assets (e.g., buses, light rail, etc.) to try to improve the air quality.

In one embodiment, the authorization component 811 may authenticate one or more users of the client device 830, operators of the assets 840, or administrators of the organizational entity before allowing access to the system architecture 800. The users of the client device 830, operators of the assets 840, or administrators of the organizational entity may register with the asset management system 810 by creating an account, as discussed in more detail below. The authorization component 811 may allow a user or operator to create credentials (e.g., username, passwords, etc.) to access their accounts and may store these credentials for later use. The authorization component 811 may authenticate a user or operator when the user or operator logs into their account (e.g., when an operator logs into the asset management component 810 or when a user logs into the client component 831 on their client device 830). The authorization component 811 may also allow security personnel, such as system administrators, information technology (IT) personnel, network administrators, etc.) to create credentials for the administrators to access the asset management system 810. For example, the authorization component 811 may allow the security personnel to create usernames and passwords for the administrators. The authorization component 811 may also allow the security personnel to specify different permissions for the administrators or different actions that may be performed by various different administrators.

In one embodiment, the administrators may be provided with more access, information, data, and capabilities than users or operators. For example, administrators may be allowed to change the pricing of assets 840 while operators and users may not. Operators may be provided with more access, information, data, and capabilities than users. In another example, an operator may be allowed to communicate (via one or more communication channels) with other operators while users may not be allowed to communicate with the other operators.

In one embodiment, the authorization component 811 may issue a security token to an administrator, user, or operator after the administrator, user, or operator logs in. The security token may be used to grant the administrator, user, or operator access to one or more of the communication channels 821A through 821Z. For example, the security token may allow an operator to publish messages on a first channel or to subscribe to a second channel. The same security token may be used across the different components of the system architecture 800. For example, an operator of an asset 840 may also be a passenger. The operator may use the same security token to login as a passenger and to request the use of the assets 840. The preferences of a administrator, user, or operator may also be tied to their account. For example, a passenger may prefer to use public transportation on their travel routes. The authorization component 811 may store the preferences and may associate these preferences with the passenger's account.

Although the asset management component 810 is illustrated as separate from the messaging system 820 in FIG. 8, the asset management component 810 or portions of the asset component 810 may be included as part of the messaging system 820 in other embodiments. For example, the asset management component 810 may be part of one or more Q nodes or may be part of the configuration manager. In another example, the authorization component 811 may be part of the configuration manager. In some embodiments, one or more of the asset management component 810 or the messaging system 820 may be located within a datacenter or a cloud computing system or architecture.

It shall be understood that the configuration of the channels 821A through 821Z (e.g., the number of channels, and the publisher or subscribers of the channels 821A through 821Z) illustrated in FIG. 8 are merely examples and other configurations may be used in other embodiments. For example, two or more channels may be combined into a single channel and the messages may be filtered by the asset management component 810 based on, for instance, criteria provided by a user, administrator, or operator. In another example, each asset 840 may publish messages to its own channel in the messaging system 820. In a further example, each client component 831 may publish messages requesting the use of transportation assets into one channel where all such requests for a geographical area are received.

As discussed above, an asset 840 may be a transportation asset that may move or travel through a geographical area such as a neighborhood, a city, a downtown area, etc. For example, some assets 840 may be shuttles, buses, or vans that are transporting passengers to different geographical locations, as discussed above. In one embodiment, the asset component 841 of an asset 840 may continually or periodically determine the geographical locations of the asset 840. For example, an asset component 841 may include a GPS receiver or the like that may continually or periodically determine the GPS coordinates of the asset 840. In one embodiment, the asset component 841 may publish messages indicating the current geographical locations of asset 840 to one or more of the channels 821A through 821Z. For example, the asset component 841 may publish a message every second or other appropriate time period that indicates the current GPS coordinates, current address, current longitude and latitude, etc., of the asset 840. The message may also include an identifier for the asset 840 (e.g., an alphanumeric value, a name, an identification number, etc.) and data (e.g., GPS coordinates) to indicate the location of the asset 840.

In one embodiment, an asset component 841 may receive messages from the routing component 813 that indicate routes or updated routes for the asset 840. For example, when a bus is first turned on, the asset component 841 of the bus may receive messages published by the routing component 813 that may indicate the route that the bus should travel along. In another example, the asset component 841 may receive messages from the routing component 813 indicating a new route for the bus when the bus is reassigned to a different route. The asset component 841 may present a map via an operator GUI that may allow the driver of the asset 840 to see the routes and updated routes. In one embodiment, the asset components 841 may subscribe to one or more of the channels 821A though 821Z to receive the messages indicating the routes. One having ordinary skill in the art understands that the routing component 813 may use various route determination algorithms, functions, operations, etc., to generate the route. For example, the routing component 813 may use Dijkstra's algorithm, path finding algorithms, weighted path finding algorithms, etc., to generate the route. In another embodiment, the asset component 841 may allow the operator of the asset 840 to view live geographical locations of other assets 840 that are in a geographical area. For example, the asset component 841 may allow a bus driver to view the live geographical locations of other buses that are within a city, within a few square blocks of the bus, etc.

In one embodiment, the asset component 841 may allow an operator of an asset 840 (e.g., a driver of a bus or shuttle) to communicate with other operators of other assets 840, users of client devices 830, and administrators (e.g., administrators, supervisors, managers, inspectors, etc., of the organizational entity). For example, the asset component 841 may allow an operator of the asset 840 to transmit video (e.g., video data, a video stream, etc.) to another operator of another asset 840 by publishing messages, which include portions of the video to one or more of the channels 821A through 821Z. In another example, the asset component 841 may allow the operator of the asset 840 to transmit audio (e.g., audio data, an audio stream, etc.) to a user that is awaiting the arrival of the asset 840 by publishing messages, which include portions of the audio to one or more of the channels 821A through 821Z. In a further example, the asset component 841 may allow the operator of the asset 840 to publish messages to indicate problems or incidents to other operators, other passengers, or administrators.

In some embodiments, the asset component 841 may allow the operators of the assets 840, users of client devices 830, or administrators to communicate with each other in a way that is similar to a two-way radio (e.g., a walkie talkie). For example, a first driver of a bus may push a button on an operator GUI presented by the asset component 841 to talk to other drivers. The audio of the first driver talking may be included in messages and published to a channel of the messaging system. Other drivers or administrators may be subscribed to that channel and may be able receive the messages that include the audio of the first driver talking.

In some embodiments, the system architecture 800 may include a plurality of communication channels for various purposes. For example, a first communication channel may allow operators to communicate with a fire department for a city and a second communication channel may allow operators to communicate with the police department. In another example, a communication channel may allow operators of assets 840 to exchange information about traffic conditions, road conditions, car accidents, etc., along the routes of the assets 840. The communication component 816 may manage the communication channels and may grant or otherwise allow access to the communication channels. For example, the communication component 816 may create new communication channels, remove communication channels, rename communications channels, etc. The communication component 816 may also allow users, operators, or administrators to join a communication channel, remove them from communications channels, and grant them different permissions to different communication channels.

In some embodiments, the asset component 841 may present a list of the communication channels that the operator of the asset 840 may join. For example, an operator GUI presented by the asset component 841 may present a list of audio communication channels (e.g., channels where live audio data is communicated) where other operators of assets 840 may talk with each other. In another example, an operator GUI presented by the asset component 841 may present a list of video communication channels (e.g., channels where live video data is communicated) where users of the client device 830 and operators of assets 840 may video chat with each other. The communication channels may use the channels 821A through 821Z to communicate data. For example, the audio data or video data for a communication channel may be published or received via one or more of the channels 821A through 821Z. The asset component 841 may allow a operator to join or leave the different communication channels (e.g., to connect to or disconnect from the different communication channels). In some embodiments, the asset component 841 may convert audio of the operator into another type of data and may publish the converted data to one or more of the communication channels 821A through 821Z. For example, the asset component 841 may convert the speech of the operator into text (e.g., may perform a speech-to-text conversion). The asset component 841 may publish the text to one or more of the communication channels 821A through 821Z. This may allow the operator to transmit messages, such as email messages, text message, etc., via the communication channels 821A through 821Z.

In some embodiments, the asset component 841 may allow the operator of an asset 840 to report various incidents that may occur while the asset 840 is in operation. For example, the asset component 841 may allow a shuttle driver to report one or more incidents while the shuttle is driving along a route. Examples of incidents may include a crash involving the asset 840, problems with the asset 840 (e.g., car breakdowns, flat tire, car unable to start, etc.), incidents with passengers (e.g., fights between passengers, disruptive or hostile passenger, etc.), and medical incidents (e.g., passenger is injured, has a heart attack, etc.).

The ability to communicate between the operators of the assets 840, users of client devices 830, and/or administrators may allow the asset component 841 to exchange useful information. For example, a driver of a bus may communicate with drivers to inform them that there is a traffic accident at a particular road. This may allow the other users or operators to avoid the traffic by finding an alternate road or route. In another example, an operator of an asset 840 may communicate with first responders (e.g., an ambulance) to inform the first responders that there are injured people at the traffic accident. This may allow the first responders to arrive at the traffic accident more quickly to help the injured people.

In one embodiment, the asset component 841 may receive requests from a user that may indicate a plurality of geographical locations. These requests may be requests from a user of a client device 830 for the asset 840 to pick up the user from a first geographical location and to transport the user to one or more other geographical locations. For example, the asset component 841 may receive a request from a user to pick the user up from the user's home and to transport the user to the user's place of work. In another embodiment, the asset component 841 may receive a request from the asset management component 810 (e.g., from the routing component 813) that may indicate the plurality of geographical locations. For example, the asset management component 810 may plan a trip for user. The asset 840 may be used to transport the user for a portion of the trip. The asset management component 810 may publish a message to the asset component 841 indicating that the user should be picked up at the train station and dropped off at an airport.

In some embodiments, the asset component 841 may allow the operator of the asset 840 to indicate whether the operator will accept a request to travel to various geographical locations. For example, the asset component 841 may allow the operator of a taxi to indicate whether the operator will accept a user's request to pick up the user from his work location and transport the user to a bus station. The asset component 841 may present an operator GUI that allows the operator to indicate whether the operator accepted or rejected the user's request.

In one embodiment, the asset component 841 may accept payment from a user of a client device 830 for usage of an asset 840. For example, the asset component 841 may accept a payment from a passenger of the shuttle for taking a ride in the shuttle to a destination. The asset component 841 may be coupled to or may include a device, which allows the asset component 841 to accept the payment. For example, the asset component 841 may include a card reader, a near-field communications (NFC) reader, a smart chip reader, or other point of sale device, etc.

In one embodiment, the asset component 841 may allow the operator of an asset 840 to register with the asset management component 810. For example, the asset component 841 may provide operator GUIs that allow the operator to setup an account with the asset management component 810, which may allow the operator to include their asset 840 as part of the system architecture 800. In one embodiment, the asset management component 810 may not allow the operator to operate their asset 840 within or using the system architecture 800 unless the operator registers with the asset management component 810. For example, the asset management component 810 may not allow a driver of a taxi to accept requests for rides from potential passengers unless the driver of the taxi registers their asset component 841 with the asset management component 810.

In one embodiment, the asset component 841 may allow the operator to associate the asset component 841 with a particular asset 840. For example, there may be multiple buses that may be used to provide different routes to users in a city. The asset component 841 may allow the driver of a bus to associate or link the asset component 841 with a particular bus. The operator may link the asset component 841 with an asset 840 by inputting an identifier for the asset 840. For example, operator may input a vehicle identification number (VIN), a serial number, a license plate, etc. In another example, the operator may scan a bar code or a QR code that is located on the asset 804. In some embodiments, the operator may be able to disassociate the asset component 841 from a previous asset 804 and re-associate the asset component 841 with a new asset 840. For example, a driver may drive different buses each day. The driver may disassociate their asset component 841 with a previous bus and associate their asset component 841 with a new bus each day.

In one embodiment, the client component 831 may allow users (e.g., passengers, users who want to park in a parking lot, etc.) to view the live geographical locations, live usages or utilizations, and live statuses or conditions of one or more assets 840. In one embodiment, the client component 831 may provide or display a user GUI to the user. The user GUI may display the live geographical locations of one or more of the assets 840 and may also display estimated or predicted arrival times for one or more of the assets 840. For example, the user GUI may display a map that includes icons, images, graphics, etc., which may indicate the live geographical locations of the assets 840. The geographical locations of the assets 840 may also be updated live on the map. For example, the geographical locations of the assets 840 may be updated every second, every few seconds, or other appropriate time period. The geographical locations of the assets 840 may be displayed to the user within seconds or other appropriate time period of the asset transmitting its location. In another example, the user GUI may present a list of assets 840 and the estimated or predicted arrival times for each asset 840 in the list of assets 840. The user GUI may also indicate a geographical location (e.g., a bus stop, a shuttle stop, a street corner, an address, a building, etc.) where the asset will arrive at the estimated or predicted arrival time.

In one embodiment, the client component 831 may allow the user to request or indicate one or more geographical locations to where the user would like to travel. For example, the client component 831 may provide text fields that allow a user to input names or addresses of geographical locations to where the user would like to travel. The client component 831 may also allow the user to input multiple destination geographical locations. For example, the client component 831 may allow a user to input three or some other appropriate number of addresses to where the user would like to travel. This may allow the user to specify a multi-leg trip or route. The client component 831 may also allow a user to indicate whether the user is willing to use multiple modes of types of transportation. For example, a user may only wish to use public transportation (e.g., public transit vehicles). In another example, a user may be willing to use both public transportation and private transportation (e.g., public transit vehicles and taxis).

In one embodiment, the client component 831 may provide an indication to a user as to whether an operator of an asset 840 will allow the user to use the asset 840. For example, the user may request that an operator pick up the user at a specific geographical location. The client component 831 may display a user GUI with a message indicating whether the operator of the asset 840 can pick up the user at the specific geographical location. In another example, the a user may request a particular parking space in a parking lot. The client component 831 may display a user GUI with a message indicating whether the parking spot was successfully reserved by the user.

As discussed above, the asset management component 810 may receive requests to travel from a starting geographical location to different destination geographical locations from the client component 831. The asset management component 810 may publish messages indicating one or more travel routes via a first channel of the channels 821A through 821Z. The one or more travel routes may be recommended travel routes that will allow the user to travel to the destination geographical locations requested by the user. In one embodiment, the client component 831 may receive the one or more travel routes by subscribing to the first channel. The client component 831 may present the recommended travel routes on a map displayed by a user GUI of the client component 831. The client component 831 may allow the user to select one of the recommended travel routes. In one embodiment, the asset management component 810 may publish messages to an asset 840 that is part of the selected travel route to inform the operator of the asset 840 that the operator should pick up the user at a certain geographical location and at a certain time.

In one embodiment, the client component 831 may allow the user to filter the different travel routes provided by the asset management component 810 based on various criteria. For example, the client component 831 may allow a user to filter travel routes based on a range of durations, a range of costs, arrival times, departure times, type of transportation, etc.

In one embodiment, the client component 831 may display scheduled and estimated arrival times of one or more assets 840. For example, the client component 831 may present a map displaying multiple assets 840 in a geographical area. The user may select one of the assets 840. The client component 831 may display the scheduled arrival time at a geographical location (e.g., a bus stop) for the selected asset 840. The client component 831 may also display an estimated arrival time at the geographical location for the selected asset 840. The estimated arrival time may be different from the scheduled arrival time. For example, the estimated arrival time may be later or earlier than the scheduled arrival time. Similarly, the client component 831 may also display the scheduled and estimated departure times of the one or more assets 840. In some embodiments, the client component 831 may display a list of assets 840 and one or more of the estimated arrival times, scheduled arrival times, estimated departure times, and schedule departure times for each asset on the list of assets 840.

In some embodiments, the client component 831 may also display information or data indicating one or more characteristics of an asset 840. For example, the client component 831 may display data indicating a utilization of a bus by indicating how many passengers are on the bus (e.g., by indicating how full the bus is). In another example, the client component 831 may display data indicating how many free spaces remain in a parking lot. In a further example, the client component 831 may allow a user to determine what types of transportation assets are in a geographical location. The client component 831 may indicate whether a transportation asset is a bus, a shuttle, a train, a ridesharing vehicle, a taxi, etc. In a further example, the client component 831 may display data indicating a wait time for different traffic lights in a geographical area. This may allow a user to better plan when they should start walking or driving to one or more geographical locations because the user may be able to factor in the amount of time they may spend waiting at stoplights to turn green. In a further example, the client component 831 may display the types of parking spaces that are available in geographical area. The client component 831 may display whether the parking spaces are able to accommodate large vehicles such as sport utility vehicles (SUVs). The client component 831 may also display whether the parking spaces have time limits (e.g., a two hour time limit or the like) for using the parking space.

In one embodiment, the client component 831 may display the live prices or live estimated prices for using different assets 840. For example, the client component 831 may display the live fares for a bus or a shuttle. In another example, the client component 831 may display a live estimated price for a taxi based on current user demand for taxies in a geographical area. In a further example, the client component 831 may display whether the parking space is associated with a flat fee (e.g., a fee for the whole day) or with an hourly fee for using the parking space. As discussed above, the prices or costs to use an asset 840 may be changed. For example, the fares for using a bus may be decreased and the price for parking spaces may be increased to incentivize users to take public transportation rather than driving to a concert stadium. The client component 831 may be subscribed to a channel of the messaging system 820 where the pricing component 831 may publish messages indicating changes in the pricing of the assets 840. The client component 831 may receive these messages and may present the updated prices to the user via a user GUI.

As discussed above, the asset management component 810 may identify or determine an updated route or trip for a user. For example, if the estimated arrival time at an airport will exceed the scheduled arrival time by a threshold amount of time due to traffic, the asset management component 810 may identify an alternate route or trip for the user that may allow the user to arrive at the previously scheduled arrival time or close to the previously scheduled arrival time. The asset management component 810 may publish one or more messages to the user indicating the updated or alternate route. The messages may indicate different assets 840 that the user should use for the updated or alternate route. The client component 831 may display the update or alternate route to the user on a map presented by a user GUI. The client component 831 may allow a user to confirm or select the alternate route or may allow the user to continue using the original route.

In one embodiment, the client component 831 may allow the user to select different geographical areas. For example, the client component 831 may allow the user to enter in a zone improvement plan (ZIP) code where the user is located. In another example, the client component 831 may activate a GPS receiver to automatically determine the geographical location of the client device 830 or the client component 831. The client component 831 may publish a message to the asset management component 810 to inform the asset management component 810 of the geographical location of the client component 831. The asset management component 810 may publish one or more messages to a channel of the messaging system 820 to let the client component 831 know which assets 840 are available in the geographical area where the client component 831 is located. For example, the asset management component 810 may publish a list of the assets 840, their prices, their capacities or utilization rates, their schedules, estimated times of arrival, performance metrics, etc., to one or more of the channels 821A through 821Z. This may allow the user to view assets 840 and information associated with the assets 840 based on the location of the user (e.g., based on the location of the user component 831). For example, this may allow the user to view assets 840 that are local to the user.

In one embodiment, the client component 831 may allow a user to pay for usage of an asset 840 using the client component 831. For example, the client component 831 may include a user's credit card information or bank account information. In another example, the client component 831 may include billing information for other types of payment services. When a user requests or uses an asset 840, the client component 831 may automatically publish messages with the user's account information (e.g., credit card number, expiration date, bank account number, etc.) to the asset management component 810. The asset management component 810 may charge the user's account or other payment service for the usage of the asset 840.

As discussed above, the system architecture 800 may include a plurality of communication channels for various purposes. In one embodiment, the client component 831 may join one or more of the communication channels. For example, the client component 831 may present a list of audio communication channels (e.g., channels where live audio data is communicated) and the user may select one or more of the audio communication channels to join. This may allow a user to talk with other users, operators of the assets 840, and administrators.

In some embodiments, the client component 831 may allow the user of a client device 830 to report various incidents that may occur while using an asset. For example, client component 831 may allow a user to report on the driving behavior of an operator of an asset 840 (e.g., whether the operator is a reckless driver). Other examples of incidents may include a crash involving the asset 840, problems with the asset 840 (e.g., car breakdowns, flat tire, car unable to start, etc.), incidents with passengers (e.g., fights between passengers, disruptive or hostile passenger, etc.), and medical incidents (e.g., passenger is injured, has a heart attack, etc.).

In one embodiment, the client component 831 may allow the user to register with the asset management component 810. The client component 831 may request various types of information from a user, such as a user's legal name, a username, a password, a user's mailing address, billing or account information, a phone number, etc. In one embodiment, the asset management component 810 may not allow a user to use the assets 840 until the user has registered with the asset management component 810. For example, the asset management component 810 may not allow a user to request an asset 840 or receive travel routes unless the user registers their client component 831 with the asset management component 810.

Figure 9:
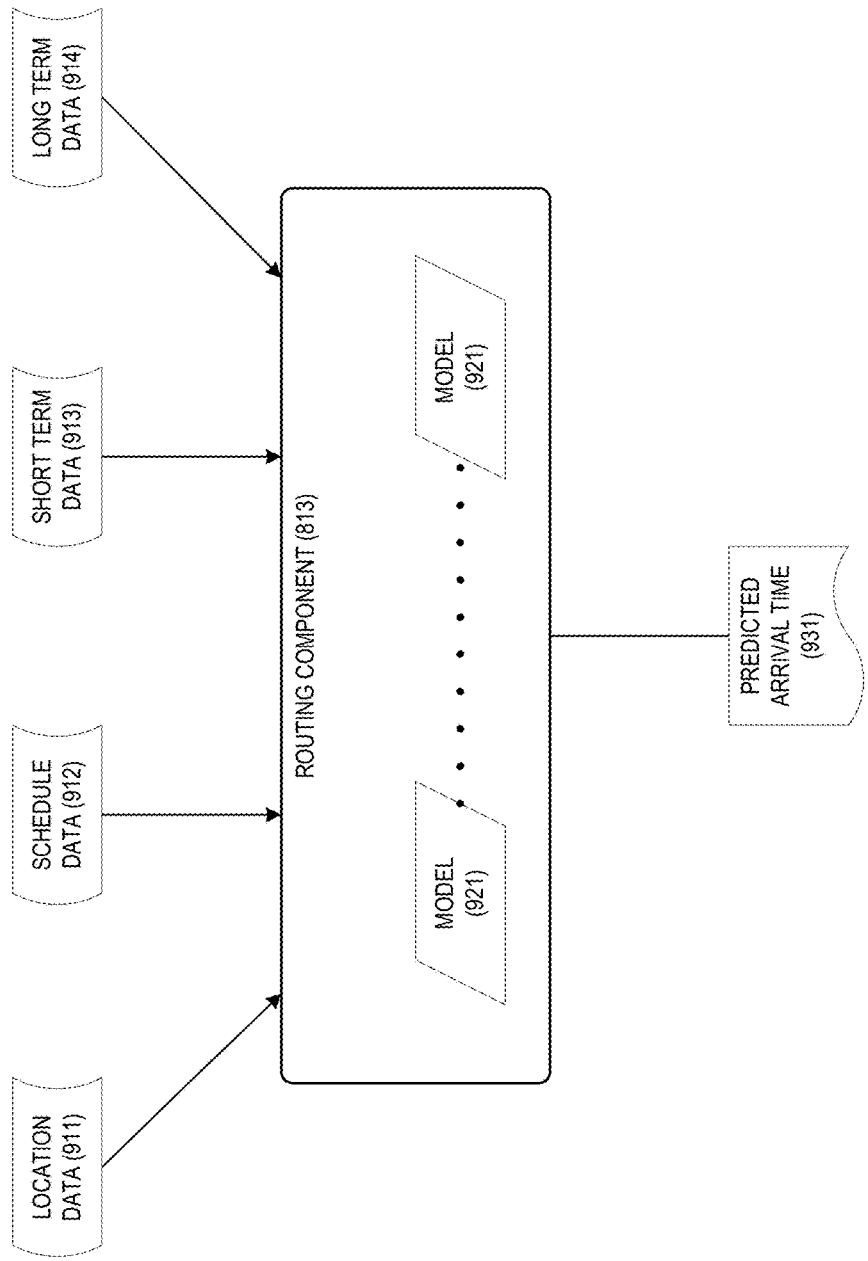
FIG. 9 is a diagram of a routing component that may predict or estimate arrival times of an asset, such as a transportation asset.

FIG. 9 is a diagram of a routing component 813 that may predict or estimate arrival times of an asset, such as a transportation asset. As discussed above, the routing component 813 may predict or estimate arrival times for an asset (e.g., an asset 840 illustrated in FIG. 8, such as a bus, a shuttle, etc.) at one or more geographical locations. The one or more geographical locations may be stops along a route along which the asset 840 travels. For example, the one or more geographical locations may be stops along a route along which a bus will travel.

In one embodiment, the routing component 813 may receive location data 911 that may indicate the live geographical location of the asset. For example, the routing component 813 may receive messages that indicate the live GPS coordinates of the asset as the asset travels along the route. The messages may be published by the asset via one or more channels of a messaging system (e.g., via one or more of channels 821A through 821Z illustrated in FIG. 8), as discussed above. The routing component 813 may also receive or obtain schedule data 912 for the asset. For example, the routing component 813 may access a data store or a database where the schedule data 912 for an asset is stored. The schedule data 912 may indicate the route along which the asset will travel. For example, the schedule data 912 may indicate the path of the vehicle along different roads and intersections where the asset will travel. The schedule data 912 may indicate a plurality of stops along which the asset may stop to pick up or drop off passengers. For example, the schedule data 912 may indicate bus stops or shuttle stops. The schedule data 912 may also indicate hops between the stops. A hop may be one or more segments between the stops. For example, a hop may be between two different stop lights along a road.

In one embodiment, the routing component 813 may also receive or obtain short term data 913 from multiple assets. For example, the routing component 813 may receive short term data 913 from multiple busses or shuttles traveling along different routes in a geographical area. The short term data 913 may indicate the geographical locations of the multiple assets over a shorter period of time. For example, the short term data 913 may indicate the GPS coordinates of all of the assets in a geographical area for the past 30 minutes, hour, or some other appropriate period of time. The routing component 813 may also receive or obtain long term data 914 from multiple assets. For example, the routing component 813 may receive long term data 914 from multiple busses or shuttles traveling along different routes in a geographical area. The long term data 914 may indicate the geographical locations of the multiple assets over longer periods of time. For example, the long term data 914 may indicate the GPS coordinates of all of the assets in a geographical area for the past week, month, or some other appropriate period of time.

Assets, such as buses, often travel on predefined routes, and multiple transportation assets may service the same route to reduce the wait times for passengers. An asset may synchronize its timing with other assets that are travelling ahead of the asset or behind the asset along the route. This may allow the assets that are travelling along the same route to more evenly spread out their arrival times at different stops. In one embodiment, synchronizing the timing of the assets that are travelling on a route may reduce the usefulness of the historical data about the delays of the assets. When the timing of the assets are synchronized, it may be more useful to use the live geographical positions of the other assets that are travelling along the same route to predict an estimated time of arrival. In addition, the predicted arrival times may be subject to high variance due to differing traffic patterns along the route on different days. For example, traffic on Fridays may start earlier because people may leave work earlier on Fridays for the weekend. In another example, traffic around a sports stadium may increase when there are games being played at the sports stadium. Taking an average of the delays may not be as useful because of the variance in traffic patterns. However, if the delays of the assets that travel along a route are plotted in graph, where the amount of delay is on the Y-axis and the different stops or hops along the route are on the X-axis, the general shape of the different delays may form a pattern that may be used to predict estimated arrival times. Furthermore, the behavior of an asset may also change dynamically along a route. For example, if a bus is behind schedule, the bus driver may drive faster to get to the next stop on time. In another example, if a bus is ahead of schedule, the bus driver may driver slower to prevent the bus from arriving at the next stop too early.

In one embodiment, the routing component 813 may generate a plurality of models 921 that may be used to predict or estimate the time of arrival for an asset at one or more stops along a route. One example of a model 921 may be referred to as an absolute delta model. The absolute delta module may use the delta (e.g., difference or change) in the average absolute historic delay for a current stop and a subsequent stop, and may add that to the measured current delay to predict arrival times at future stops. Another example of a model 921 may be referred to as a history decay model. The history decay model may use the current delay (current_delay) and averages the current delay with the historical delays (historic_delay) at future stops using an exponentially weighted function of hop counts (hop_cnt). The weight (wt) may be determined using the following equation: wt=exp (−1.0*hop_cnt). The amount of delay may be determined using the following equation: delay=historic_delay*(1−wt)+current_delay*wt. A further example of a model 921 may be referred to as a difference delta model. The difference delta model may calculate or determine historic median delay for all subsequent stop segments. The historic median delay for all subsequent stop segments may be added to the current delay to make estimated arrival times. Yet another example of a model 921 may referred to as a look ahead delta model. The look ahead delta model may identify other assets (e.g., other busses) that have traveled through a subsequent stop or segment for a route and may record the difference in delays across those stops or segments to the current delay. For stops or segments for which there are no other assets travelling ahead of the asset, the average historic difference delay may be used.

In one embodiment, the routing module 813 may attempt to identify similar trips of other assets along a route by looking at the shape of the delay curves, rather than matching the values of the delay curves. The delay curves may be normalized by a mean delay, and the routing module 813 may determine the cosine distance between the current and past trips. A sliding window of time may be used, rather than using delay curves that start from the beginning of an asset's trip or route. The delay curve that most closely matches the current delay curve of the asset may be used to calculate a weighted average according to the level of similarity to predict the arrival times at future stops. The current delay may be considered constant during an asset's trip along the route. This may help prevent inaccurate predictions in case the asset's behavior varies widely from its past behavior.

As discussed above, different models may work better in different situations to predict estimated arrival times of an asset. For example, a model may accurately predict arrival times for certain trips but may be inaccurate for other trips. In one embodiment, the routing component 813 may analyze the predicted arrival times of all of the different models and may look at the errors or inaccuracies in the predicted arrival times from all of the different models. The routing component 813 may look at a threshold number of past predictions and may select the model that was the most accurate during the last threshold number of past predictions. For example, the routing component 813 may select the model that was the most accurate for the last five predicted arrival times. This allows the routing module 813 to use a different model if a current model is unable to provide accurate predicted arrival times.

Figure 10:
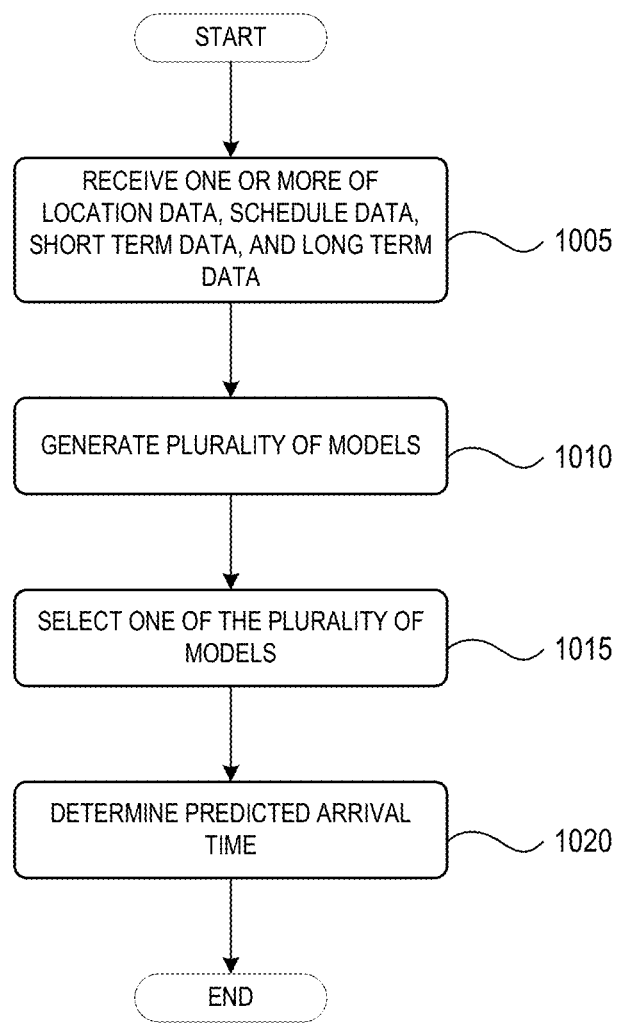
FIG. 10 is a flowchart of an example method for predicting or estimating an arrival time for an asset at a geographical location.

FIG. 10 is a flowchart of an example method 1000 for predicting or estimating an arrival time for an asset at a geographical location. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using, for instance, a computing device, an asset management component (e.g., asset management component 810 illustrated in FIG. 8), a routing component (e.g., routing component 813 illustrated in FIG. 8), an application, software components, etc. The method 1000 begins by receiving one or more of location data, schedule data, short term data (e.g., a short term history of the geographical locations of different assets), and long term data (e.g., a long term history of the geographical locations of different assets) at block 1005, as discussed above. The method 1000 may generate a plurality of models based on one or more of the location data, the schedule data, the short term data, and the long term data (block 1010), as discussed above. The method 1000 may select one of the pluralities of models to use for determining the predicted arrival time of the asset (block 1015), as discussed above. For example, the method 1000 may select the model that was the most accurate over the last few predicted arrival times. The method 1000 may generate or determine a predicted arrival time based on the selected model (block 1020), as discussed above.

Figure 11:
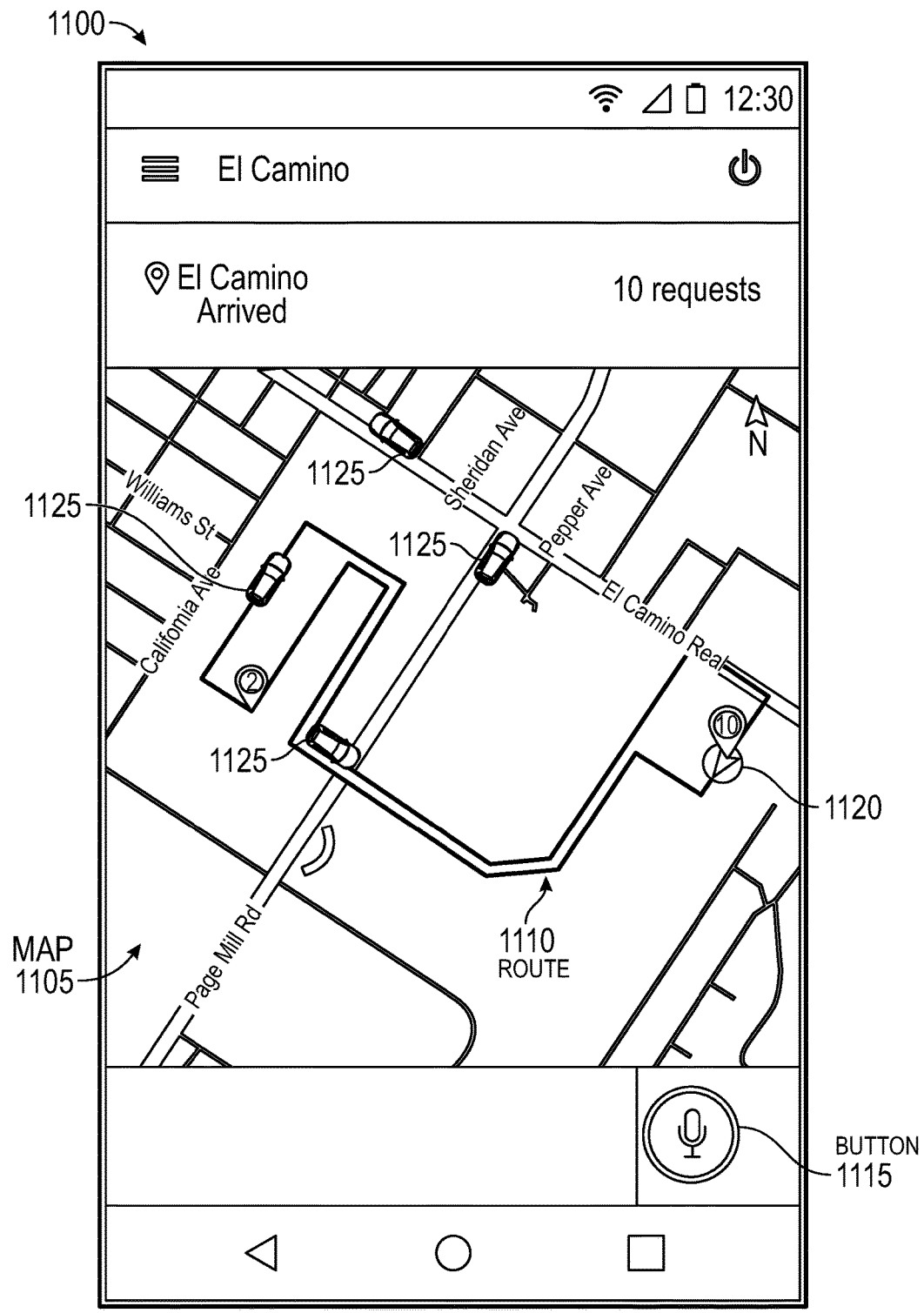
FIG. 11 is a diagram illustrating an example graphical user interface (GUI) that may be presented by an asset component.

FIG. 11 is a diagram illustrating an example GUI 1100 that may be presented by an asset component (e.g., asset component 841 illustrated in FIG. 8). The GUI 1100 may be referred to as an operator GUI. As discussed above, an asset (e.g., a shuttle, a bus, etc.) may receive a message indicating a route that the asset should travel on to pick up passengers. The asset component may present the GUI 1100 to an operator of the asset to display the route for the asset. For example, the GUI 1100 may be presented to a driver of a bus by an application executing on a smartphone or tablet computer. In other embodiments, the GUI 1100 may include various other user interface elements such as text fields, search bars, buttons, radio buttons, drop down menus, lists, icons, text images, graphics, text boxes or other user interface widgets.

The GUI 1100 includes a map 1105. The map 1105 may display a geographical area that includes the route 1110 along which the asset should travel to pick up and drop off passengers. The current geographical location of the asset is displayed using the icon 1120 (e.g., the triangle). The geographical locations of other assets within the geographical area are displayed using icons 1125. As illustrated in FIG. 11, the GUI 1100 indicates that ten passengers have requested a ride from the asset.

As discussed above, the asset component may allow an operator to communicate with passengers, other operators, first responders, or users of an organizational entity. For example, the asset component may join one or more communication channels and may allow the operator to communicate with other operators in a manner similar to a two-way radio or the like. The button 1115 may allow the operator to communicate using the communication channel. For example, the user may press or tap the button 1115 when the user wishes to talk to other users, operators, etc., who are part of the communication channel.

Figure 12:
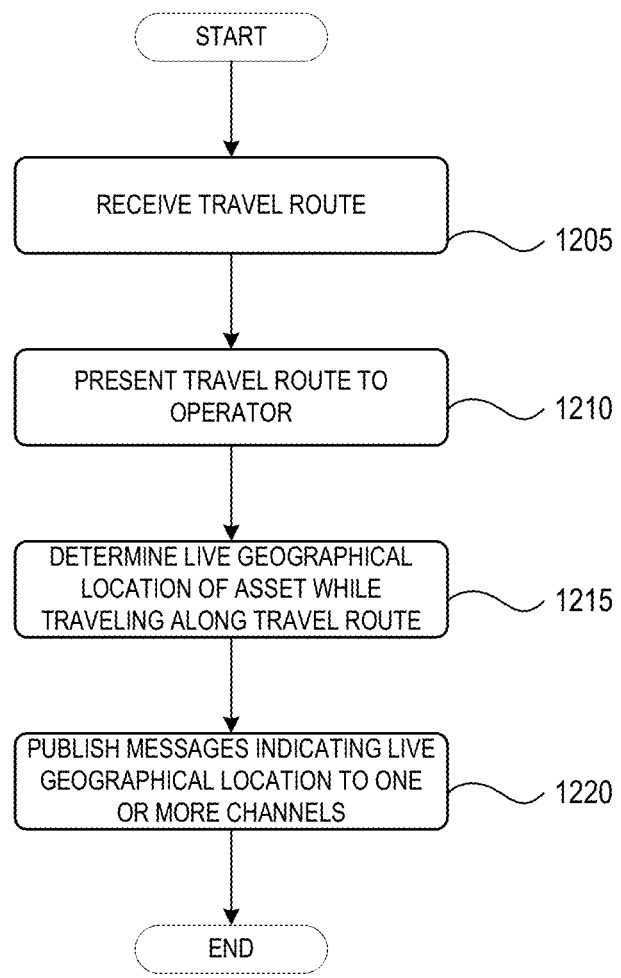
FIG. 12 is a flowchart of an example method for operating an asset component.

FIG. 12 is a flowchart of an example method 1200 for operating an asset component. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using, for example, a computing device, an asset component (e.g., asset component 841 illustrated in FIG. 8), an application, software components, etc. The method 1200 begins by receiving a travel route (block 1205). For example, the method 1200 may receive a travel route from an asset management component (e.g., asset management component 810 illustrated in FIG. 8). The travel route may indicate a route or path along which the asset should travel, as discussed above.

The method 1200 may present the travel route to an operator of an asset. For example, the method 1200 may present a map on a GUI (e.g., GUI 1100 illustrated in FIG. 11) to a driver of a shuttle or bus. The map may indicate the travel route to the driver of the bus, as discussed above. The method 1200 may determine the live geographical locations of the asset while the asset is travelling along the travel route. For example, the method 1200 may continually or periodically determine the GPS coordinates of the asset every second, every few seconds, etc., as discussed above. The method 1200 may continually publish messages indicating the live geographical locations of the asset to one or more channels of a messaging system (e.g., to one or more of channels 821A through 821Z illustrated in FIG. 8), as discussed above. This may allow the asset management component, other operators, passengers, or other users to determine the live geographical location of the asset by subscribing to the one or more channels, as discussed above.

Figure 13:
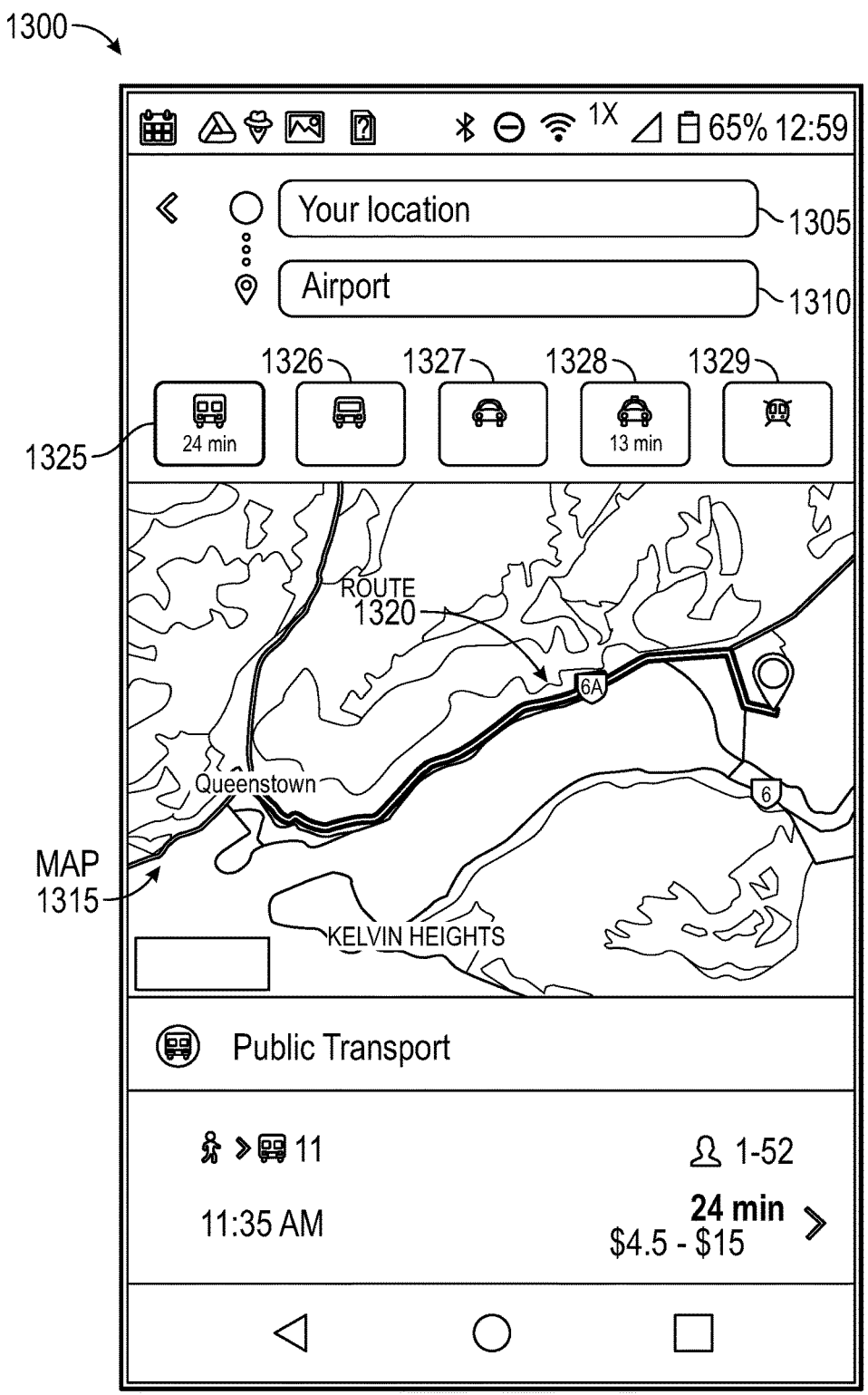
FIG. 13 is a diagram illustrating an example GUI that may be presented by a client component.

FIG. 13 is a diagram illustrating an example GUI 1300 that may be presented by a client component (e.g., client component 831 illustrated in FIG. 8). GUI 1300 may be referred to as a user GUI. As discussed above, the client component may allow the user to request an asset to transport the user from a first geographical location to a second geographical location. The client component may present the GUI 1300 to a user of a client device. For example, the GUI 1300 may be presented to a passenger by an application executing on a smartphone or tablet computer. In other embodiments, the GUI 1300 may include various other user interface elements such as text fields, search bars, buttons, radio buttons, drop down menus, lists, icons, text images, graphics, text boxes or other user interface widgets.

The GUI 1300 includes text fields 1305 and 1310. Text field 1305 may allow a user to indicate the first geographical location (e.g., a starting location) and text field 1310 may allow the user to indicate the second geographical location (e.g., a destination location). The GUI 1300 also includes buttons 1325 through 1329. The buttons 1325 through 1329 may allow the user to indicate the type(s) of asset(s) that the user is willing to use to travel from the first geographical location to the second geographical location. For example, button 1325 allows the user to indicate that the user is willing to use a bus. Button 1326 allows the user to indicate that the user is willing to use a shuttle. Button 1327 allows the user to indicate that the user is willing to use a ridesharing vehicle. Button 1328 allows the user to indicate that the user is willing to use a taxi. Button 1329 allows the user to indicate that the user is willing to use a helicopter. The user may select one or more of the buttons 1325 through 1329 to specify the mode(s) of transportation that the user is willing to use (e.g., to specify single- or multi-mode transportation). Additional or alternative buttons for other types or modes of transportation are possible.

The GUI 1300 also includes a map 1315. The map 1315 may display a geographical area that includes a recommended travel route 1320 for the user. The travel route 1320 may also indicate the first geographical location (e.g., the starting location) and the second geographical location (e.g., the second geographical location). The GUI 1300 may also indicate other information about the asset and the recommended travel route 1320 to the user. For example, the GUI 1300 may indicate that the user should arrive at approximately 11:35 AM and the trip will take approximately 24 minute. The GUI 1300 may also indicate that the price of the trip may range between $4.50 and $15.00.

Figure 14:
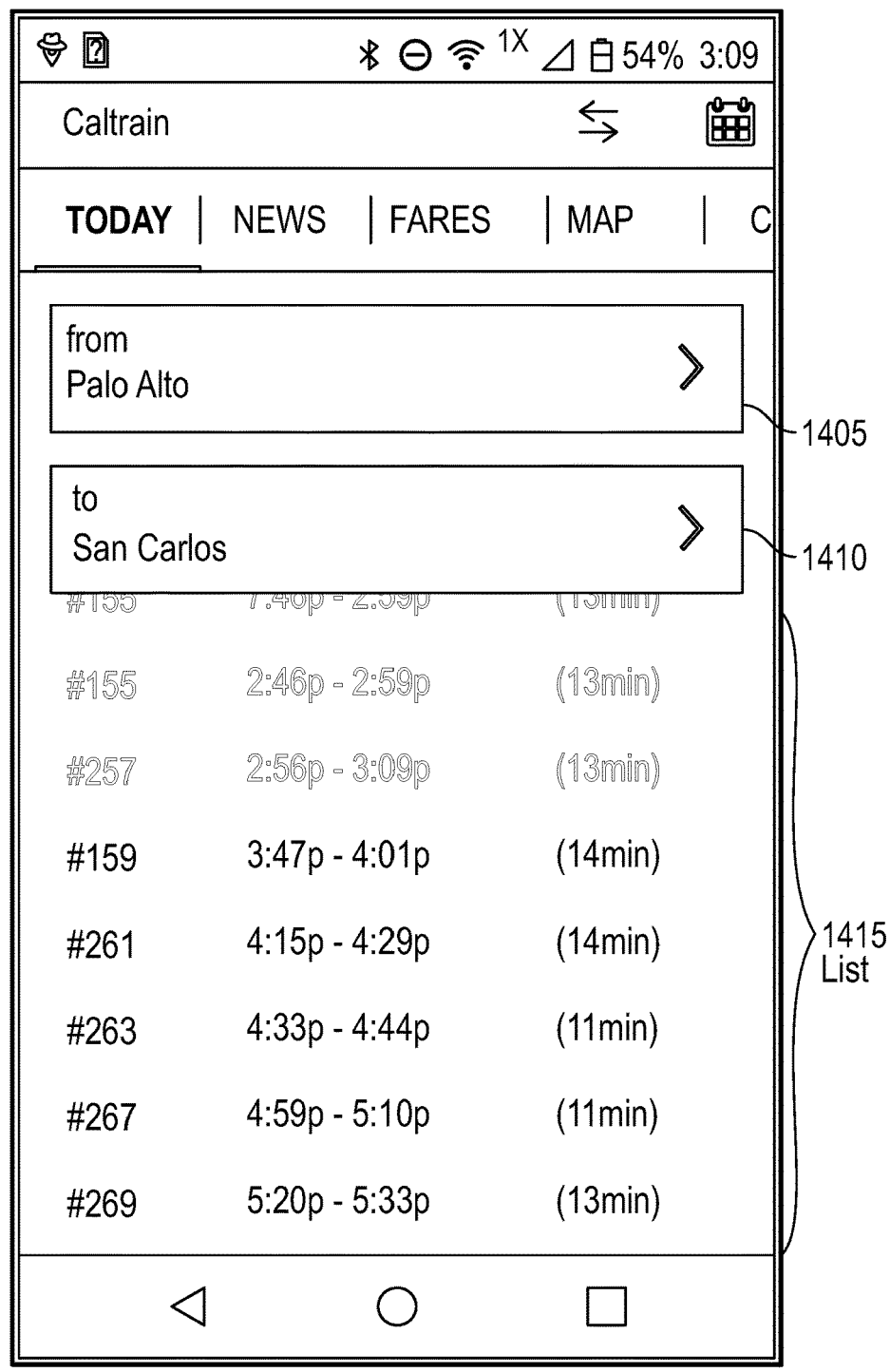
FIG. 14 is a diagram illustrating an example GUI that may be presented by a client component.

FIG. 14 is a diagram illustrating an example GUI 1400 that may be presented by a client component (e.g., client component 831 illustrated in FIG. 8). GUI 1400 may be referred to as a user GUI. As discussed above, the client component may allow the user to request an asset to transport the user from a first geographical location to a second geographical location. The client component may present the GUI 1400 to a user of a client device. For example, the GUI 1400 may be presented to a passenger by an application executing on a smartphone or tablet computer. In other embodiments, the GUI 1400 may include various other user interface elements such as text fields, search bars, buttons, radio buttons, drop down menus, lists, icons, text images, graphics, text boxes or other user interface widgets.

The GUI 1400 includes text fields 1405 and 1410. Text field 1405 may allow a user to indicate the first geographical location (e.g., a starting location) and text field 1410 may allow the user to indicate the second geographical location (e.g., a destination location). The GUI 1400 also includes a list 1415. The list 1415 may indicate a list of transportation assets that are available to transport the user form the first geographical location to the second geographical location. For example, the list 1415 may display a list of trains that are available to transport the user from Palo Alto to San Carlos. The list 1415 also indicates information about the different assets that are available to the user. For example, the list 1415 may indicate that train number 159 (the next available train) will depart Palo Alto at approximately 3:47 PM and arrive in San Carlos at approximately 4:01 PM and may indicate that the train number 159 will take approximately 14 minutes to arrive in San Carlos. The list 1415 may also include previous trains for the same route that have already left Palo Alto (e.g., train number 155 and train number 257), and their departure and arrival times. The previous trains may be greyed out (or may be displayed in a different color) on the list 1415.

Figure 15:
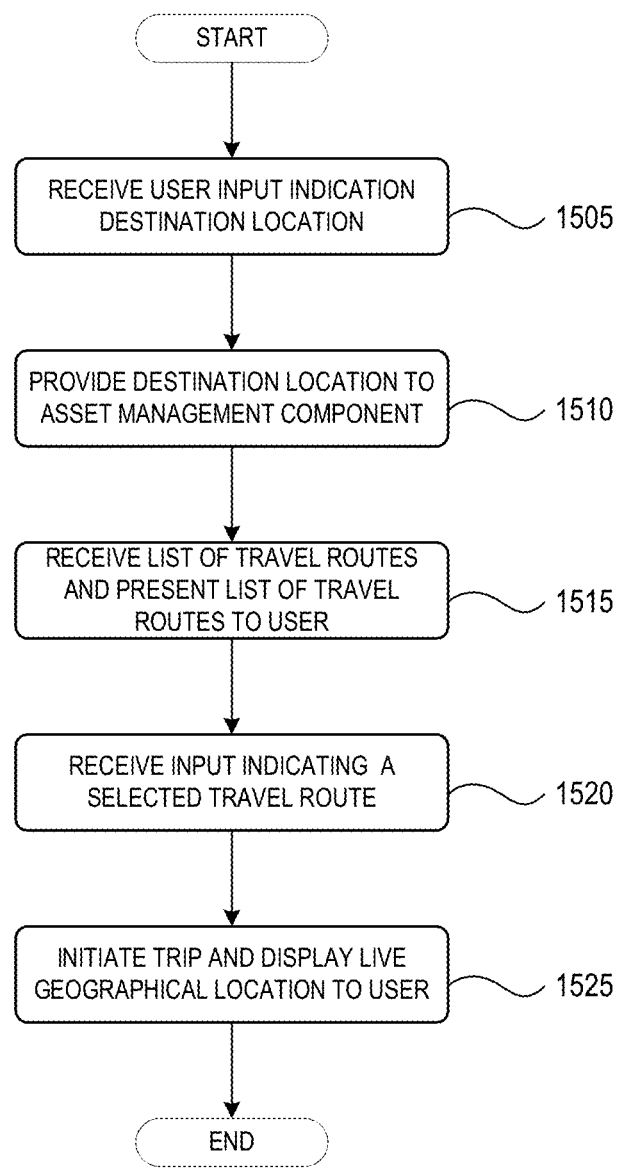
FIG. 15 is a flowchart of an example method for operating a client component.

FIG. 15 is a flowchart of an example method 1500 for operating a client component. Method 1500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using, for example, a computing device, a client component (e.g., client component 831 illustrated in FIG. 8), an application, software components, etc. The method 1500 begins by receiving a destination location from a user (block 1505). For example, the user may enter in a starting location and a destination location using text fields in a GUI, such as GUI 1400 illustrated in FIG. 14 and as discussed above. The method 1500 may provide the destination location to an asset management component (e.g., asset management component 810 illustrated in FIG. 8) at block 1510. For example, the method 1500 may publish a message indicating the starting location and the destination location to one or more channels of a messaging system.

The method 1500 may receive a list of travel routes and may present the list of travel routes to the user (block 1515). The list of travel routes may include information such as the types of assets used for the travel route, total estimated time for the travel route, estimated arrival time, pricing information, etc., as discussed above. The method 1500 may receive input from a user selecting one of the travel routes from the list of travel routes (block 1520). For example, the user may tap or select one travel route from the list of travel routes using the GUI. The method 1500 may initiate the trip and may display live geographical to the user at block 1525. For example, the method 1500 may request one or more assets to pick the user at the starting location to initiate the trip. The method 1500 may also continually or periodically determine the live geographical location of the user. The method 1500 may display the live geographical location of the user on a map as the user travels along the selected travel route.

Figure 16:
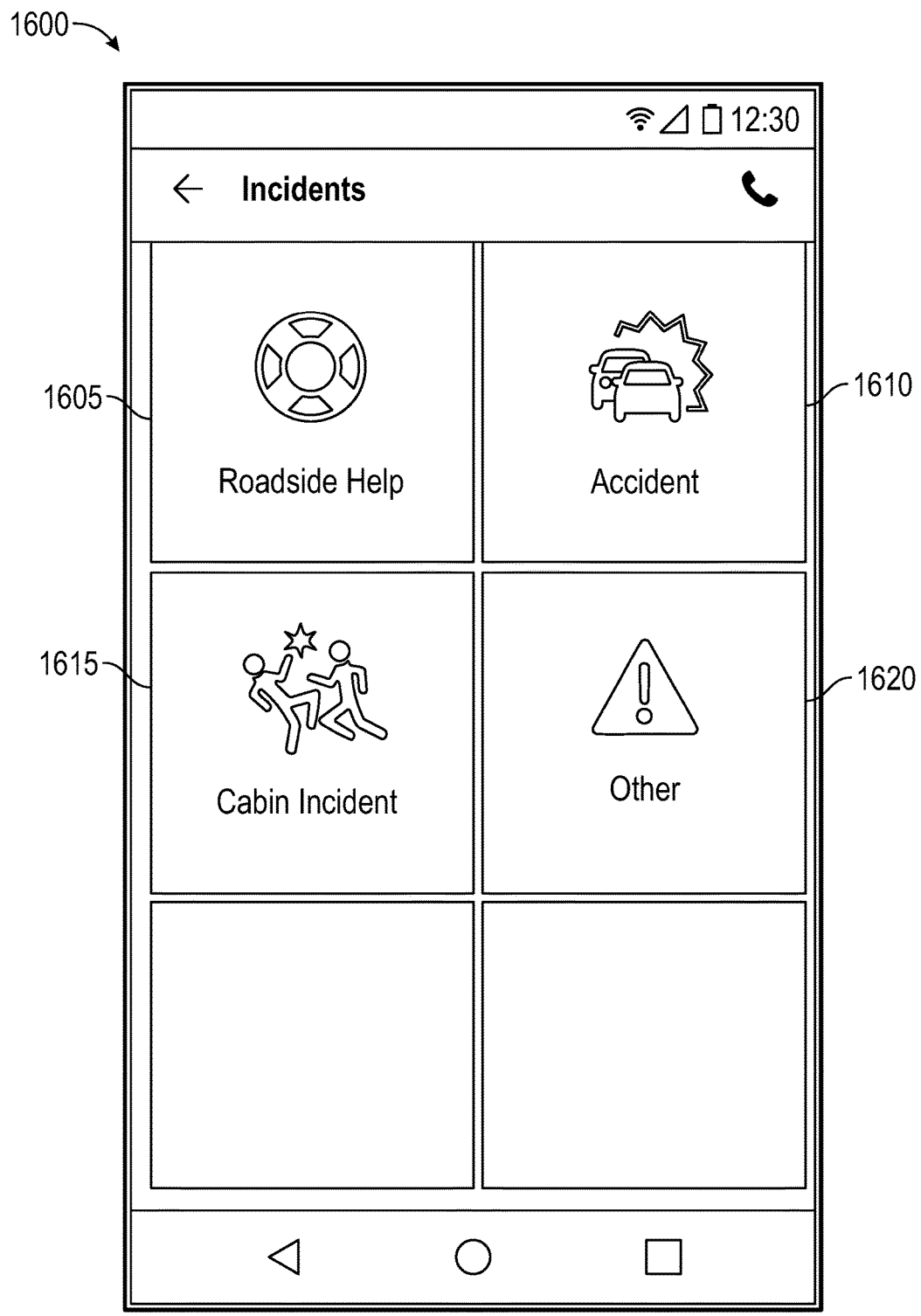
FIG. 16 is a diagram illustrating an example GUI that may be presented by a client component or an asset component.

FIG. 16 is a diagram illustrating an example GUI 1600 that may be presented by a client component (e.g., client component 831 illustrated in FIG. 8) or an asset component (e.g., asset component 841 illustrated in FIG. 8). The GUI 1600 may be a user GUI or may be an operator GUI. As discussed above, a client component or an asset component may allow users or operators to report incidents or problems when using or operating an asset. The client component or asset component may present the GUI 1600 to a user or an operator. For example, the GUI 1600 may be presented to a passenger by an application executing on a smartphone or tablet computer. In other embodiments, the GUI 1600 may include various other user interface elements such as text fields, search bars, buttons, radio buttons, drop down menus, lists, icons, text images, graphics, text boxes or other user interface widgets.

The GUI 1600 includes buttons 1605, 1610, 1615 and 1620. The buttons 1605 through 1620 may allow the user to report different types of problems or incidents to an asset management component (e.g., asset management component 810 illustrate in FIG. 8). For example, button 1605 may allow an operator of an asset to report a flat tire and request roadside help. In another example, button 1610 may allow a passenger to report that the asset the passenger is using has been involved in a traffic accident. In a further example, button 1615 may allow an operator to report an unruly or uncooperative passenger. In another example, button 1620 may allow an operator of an asset to report that a user has had a medical emergency (e.g., a heart attack, seizure, etc.). Other additional or alternative buttons are possible.

Figure 17:
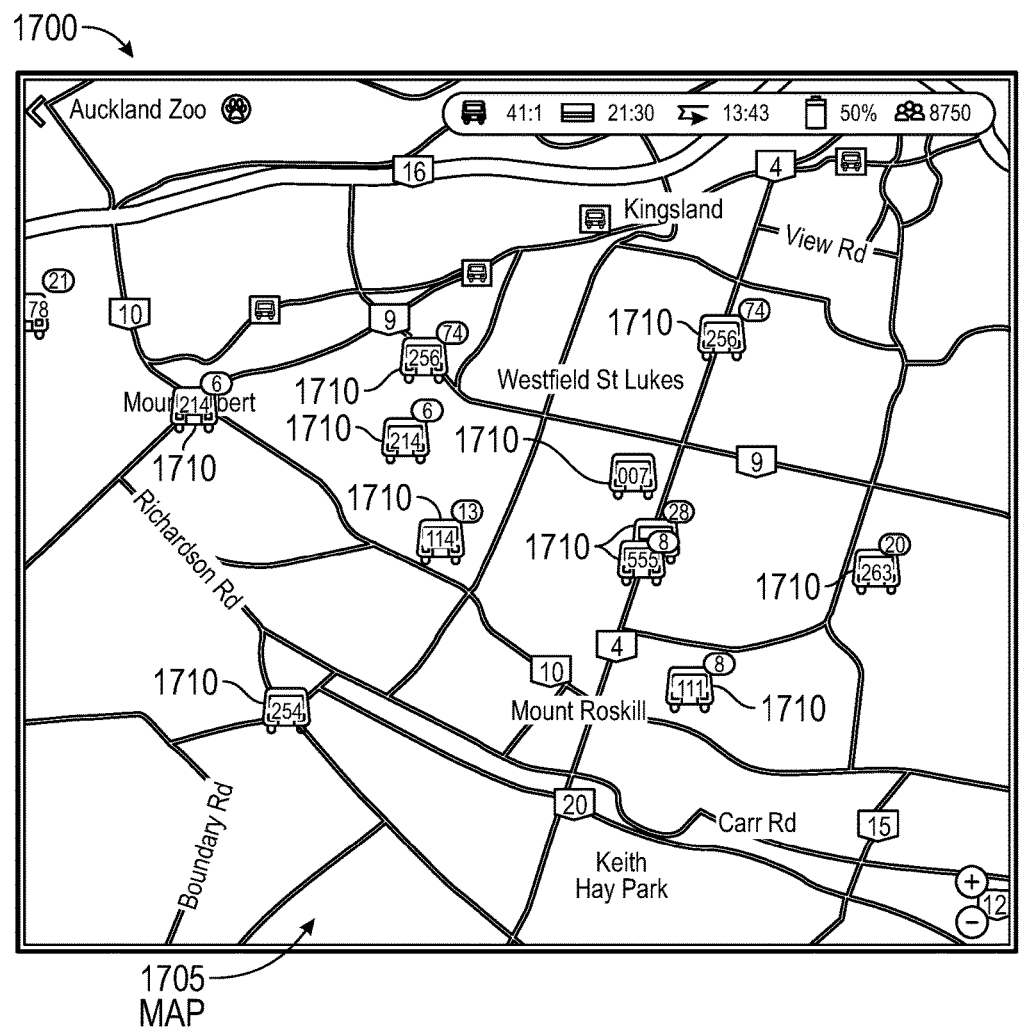
FIG. 17 is a diagram illustrating an example GUI that may be presented by an asset management component.

FIG. 17 is a diagram illustrating an example GUI 1700 that may be presented by an asset management component (e.g., asset management component 810 illustrated in FIG. 8). GUI 1700 may be referred to as an administrator GUI. As discussed above, an asset management component may manage or track various assets within a geographical area. The asset management component may present the GUI 1700 to a user of an organizational entity (e.g., an administrator, a manager, etc.) to allow the user to view the live geographical locations of the various assets and other information about the various assets. For example, the GUI 1700 may be presented to user by an application (e.g., a web browser) executing on a smartphone, tablet computer, laptop computer, desktop computer, or the like. In other embodiments, the GUI 1700 may include various other user interface elements such as text fields, search bars, buttons, radio buttons, drop down menus, lists, icons, text images, graphics, text boxes or other user interface widgets.

The GUI 1700 includes a map 1705 of a geographical area. The map 1705 includes various icons 1710 that may indicate the live geographical locations of assets within the geographical area. The positions of the icons 1710 may change as the different assets travel along routes in the geographical area. For example, the icon 1710 that represents a bus numbered 226 may move as the bus drives north along highway 9 on the map 1705. The icons 1710 may update live, as discussed above. For example, the icons 1710 may be updated within a second, a few seconds, etc., of the movement of an asset.

FIG. 18 is a diagram illustrating an example GUI 1800 that may be presented by an asset management component (e.g., asset management component 810 illustrated in FIG. 8). GUI 1800 may be referred to as an administrator GUI. As discussed above, an asset management component may manage or track various assets within a geographical area. The asset management component may present the GUI 1800 to a user of an organizational entity (e.g., an administrator, a manager, etc.) to allow the user to view various information (e.g., performance metrics, occupancy, etc.) about the assets in a geographical area. For example, the GUI 1800 may be presented to user by an application (e.g., a web browser) executing on a smartphone, tablet computer, laptop computer, desktop computer, or the like. In other embodiments, the GUI 1800 may include various other user interface elements such as text fields, search bars, buttons, radio buttons, drop down menus, lists, icons, text images, graphics, text boxes or other user interface widgets.

The GUI 1800 includes information about assets, which may service a particular route. For example, the GUI 1800 includes information about trains, which travel along the route WEST. For purposes of illustration and not limitation, the GUI 1800 indicates that there are 17 trains, which travel on the route WEST. The GUI 1800 may also indicate the occupancy rate for the trains, which is currently zero. The GUI 1800 includes a list 1805, which may list the different stops that are on the route WEST. The list 1805 includes information such as the name of the stop (e.g., "Henderson," "Swanson," etc.), an identifier for the next train that will arrive at the stop (e.g., AM471, AM687, etc.), scheduled arrival times for the next train at a stop, and whether the trains are on time (e.g., OT).

Figure 19:
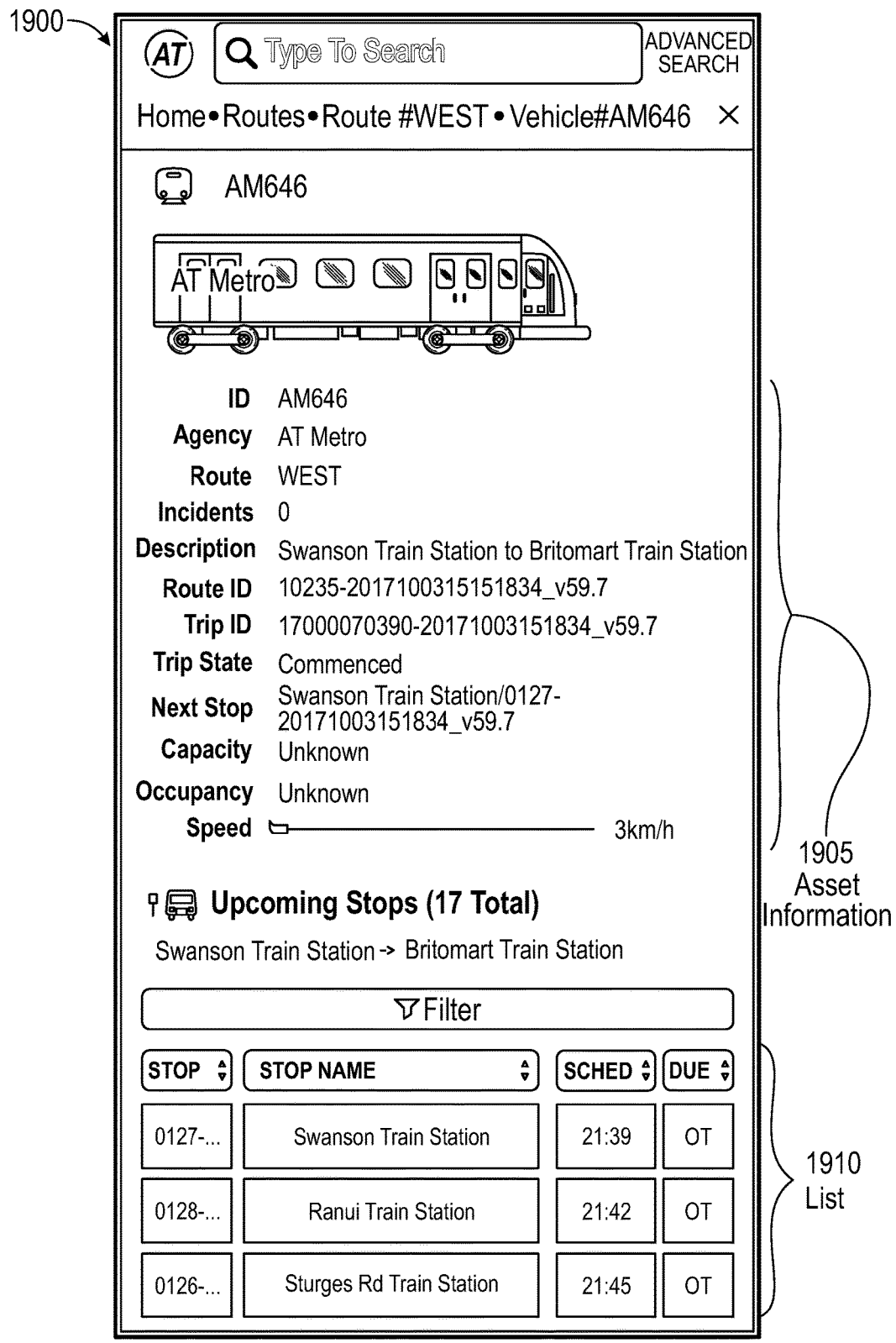
FIG. 19 is a diagram illustrating an example GUI that may be presented by an asset management component.

FIG. 19 is a diagram illustrating an example GUI 1900 that may be presented by an asset management component (e.g., asset management component 810 illustrated in FIG. 8). GUI 1900 may be referred to as an administrator GUI. As discussed above, an asset management component may manage or track various assets within a geographical area. The asset management component may present the GUI 1900 to a user of an organizational entity (e.g., an administrator, a manager, etc.) to allow the user to view information (e.g., performance metrics, occupancy, etc.) about the assets in a geographical area. For example, the GUI 1900 may be presented to user by an application (e.g., a web browser) executing on a smartphone, tablet computer, laptop computer, desktop computer, or the like. In other embodiments, the GUI 1900 may include various other user interface elements such as text fields, search bars, buttons, radio buttons, drop down menus, lists, icons, text images, graphics, text boxes or other user interface widgets.

The GUI 1900 includes information about an asset selected by a user. For example, referring to FIG. 18, a user may select one or more assets from a list 1805. Alternatively, the user may select one or more icons 1710 from the GUI 1700 illustrated in FIG. 17. The GUI 1900 may be presented to the user to provide information about the selected asset(s). The GUI 1900 may display asset information 1905, which may provide information about the selected asset. For example, the asset information 1905 may indicate that the selected asset is a train with the identifier AM646. The asset information may also indicate the train's next stop, the train's current speed, the occupancy of the train, etc. The GUI 1900 also includes a list 1910. The list 1910 may indicate the different stops that the train has made and the scheduled time of arrival at each of the stops. The list 910 may also indicate whether the train arrived late or on time at the stops. Any suitable information about the selected asset(s) may be displayed as the asset information 1905 and/or in the list 1910, depending on, for example, the type of asset that was selected by the user.

Figure 20:
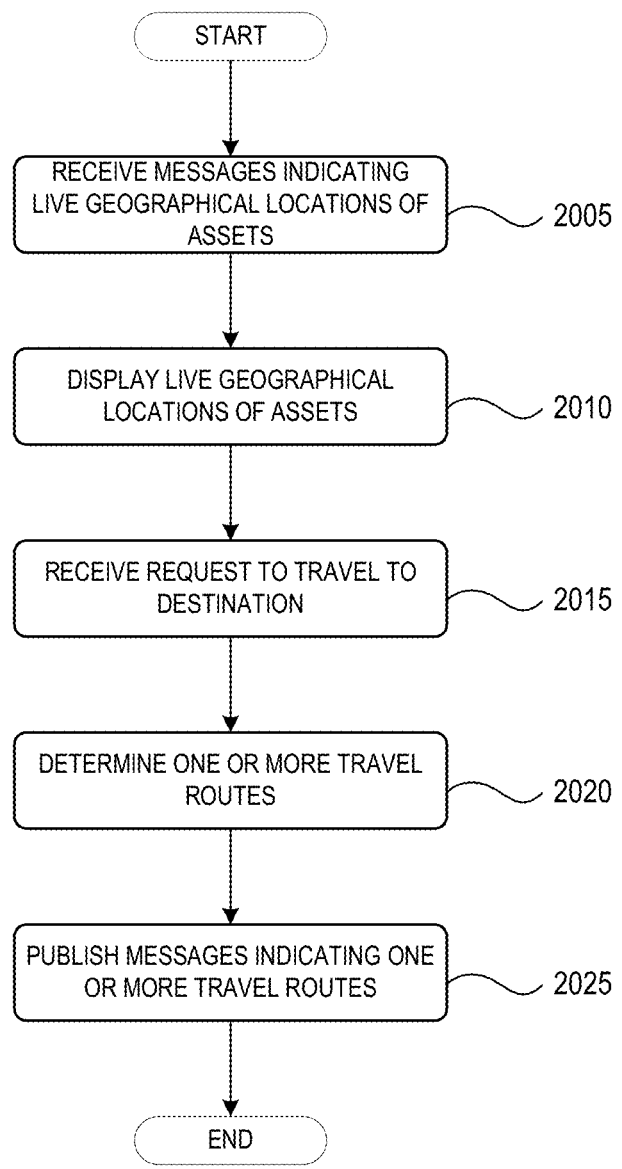
FIG. 20 is a flowchart of an example method for operating an asset management component.

FIG. 20 is a flowchart of an example method for operating an asset management component. Method 2000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using, for example, a computing device, an asset management component (e.g., asset management component 810 illustrated in FIG. 8), subcomponents of the asset management component (e.g., a monitoring component, a routing component, etc.), an application, software components, etc. The method 2000 begins by receiving one or more message indicating live geographical locations of a plurality of assets (block 2005). The messages may be published by the plurality of assets onto one or more channels of a messaging system.

The method 2000 may display live geographical locations of the plurality of assets (block 2010). For example, the method 2000 may display a GUI that includes a map of a geographical area. The map may include icons indicating the live geographical locations of the plurality of assets, as illustrated in FIG. 17. The method 2000 may receive a request from a user to travel to a destination (block 2015). For example, the method 2000 may receive a message published by a user on a communication channel and the message may indicate the destination. The method 2000 may determine one or more travel routes that allow the user to travel to the specified destination (block 2020). The one or more travel routes may use different assets, although some of the assets may be shared between the one or more travel routes. The method 2000 publishes one or more message indicating the one or more travel routes to the user (block 2025).

Figure 21:
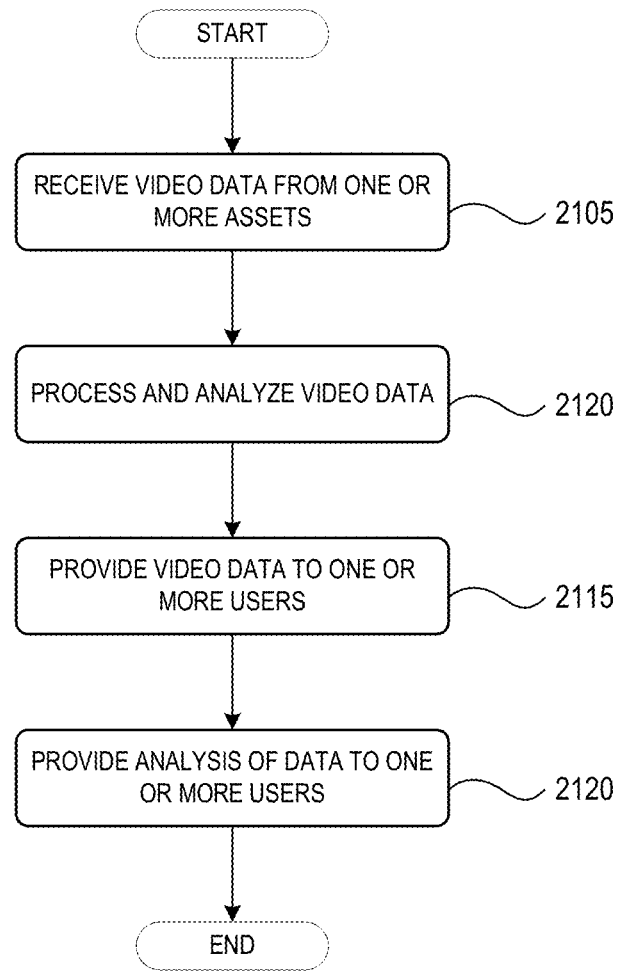
FIG. 21 is a flowchart of an example method for processing or analyzing video data.

FIG. 21 is a flowchart of an example method 2100 for processing or analyzing video data. Method 2100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using, for example, a computing device, an asset management component (e.g., asset management component 810 illustrated in FIG. 8), a video component (e.g., video component 812 illustrated in FIG. 8), an application, software components, etc. The method 2100 begins by receiving live video data from one or more assets (block 2105). For example, assets may include a video camera or other suitable video/camera source, and may publish messages that include live video to one or more channels of a messaging system, as discussed above.

The method 2100 may optionally process and analyze the video (block 2110). For example, the method 2100 may count the number of cars that appear in the live video data, as discussed above. In another example, the method 2100 may process the live video data to remove or blur the license plates from the cars that appear in the live video data. The method 2100 may provide the live video data to one or more users (block 2115). For example, the method 2100 may republish the live video data to one or more channels of the messaging system to allow passengers and operators of assets to view the live videos. The method 2100 may optionally provide the analysis of the live video data to one or more users (block 2120). For example, the method 2100 may indicate to users that traffic has been detected based on the analysis of the live video data. In another example, the method 2100 may indicate to users that an accident has been detected at a geographical location based on the analysis of the live video data.

Figure 22:
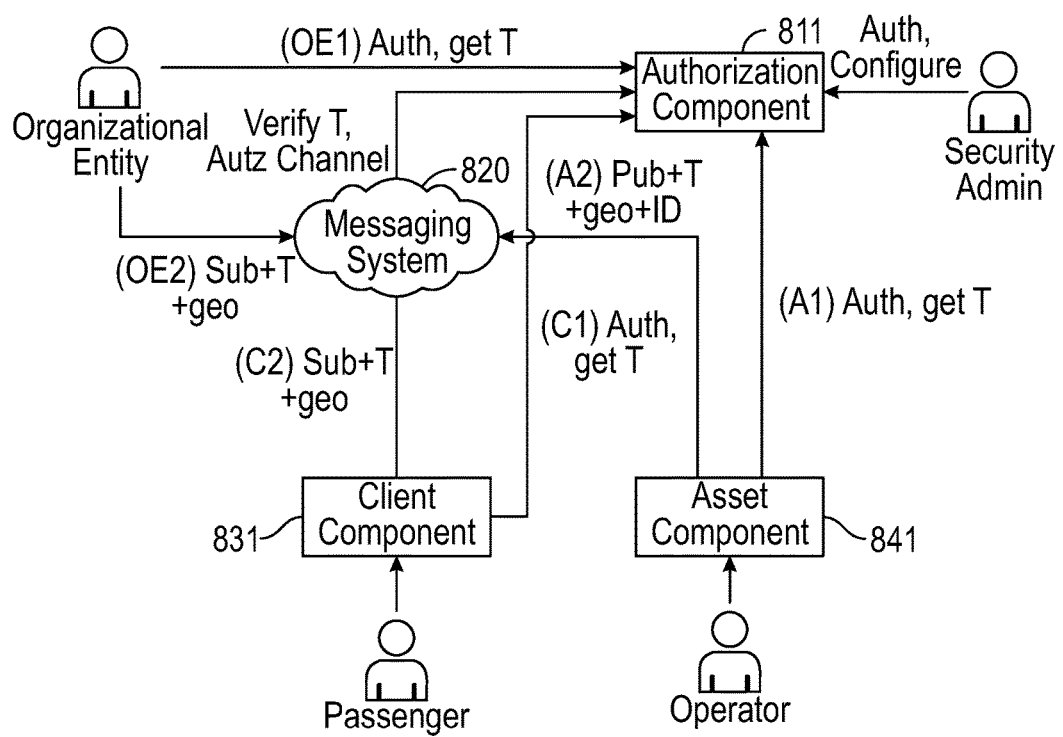
FIG. 22 is a diagram illustrating example authentication procedures for an asset management system.

FIG. 22 is a diagram illustrating example authentication procedures for an asset management system. As discussed above, operators of assets, passengers or users of assets, and users of one or more organizational entities may authenticate themselves with an asset management system before being allowed to use the asset management system. For example, a passenger may not be able to request an asset for a trip until the passenger has been authenticated by the asset management system. In another example, an operator of an asset may not be allowed to receive requests from passengers until the operator has been authenticated by the asset management system. In a further example, a user of an organizational entity may not be able to view the status and locations of the assets in a geographical area unless the user of the organization entity has been authenticated by the asset management system.

A passenger (e.g., a user of an asset) may authenticate himself or herself with the asset management system by providing authentication credentials to the authorization component 811 at block (C1). The passenger may also request a security token, which may be used by the messaging system 820 to grant the passenger access to different channels in the messaging system 820. The passenger's security token may also allow the client component 831 to use the asset management component to request different assets, pay for the usage of assets, etc. In block (C2), the client component 831 may provide the passenger's security token to the messaging system 820 and may provide the geographical location of the passenger. The messaging system 820 may verify that the passenger's security token is valid (e.g., has not expired) and may determine which channels of the messaging system 820 the passenger should have access to, based on, for example, the permissions of the security token and based on the geographical location of the passenger.

An operator of an asset may authenticate himself or herself with the asset management system by providing authentication credentials to the authorization component 811 at block (A1). The operator may also request a security token, which may be used by the messaging system 820 to grant the operator access to different channels in the messaging system 820. The operator's security token may also allow the asset component 841 to use the asset management component to receive requests for rides from users, to accept the requests, etc. In block (A2), the asset component 841 may provide the operator's security token to the messaging system 820 and may provide the geographical location of the operator. The messaging system 820 may verify that the operator's security token is valid and may determine which channels of the messaging system 820 the operator should have access to, based on, for example, the permissions of the security token and based on the geographical location of the operator.

A user of an organizational entity may authenticate himself or herself with the asset management system by providing authentication credentials to the authorization component 811 at block (OE1). The user of the organizational entity may also request a security token, which may be used by the messaging system 820 to grant the user access to different channels in the messaging system 820. The user's security token may also allow the asset component 841 to use the asset management component to monitor the live geographical locations, utilizations, statuses, conditions, etc., of assets in a geographical area. In block (OE2), the asset component 841 may provide the user's security token to the messaging system 820 and may provide the geographical location of the user. The messaging system 820 may verify that the user's security token is valid and may determine which channels of the messaging system 820 the user should have access to, based on, for example, the permissions of the security token and based on the geographical location of the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application-specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
providing, to a plurality of assets, a plurality of travel routes received via a graphical user interface (GUI), wherein each of the plurality of travel routes indicates a route along which a corresponding asset of the plurality of assets is to travel, wherein the plurality of travel routes are based on an analysis of travel history of one or more of the plurality of assets;
receiving one or more first messages from the plurality of assets on one or more first channels of a plurality of channels of a publish-subscribe ("Pub Sub") system, wherein the one or more first messages indicate live geographical locations of the plurality of assets located in a geographical area as the plurality of assets travel along the plurality of travel routes;
displaying, via the GUI, the live geographical locations of the plurality of assets on a map of the geographical area;
displaying, via the GUI, live performance metrics of each of the plurality of assets in the geographical area;
receiving on a second channel of the PubSub system a message from a first user device indicating a request to travel to a destination;
determining one or more travel routes of the plurality of travel routes to the destination, wherein the one or more travel routes use different assets to travel to the destination; and
publishing on a third channel of the PubSub system one or more second messages indicating the one or more travel routes.

2. The method of claim 1, further comprising:
monitoring live user demand for each of the plurality of assets;
identifying an increased demand from a plurality of users for one or more first transportation assets located in a portion of the geographical area; and
re-allocating one or more second transportation assets located in the portion of the geographical area to meet the increased demand from the users.

3. The method of claim 2, further comprising:
altering information for the one or more first and second transportation assets to incentive users to use the one or more second transportation assets instead of the one or more first transportation assets.

4. The method of claim 1, further comprising:
predicting live arrival times of each of the plurality of assets.

5. The method of claim 4, further comprising:
displaying, via a user GUI, live predicted arrival times of each of the plurality of assets.

6. The method of claim 1, further comprising:
receiving from the first user device on the second channel a second message indicating a first travel route from the one or more travel routes.

7. The method of claim 6, further comprising:
continuously tracking the first user device along the first travel route; and
recommending a second travel route to the first user device in response to detecting a disruption in an upcoming portion of the assets used by the first travel route.

8. The method of claim 1, comprising:
predicting, in real time, arrival times of each of the plurality of assets.

9. The method of claim 8, wherein predicting the arrival times comprises:
analyzing a history of previous trips taken by each asset for a respective route over a predetermined time period to generate a plurality of trip models for each asset for the respective route;
analyzing a current trip taken by each asset for the respective route; and
based thereon, selecting one of the plurality of trip models.

10. An apparatus, comprising:
one or more computer processors to:
provide, to a plurality of assets, a plurality of travel routes received via a graphical user interface (GUI), wherein each of the plurality of travel routes indicates a route along which a corresponding asset of the plurality of assets is to travel, wherein the plurality of travel routes are based on an analysis of travel history of one or more of the plurality of assets;

receive one or more first messages from the plurality of assets on one or more first channels of a plurality of channels of a publish-subscribe ("Pub Sub") system, wherein the one or more first messages indicate live geographical locations of the plurality of assets located in a geographical area as the plurality of assets travel along the plurality of travel routes;

display, via the GUI, the live geographical locations of the plurality of assets on a map of the geographical area;

display, via the GUI, live performance metrics of each of the plurality of assets in the geographical area;

receive on a second channel of the PubSub system a message from a first user device indicating a request to travel to a destination;

determine one or more travel routes of the plurality of travel routes to the destination, wherein the one or more travel routes use different assets to travel to the destination; and publish on a third channel of the PubSub system one or more second messages indicating the one or more travel routes.

11. The apparatus of claim 10, wherein the one or more computer processors are further to:

monitor live user demand for each of the plurality of assets;

identify an increased demand from a plurality of users for one or more first transportation assets located in a portion of the geographical area; and re-allocate one or more second transportation assets located in the portion of the geographical area to meet the increased demand from the users.

12. The apparatus of claim 11, wherein the one or more computer processors are further to:

alter information for the one or more first and second transportation assets to incentive users to use the one or more second transportation assets instead of the one or more first transportation assets.

13. The apparatus of claim 10, wherein the one or more computer processors are further to:

predict live arrival times of each of the plurality of assets.

14. The apparatus of claim 13, wherein the one or more computer processors are further to:

display, via the GUI, live predicted arrival times of each of the plurality of assets.

15. The apparatus of claim 10, wherein the one or more computer processors are further to:

receive from the first user device on the second channel a second message indicating a first travel route from the one or more travel routes.

16. The apparatus of claim 15, wherein the one or more computer processors are further to:

continuously track the first user device along the first travel route; and recommend a second travel route to the first user device in response to detecting a disruption in an upcoming portion of the assets used by the first travel route.

17. The apparatus of claim 10, wherein the one or more computer processors are further to:

predict, in real time, arrival times of each of the plurality of assets.

18. The apparatus of claim 17, wherein to predict the arrival times the one or more computer processors are further to:

analyze a history of previous trips taken by each asset for a respective route over a predetermined time period to generate a plurality of trip models for each asset for the respective route;

analyze a current trip taken by each asset for the respective route; and based thereon, select one of the plurality of trip models.

19. A non-transitory computer-readable medium having instruction stored thereon that, when executed by one or more computer processors, cause the one or more computer processors to:

provide, to a plurality of assets, a plurality of travel routes received via a graphical user interface (GUI), wherein each of the plurality of travel routes indicates a route along which a corresponding asset of the plurality of assets is to travel, wherein the plurality of travel routes are based on an analysis of travel history of one or more of the plurality of assets;

receive one or more first messages from the plurality of assets on one or more first channels of a plurality of channels of a publish-subscribe ("Pub Sub") system, wherein the one or more first messages indicate live geographical locations of the plurality of assets located in a geographical area as the plurality of assets travel along the plurality of travel routes;

display, via the GUI, the live geographical locations of the plurality of assets on a map of the geographical area;

display, via the GUI, live performance metrics of each of the plurality of assets in the geographical area;

receive on a second channel of the PubSub system a message from a first user device indicating a request to travel to a destination;

determine one or more travel routes of the plurality of travel routes to the destination, wherein the one or more travel routes use different assets to travel to the destination; and publish on a third channel of the PubSub system one or more second messages indicating the one or more travel routes.

* * * * *